(12) United States Patent
Nguyen

(10) Patent No.: US 9,227,721 B1
(45) Date of Patent: Jan. 5, 2016

(54) VARIABLE CAMBER CONTINUOUS AERODYNAMIC CONTROL SURFACES AND METHODS FOR ACTIVE WING SHAPING CONTROL

(71) Applicant: The United States of America as Represented by the Administrator of the National Aeronautics & Space Administration (NASA), Washington, DC (US)

(72) Inventor: Nhan T. Nguyen, Santa Clara, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 409 days.

(21) Appl. No.: 13/648,197

(22) Filed: Oct. 9, 2012

Related U.S. Application Data

(60) Provisional application No. 61/628,299, filed on Oct. 7, 2011.

(51) Int. Cl.
*B64C 3/50* (2006.01)
*B64C 3/14* (2006.01)
*B64C 9/20* (2006.01)
*B64C 9/14* (2006.01)

(52) U.S. Cl.
CPC ... *B64C 9/14* (2013.01); *B64C 3/14* (2013.01); *B64C 3/50* (2013.01); *B64C 9/20* (2013.01)

(58) Field of Classification Search
CPC .............. B64C 3/50; B64C 3/48; B64C 3/44; B64C 3/38; B64C 3/14; B64C 3/10; B64C 2003/142; B64C 2003/147; B64C 9/20; B64C 9/16; B64C 9/12; B64C 9/10; B64C 9/04
See application file for complete search history.

(56) References Cited

U.S. PATENT DOCUMENTS

| | | | | |
|---|---|---|---|---|
| 4,796,192 A | * | 1/1989 | Lewis | 244/76 R |
| 5,082,207 A | * | 1/1992 | Tulinius | 244/195 |
| 5,797,105 A | * | 8/1998 | Nakaya et al. | 244/177 |
| 6,161,801 A | * | 12/2000 | Kelm et al. | 244/195 |
| 6,209,824 B1 | | 4/2001 | Caton et al. | |
| 7,004,428 B2 | * | 2/2006 | Tracy et al. | 244/35 R |
| 7,455,264 B2 | * | 11/2008 | Wakayama | 244/215 |
| 7,878,459 B2 | | 2/2011 | Mabe et al. | |
| 8,056,865 B2 | | 11/2011 | Grip | |
| 8,118,264 B2 | | 2/2012 | Mabe et al. | |
| 2008/0149779 A1 | * | 6/2008 | Phillips | 244/201 |

* cited by examiner

*Primary Examiner* — Tien Dinh
*Assistant Examiner* — Richard R Green
(74) *Attorney, Agent, or Firm* — Christopher J. Menke; Robert M. Padilla

(57) ABSTRACT

An aerodynamic control apparatus for an air vehicle improves various aerodynamic performance metrics by employing multiple spanwise flap segments that jointly form a continuous or a piecewise continuous trailing edge to minimize drag induced by lift or vortices. At least one of the multiple spanwise flap segments includes a variable camber flap subsystem having multiple chordwise flap segments that may be independently actuated. Some embodiments also employ a continuous leading edge slat system that includes multiple spanwise slat segments, each of which has one or more chordwise slat segment. A method and an apparatus for implementing active control of a wing shape are also described and include the determination of desired lift distribution to determine the improved aerodynamic deflection of the wings. Flap deflections are determined and control signals are generated to actively control the wing shape to approximate the desired deflection.

18 Claims, 39 Drawing Sheets

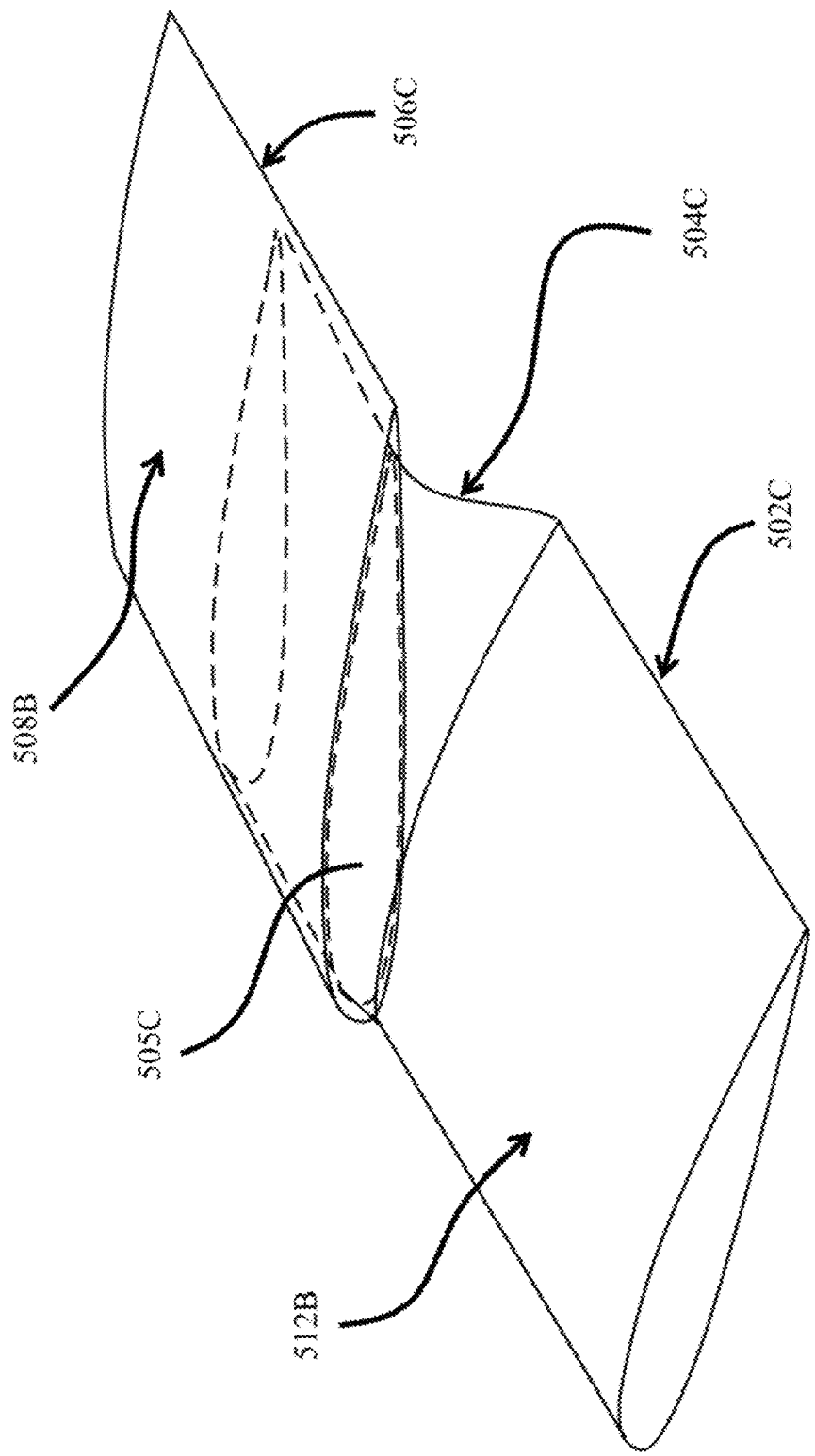

VARIABLE CAMBER CONTINUOUS AERODYNAMIC CONTROL SURFACES AND METHODS FOR ACTIVE WING SHAPING CONTROL

CROSS-REFERENCE TO RELATED APPLICATIONS

This patent application claims the benefit of U.S. provisional patent application 61/628,299, filed Oct. 7, 2011 and entitled "Elastically Shaped Future Air Vehicle Concept," which is incorporated by reference along with all other references cited in this application.

ORIGIN OF INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to the field of aeronautics and more specifically to enhancing the efficiency and performance of air vehicles.

The National Aeronautics and Space Administration or NASA is a United States government agency that is responsible for science and technology related to air and space. When NASA started in 1958, it began a program of human spaceflight. The Mercury, Gemini, and Apollo programs helped NASA learn about flying in space and resulted in the first human landing on the moon in 1969. NASA has helped develop and test a variety of cutting-edge aircraft. These aircraft include planes that have set new records. Among other benefits, these tests have helped engineers improve air transportation. NASA technology has contributed to many items used in everyday life, from smoke detectors to medical tests.

There is an increasing global awareness of greenhouse gas emission due to ever-increasing fossil fuel consumption in many sectors of the global economy. The transportation sector is one of leading contributors to the environmentally harmful emission and the escalating fuel consumption. Thus, it is realized that solutions to this global challenge must be developed through engineering innovations in all economic activities. To date, the ground transportation sector for consumers has witnessed many new energy-efficient technologies developed by the automotive industry, such as, hybrid vehicles and all-electric vehicles. In this same context for air transportation, NASA is taking a lead role in developing a "green" aviation initiative that seeks technology development for environmentally responsible future aviation systems to meet national and global challenges of improving aircraft fuel efficiency while reducing noise and emissions. NASA leadership in this area is important to maintain its preeminent heritage and future leadership in aeronautics.

Green aviation focuses on new aeronautic technologies that may potentially revolutionize aviation systems that may lead to improved aerodynamic efficiency, less fuel burn, and reduced noise and emissions. These important goals represent current challenges in the present aviation systems in response to the emerging needs for innovative aircraft design that may address future aviation systems. In the context of commercial aviation, civilian aircraft remains the largest U.S. export category ($9.4 billion, "U.S. Export Fact Sheet, March 2009).

Therefore, the increasing demand for fuel-efficient aircraft for global commerce prompts the aircraft industry to address improved fuel efficiency as a top national and global challenge. Air transportation is projected to increase rapidly in the future. As a major source of fossil fuel consumption, any small increase in aircraft's aerodynamic efficiency may translate into significant cost savings for the air transportation industry. Aerodynamic efficiency, which is defined as the ratio of lift to drag, is one of the most important considerations in aircraft design. To achieve aerodynamic efficiency, aircraft designers conduct detail aerodynamic design and analysis of the geometry of an aircraft in order maintain aircraft drag to a minimum.

Typically, a major source of aircraft drag is derived from the aircraft wing. In flight, the wing provides most of the lift force to balance the aircraft weight as it is airborne. As the wing generates lift, it also generates a source of drag known as induced drag. This drag source is dependent on the wing lift. A parabolic relationship between the wing lift coefficient $C_L$ and the drag coefficient $C_D$, also referred to as a drag polar, is usually employed in aerodynamic analysis as follows:

$$C_D = C_{D_0} + C_L^2 / \pi AR_\epsilon$$

The quantity $\epsilon$ is called the span (or Oswald's) efficiency factor. When the lift distribution is most optimal over a wing, this factor is equal to unity. When the wing lift is less than optimal, it is less than unity. A typical value may be between 0.8 and 0.9 for a very efficient wing design. Thus, aircraft drag may be reduced by having an aerodynamically efficient wing design with the span efficiency factor as close to unity as possible.

Yet, another indirect way of reducing drag is to reduce aircraft weight. As the aircraft weight is reduced, the wing lift is also reduced as the aircraft weight is always in balance with the wing lift in steady-state flight. The drag polar reveals that as the wing lift coefficient decreases, the drag coefficient also decreases quadratically. Modern aircraft is designed to achieve as much weight savings as possible in order to realize this important objective.

One aspect of weight savings is accomplished by employing lightweight advanced engineered materials in aircraft structures. An important aircraft structure is the aircraft wing. As a consequence of the use of lightweight materials in aircraft structure, aircraft wings become much more flexible. The main objective of a lightweight airframe design is to reduce the wing lift requirement which in turn reduces drag. However, as the aircraft wings become flexible, potential adverse impacts on aerodynamic efficiency may exist.

An aircraft wing is normally designed for optimal aerodynamic performance at only one point in a flight envelope by tailoring a wing lift distribution to achieve the best span efficiency possible. This design point is usually at the mid-point in a design cruise range, typically when the fuel stored inside aircraft wings is half-way spent. Due to the effect of aeroelasticity (structural interactions with aerodynamics), aircraft wings tend to deflect in flight by exhibiting a combined bending and twisting motion. If the wings become much more flexible due to the use of lightweight materials in the construction, the deflection may change the optimal wing shape which in turn changes the optimal wing lift distribution. Consequently, the span efficiency may decrease as the aircraft wings deflect significantly from the optimal wing shape at the design point. This reduction in span efficiency therefore causes an increase in drag which may potentially negate the original goal of employing lightweight airframe design for drag reduction.

Thus, it is realized that there is an unfulfilled need to have an ability to improve aerodynamic efficiency and reduce drag of aircraft due to non-optimal wing shape in flight. More specifically, when an aircraft's optimal wing shape is deviated from its design shape due to any reasons such as wing flexibility, or when an aircraft wing is not at its optimal aerodynamic performance such as high lift requirements at any point inside a flight envelope, what would be needed is an ability to alter the wing shape in a such a manner as to increase the aerodynamic efficiency and the aerodynamic performance at any point in a flight envelope. This ability would achieve a drag reduction objective while enabling aircraft wings to be adaptable to any given performance requirements throughout a flight envelope. Furthermore, this ability may be viewed a key enabling feature for lightweight airframe design, for otherwise the drag benefit of a lightweight airframe design could be significantly offset or completely nullified without this ability.

BRIEF SUMMARY OF THE INVENTION

Various embodiments are directed at addressing drag reduction of air vehicles through elastic wing shaping control to improve various performance metrics of air vehicles. The multidisciplinary nature of flight physics is appreciated with the recognition of the adverse effects of aeroelastic wing shape deflections on aerodynamic drag. By aeroelastically tailoring the wing shape with active control, a significant drag reduction benefit may be realized.

To realize the potential of the elastic wing shaping control, some embodiments achieve the performance metrics improvement goal through a new type of aerodynamic control surfaces. Some embodiments achieve the performance metrics improvement goals by utilizing a multi-camber flap system that comprises one or more spanwise flap segments for each wing of an aircraft, and each of the one or more flap segments comprises multiple chordwise segments (e.g., at least two chordwise segments), each of which may be actuated independently of the others to accommodate various configurations for different maneuvers such as increased wing area for takeoff and climbing, increased lift for landing, increased aerodynamic efficiency during cruise or descent, increased drag and reduced lift for aerodynamic braking, and others.

In some of these embodiments where multiple flap segments (e.g., at least two chordwise flap segments) are employed for each wing of an aircraft, at least one of these multiple flap segments may also be independently actuated. It shall be noted that although the term "flap" is referred to in some embodiments, a substantially similar mechanism may also be employed for the slat system (or leading edge slat system) that comprises one or more aerodynamic surfaces on the leading edge of the wings of an aircraft to allow for a higher lift coefficient ($C_L$) by allowing the wings to operate at a higher angle of attack or by allowing the aircraft to fly at a slower speed at the same angle of attack. Similarly, a substantially similar mechanism may also be employed for the spoiler system, the elevator system, the ailerons, rudder(s), or other control surfaces of an air vehicle in some embodiments. Therefore, unless otherwise specified or claimed, this application may refer to any of such control surfaces when using the term "flap" throughout the entire application.

Some embodiments achieve the performance metrics improvement goal by employing a continuous trailing edge flap system. In these embodiments, the continuous trailing edge flap system comprises multiple segments of flaps along each wing of an aircraft: at least one of the multiple segments of the flaps may be independently actuated. Nonetheless, the trailing edge of the multiple segments of the flaps form a continuous trailing edge to prevent or delay, for example, vortex generation due to flow separation, even without the use of vortex generators in some embodiments.

In some embodiments, the continuous trailing edge does not necessarily imply any order of the derivatives of the function of the trailing edge in terms of deflections is another continuous function. Rather, the continuous trailing edge is defined in a manner such that the value (e.g., the deflection at a point along the trailing edge of a flap segment) of the function of the trailing edge does not exhibit a substantial discontinuity or a physical separation between the flap segments at the trailing edge.

In some embodiments, the continuous trailing edge flap system may comprise a piecewise continuous function $\delta = f(x)$, where x denotes a location of a point along the trailing edge of a flap system, and $\delta$ denotes the deflection in the flapwise direction (e.g., gravity direction) where a small change in x corresponds to a small change in $\delta$. It shall be noted that the terms "continuous" and "piecewise continuous" do not necessarily refer to their respective rigorous mathematical definitions due to, for example, allowances and tolerances in mechanical design or manufacturing.

Some embodiments may also employ a substantially similar mechanism for the leading edge slat system. In these embodiments, the substantially similar mechanism may be more correctly termed as the "continuous leading edge slat system." Nonetheless, unless otherwise specified or claimed, this application may refer to any of such control surfaces when using the term "flap" and thus the "continuous trailing edge flap system" throughout the entire application.

Some embodiments achieve the performance metrics improvement by adopting both the variable camber flap system and the continuous trailing edge flap system.

Some embodiments are directed at controlling the multi-camber flap system or the continuous trailing edge flap system, which may not be controlled in a conventional way. An air vehicle controller specifies inputs to the flap system. For a conventional multi-flap approach, each of the multiple flaps is actuated independently, and thus the input to each of the multiple flaps is also independent. For example, the air vehicle controller may use a simplified formula, $\dot{x} = Ax + Bu$, where u denotes the amount of deflection of a flap segment, for controlling the air vehicle.

Nonetheless, such a conventional control scheme may not function properly for some embodiments that comprise the continuous trailing edge flap system where each of the multiple flap segments, although independently actuated, may not be entirely independent of its neighboring flap segment(s) in some embodiments due to the formation of the continuous trailing edge. In these embodiments, the controller may receive a mathematical series expansion (e.g., a Fourier series) or a n-th order polynomial (e.g., a fifth-order polynomial), and so forth, that approximates the deflection of the multiple flap segments and issues the corresponding control signals based at least in part upon the series expansion, the n-th order polynomial, and so forth, of the deflection of the multiple flap segments. These control signals may be mathematical parameters or coefficients that describe the series expansion, the n-th order polynomial, or the like, from which the physical deflection of the multiple flap segments may be reconstructed.

In addition or in the alternative, some embodiments may further optimize or improve the multi-camber flap system, the continuous trailing edge flap system, or a combination of both the multi-camber flap system and the continuous trailing edge flap system at one or more points within the flight envelope and determine the desired deflections of the flap system based on the optimal or improved wing deflection when the pilot of an air vehicle attempts to perform certain maneuvers at or near these points within the flight envelope to maintain an optimal or nearly optimal capability of the air vehicle.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 5D shows more details of two spanwise segments of the continuous trailing edge flaps actuated at different angles with an intermediate junction system to reduce separation of the trailing edges of the two spanwise flap segments.

DETAILED DESCRIPTION OF THE INVENTION

Figure 1A:
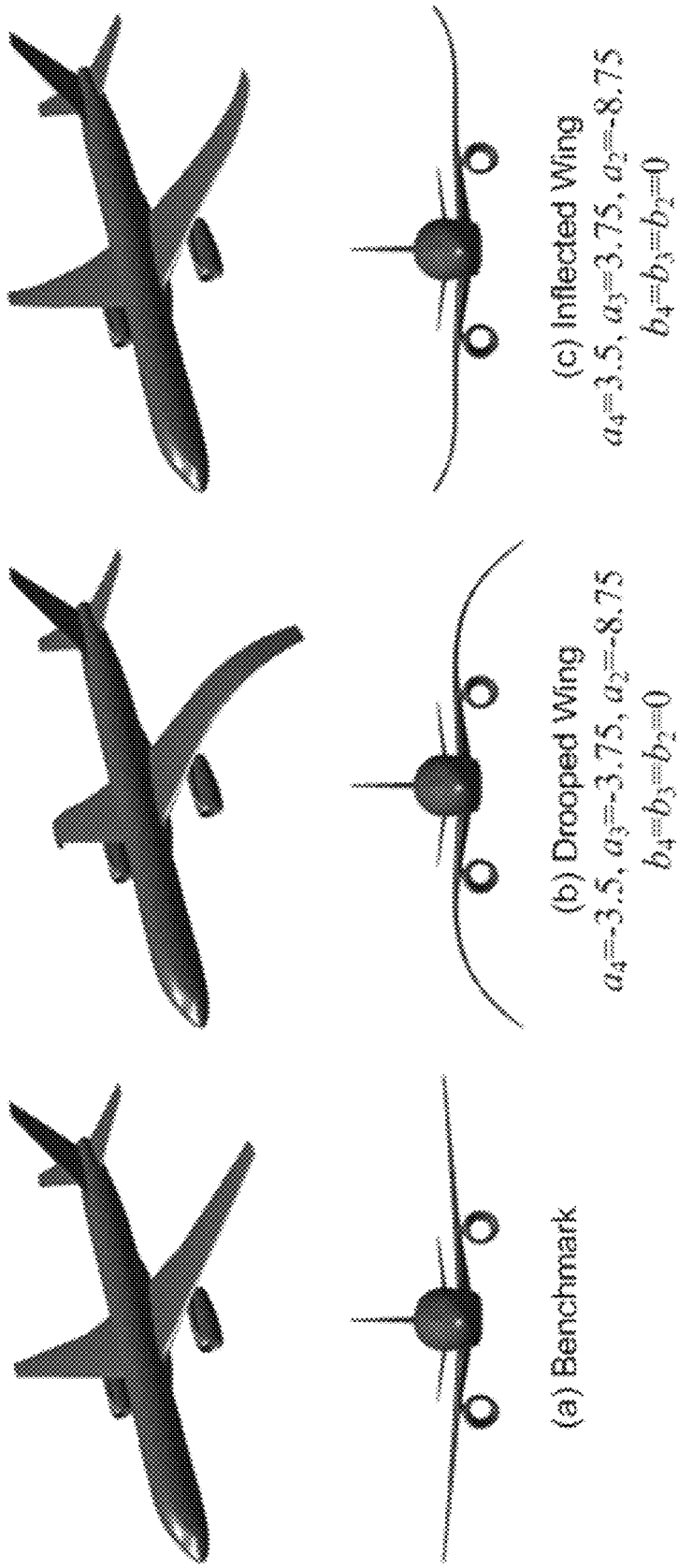
FIG. 1A shows deformed wing geometries under some prescribed bending deflections in some embodiments.

The "variable camber continuous aerodynamic control surfaces and methods for active wing shaping control" represent an innovative approach that helps realize the goal of drag reduction that may directly address the global challenge of improving aircraft fuel efficiency. This concept of "variable camber continuous aerodynamic control surfaces and methods for active wing shaping control" is a significant departure from a conventional design, but is firmly grounded in science, thus making it a revolutionized, yet realizable concept. Air vehicles are typically designed to maintain sufficient structural rigidity for safe load-carrying capacity. Moreover, the "variable camber continuous aerodynamic control surfaces and methods for active wing shaping control" provide a new capability to fully reconfigure a conventional fixed-geometry wing to enable such a wing equipped with the said variable camber continuous aerodynamic control surfaces to be aerodynamically and elastically adaptable to any flight performance requirements within the flight envelope.

Modern engineered materials such as composites have begun to appear in new airframe designs that may provide less structural rigidity while maintaining the same load-carrying capacity. Thus, there is a realization that future air vehicle concepts may be developed to take advantage of the structural flexibility afforded by modern engineered materials to improve aerodynamic efficiency. It shall be noted that although various embodiments described herein refers to an airplane, the reference and use of an airplane in the exemplary implementations or embodiments shall not be considered as limiting the scope of the claims or the scope of the invention. In other words, these embodiments apply to any air vehicle with one or more control surfaces, manned or unmanned, that operate exclusively or nonexclusively in Earth's atmosphere or some environment with some gaseous or liquid fluid.

Elastically shaped air vehicle is a concept whereby highly flexible aerodynamic surfaces are elastically shaped in-flight by actively controlling the wing wash-out twist and wing bending deflection in order to change the local angle of attack in such a manner that may result in lower fuel burn by drag reduction during cruise and enhanced performance during take-off and landing by increasing lift. Moreover, structural flexibility will be leveraged to realize a revolutionary, optimal wing shape design that may accommodate a significant curvature for drag reduction benefits as opposed to a conventional straight wing design in the spanwise direction.

Elastically shaped air vehicle, therefore, may be viewed as a biologically-inspired concept that may potentially revolutionize the conventional airframe design. Taking a cue from birds' efficient shape-changing wings, this concept may be able to bring future air vehicle concepts to the next level in terms of performance, efficiency, and maneuverability. Various embodiments conduct a multidisciplinary design, analysis, and optimization to examine the potential benefits of the elastically shaped future air vehicle with "variable camber continuous aerodynamic control surfaces and methods for active wing shaping control" over a conventional vehicle design. The major sections of these embodiments are:

1. Vehicle conceptual design and optimization: A futuristic elastically shaped wing superimposed on an available commercial transport fuselage is designed using aeroelasticity theory and vortex-lattice aerodynamic code. Optimization is conducted to identify an optimal shape defined by the varying curvature and wash-out twist of the elastic wing that minimizes induced drag or maximizes lift-to-drag ratio, hence aircraft range. A comparative study of the fuel savings is made using available performance data for a representative commercial transport and engines.

2. Aeroelastic flight dynamic modeling: A static and dynamic aeroservoelastic model of the elastically shaped wing is developed in conjunction with a flight dynamic model for analyzing aerodynamics, stability, and control of the elastically shaped air vehicle.

3. Elastically wing shaping actuation design: A low drag distributed actuation concept is developed to size and strategically place new aerodynamic surfaces throughout the elastically shaped wing. The distributed control surfaces are used to actively shape the elastic wing to gain aerodynamic efficiency. Commercially available sensor technologies for shape measurement are leveraged for elastically wing shaping control in some embodiments.

4. Flight control design and vehicle simulation: A multi-objective flight control system is developed to simultaneously gain aerodynamic efficiency and maintain traditional pilot command-tracking tasks for guidance and navigation. A guidance law to achieve a low drag objective is developed for a cruise phase to specify both the desired drag and vehicle attitude objectives for flight control performance. Multi-objective drag-cognizant optimal control is also introduced for flight control design. A complete vehicle control simulation is performed using mathematical, numerical, and physical modeling.

Figure 2:
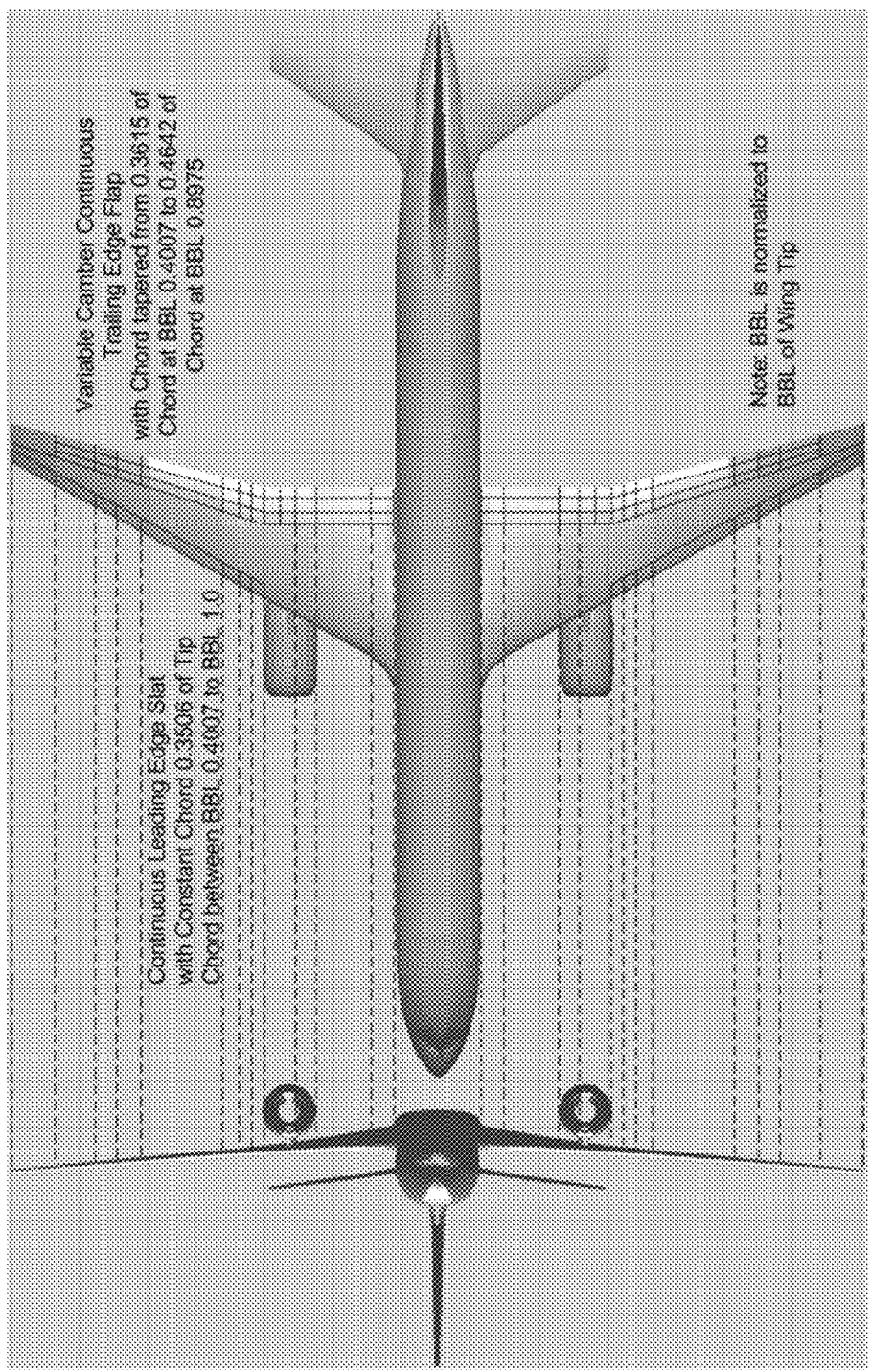
FIG. 2 shows an embodiment of the continuous flap and slat system.

It shall be noted that certain assumptions are made in some of the simulations described below. Nonetheless, all of the assumptions are made for the mere purpose of simplifying the simulation models without violating or even compromising any laws of nature. For example, the shape functions of the wings as given by equations (2.10) and (2.11) are assumed to be some polynomial forms without accounting for the detailed geometries for, for example, the junction areas where one spanwise flap segment meets its neighboring spanwise flap segment. As another example, the continuous flap and slat configurations of the aircraft shown in FIG. 2 are also modeled geometrically without considering the junction areas between two adjacent spanwise flap segments to simplify the simulation models.

It shall be noted that these geometric details may be faithfully modeled for the simulation models to produce more realistic results despite the high computational cost, and that the level of details in the modeling is within the general knowledge of one of ordinary skill in the art.

Various embodiments achieve the performance metrics improvement goals by employing the "variable camber continuous aerodynamic control surfaces and methods for active wing shaping control". These embodiments describe a multi-camber flap system that comprises one or more spanwise flap segments for each wing of an aircraft, and each of the one or more flap segments comprises multiple chordwise segments (e.g., at least two chordwise segments), each of which may be actuated inter-dependently of the others by a specified relative actuation command (for example, they may be actuated by equal relative deflection commands for all chordwise segments from a single flap command to create a circular-arc camber), or independently of the others to accommodate various configurations for different maneuvers such as increased wing area for takeoff and climbing, increased lift for landing, increased aerodynamic efficiency during cruise or descent, increased drag and reduced lift for aerodynamic braking, and the like.

In some of these embodiments where multiple chordwise flap segments (e.g., at least two chordwise flap segments) are employed for each wing of an aircraft, at least one of these chordwise multiple flap segments may also be inter-dependently or independently actuated to achieve various intended purposes.

It shall be noted that although some embodiments use the term "flap," a substantially similar mechanism may also be employed for the slat system (or leading edge slat system) that comprises one or more aerodynamic surfaces on the leading edge of the wings of an aircraft to allow for a higher lift coefficient ($C_L$) by allowing the wings to operate at a higher angle of attack or by allowing the aircraft to fly at a slower speed at the same angle of attack. Similarly, a substantially similar mechanism may also be employed for the spoiler system, the elevator system, the ailerons, rudder(s), or other control surfaces of an air vehicle in some embodiments. Therefore, unless otherwise specified or claimed, this application may refer to any of such control surfaces when using the term "flap" or "multi-segment flap" throughout the entire application.

In various embodiments, a wing includes a structural member, which is either an integral part or an appendage of an air vehicle, having one or more surfaces that jointly produce lift for flight or propulsion through atmosphere or through some gaseous or liquid fluid. In some embodiments, a multi-segment flap may be attached to and forms a smaller portion of a wing. In various embodiments, a multi-segment flap may occupy certain percentage of the area of a wing, whereby the percentage may be any positive number smaller than or equal to 100 percent. In some embodiments where the multi-flap system occupies 100 percent or substantially the entire area of the wing, the multi-segment flap may be independently and individually or in group(s) controlled to function as both the slat(s) along the leading edge as well as the flap(s) along the trailing edge.

It shall be noted that the multi-segment flap may occupy substantially but not necessarily the entire area of the wing due to design choices such as how the multi-segment flap is attached to the air vehicle in some embodiments. It shall also be noted that the multi-segment flap may occupy substantially but not necessarily the entire area of the wing due to some design choices of whether or not the flap portion or the slat portion is extending through the entire span of a wing, especially at the location where the wing joins the air vehicle or at the wing tip.

Some embodiments achieve the performance metrics improvement goal by employing a continuous trailing edge flap system. In these embodiments, the continuous trailing edge flap system comprises multiple spanwise segments of flaps along each wing of an air vehicle; at least one of the multiple spanwise segments of the flaps may be independently actuated. Nonetheless, the trailing edge of the multiple segments of the flaps form a continuous trailing edge to prevent or delay, for example, vortex generation due to flow separation, even without the use of vortex generators in some embodiments.

In some embodiments, the continuous trailing edge does not necessarily imply any order of the derivatives of the function of the trailing edge in terms of deflections is another continuous function in a mathematical sense. Rather, the continuous trailing edge is defined in a manner such that the value (e.g., the deflection at a point along the trailing edge of a flap segment) of the function of the trailing edge does not exhibit a substantial discontinuity or a physical separation between the flap segments at the trailing edge. In some embodiments, a continuous trailing edge refers to a trailing edge that is not only continuous along each spanwise flap segment but also exhibits continuity between one end of a spanwise flap segment and the neighboring end of a neighboring flap segment, rather than having the two neighboring spanwise flap segments moving completely independently of each other while leaving the space between the two neighboring flap segments unattended for and thus creating some discontinuity and physical separation between the two neighboring flap segments along nearly their entire chordwise lengths (possibly with the only exceptions at the linkage point(s) for these two flap segments) when these two neighboring flap segments exhibit different amounts of deflections with respect to their respective linkage point(s).

It shall be noted that such continuity between two neighboring ends of two spanwise flap segments does not necessarily extend throughout the entire length of at least one of the two neighboring spanwise flap segments in the chordwise direction in some embodiments due to design and manufacturing requirements or limitations, although an ideal continuous trailing edge exhibits continuity along the entire length of each flap segment in its chordwise direction. Similarly, a continuous leading edge refers to a leading edge that is not only continuous along each spanwise slat segment but also exhibits continuity between one end of a spanwise slat segment and the neighboring end of a neighboring slat segment, rather than having the two neighboring spanwise slat segments moving completely independently of each other while leaving the space between the two neighboring slat segments unattended for when these two neighboring slat segments exhibit different amounts of deflections. The continuous trailing edge and the continuous leading edge will be described in greater details in subsequent paragraphs.

In some embodiments, the continuous trailing edge flap system may comprise a piecewise continuous function $\delta = f(x)$, where x denotes a location of a point along the trailing edge of a flap system, and $\delta$ denotes the deflection in the flapwise direction (e.g., gravity direction) where a small change in x corresponds to a small change in $\delta$. A piecewise continuous trailing edge indicates that the trailing edge is continuous on all but a finite number of points (e.g., at a point (or a space of finite dimensions) where a spanwise flap segment meets its neighboring spanwise flap segment) at which certain matching conditions may be required. It shall be noted that the terms "continuous" and "piecewise continuous" do not necessarily refer to their respective rigorous mathematical definitions due to, for example, allowances and tolerances in mechanical design or manufacturing. In some embodiments, a piecewise continuous trailing edge represents a trailing edge that not only is continuous within each spanwise flap segments but also exhibits continuity between two neighboring spanwise flap segments, although such continuity may not extend all the way along the entire length of at least one of the spanwise flap segment along the chordwise direction. The continuous and piecewise continuous trailing edge (or similarly, leading edge) will be described in greater details in subsequent paragraphs.

Some embodiments may also employ a substantially similar mechanism for the leading edge slat system. In these embodiments, the substantially similar mechanism may be more correctly termed as the "continuous leading edge slat system." Nonetheless, unless otherwise specified or claimed, this application may refer to any of such control surfaces when using the term "flap" and thus the "continuous trailing edge flap system" throughout the entire application.

Some embodiments achieve the performance metrics improvement by employing both the variable camber flap system and the continuous trailing edge flap system (and/or the continuous leading edge slat system.) As shown in some of the numerical results presented in subsequent sections, the variable camber continuous trailing edge flap system provides a substantial drag reduction over a conventional simple or discrete flap system. Aerodynamic simulations also show that a drag reduction of over 50 percent may be achieved with the variable camber continuous trailing edge flap system (and/or a continuous leading edge slat system) over a conventional discrete flap system in some exemplary embodiments. Moreover, elastic wing shaping control is also realized with low drag aerodynamic control surfaces such as this flap and slat implementation.

Some embodiments are directed at controlling the multi-camber flap system or the continuous trailing edge flap system, which may not be controlled in a conventional way. An air vehicle controller specifies inputs to the flap system such that the air vehicle may perform the desired maneuvers. For a conventional multi-flap approach, each of the multiple flaps is actuated independently, and thus the input to each of the multiple flaps is also independent.

For example, the air vehicle controller may use a simplified formula, $\dot{x}=Ax+Bu$, where u denotes the amount of deflection of a flap segment, for controlling the air vehicle. Nonetheless, such a conventional control scheme may not function properly for some embodiments that comprise the continuous trailing edge flap system where each of the multiple flap segments, although independently actuated, may not be entirely independent of its neighboring flap segment(s) in some embodiments due to the formation of the continuous trailing edge. In these embodiments, the controller may receive a mathematical series expansion (e.g., a Fourier series) or a n-th order polynomial (e.g., a fifth-order polynomial), and so forth, that approximates the deflection of the multiple flap segments and issues the corresponding control signals based at least in part upon the series expansion, the n-th order polynomial, and so forth, of the deflection of the multiple flap segments. These control signals may be mathematical parameters or coefficients that describe the series expansion, the n-th order polynomial, or the like, from which the physical deflection of the multiple flap segments may be reconstructed.

In addition or in the alternative, some embodiments may further optimize of improve the multi-camber flap system, the continuous trailing edge flap system, or a combination of both the multi-camber flap system and the continuous trailing edge flap system at one or more points within the flight envelope and determine the desired deflections of the flap system based on the optimal or improved wing deflection when the pilot of an air vehicle attempts to perform certain maneuvers at or near these points within the flight envelope to maintain an optimal or nearly optimal capability of the air vehicle.

Automated Vehicle Geometry Modeling Tool is an enabling method based on which elastic wing shapes may be designed by optimization. Aircraft configuration optimization requires an efficient way to generate new vehicle configurations during the optimization. An automated vehicle geometry modeling tool has been developed specifically for the optimization in some embodiments. The vehicle geometry modeler directly outputs a geometry inputs file that may be read by an aerodynamic analysis code during the optimization. The vehicle geometry modeler has access to the outer mold line geometry information of a typical transport aircraft.

The coordinate reference frame $(x_v, y_v, z_v)$ defines the coordinate system used in the vehicle geometry model. Wing chordwise and flapwise bending deflection shapes and a twist distribution are superimposed on top of the wing geometry as shown in FIG. 1B. It shall be noted that FIG. 1B also illustrates the chordwise direction, the spanwise direction for the flaps, the spanwise direction for the slats, the twist direction, and the flapwise direction. A new wing geometry is generated by performing successive coordinate translation and rotation. The order of the coordinate transformation is important. To reduce the exposed area of the wing due to twist which may affect drag, the order of the coordinate transformation is as follows:

1. A coordinate rotation to account for twist is performed first by rotating a baseline wing section about its area center by a specified twist and angle at a given $y_v$-coordinate. The transformation coordinates due to twist are computed as $$x'_v = \bar{x} + (x_v - \bar{x})\cos\theta(y_v) - (z_v - \bar{z})\sin\theta(y_v) \quad (2.3)$$

$$x'_v = \bar{x} + (x_v - \bar{x})\cos\theta(y_v) - (z_v - \bar{z})\sin\theta(y_v) \quad (2.4)$$

where θ is the twist angle, positive nose-down and negative nose-up.

2. A coordinate translation in the $x_v$-direction to account for chordwise bending is performed next by translating the previously transformed $x_v$-coordinate by a specified chordwise bending deflection at a given $y_v$-coordinate. The transformed coordinates due to chordwise bending are computed as $$x_v'' = x_v' + V(y_v) \quad (2.5)$$

$$z_v'' = z_v' \quad (2.6)$$

where V is the chordwise bending deflection, positive swept back and negative swept forward.

3. Finally, a coordinate translation in the $z_v$-direction to account for flapwise bending is performed by translating the previously transformed $z_v''$ by a specified flapwise bending deflection at a given $y_v$-coordinate. The transformed coordinates due to flapwise bending are computed as $$x_v''' = x_v'' \quad (2.7)$$

$$z_v''' = z_v'' + W(y_v) \quad (2.8)$$

where W is the flapwise bending deflection, positive up and negative down.

It is noted that the coordinate transformation may be made to be or not to be length-preserving in these examples. If the transformation is not length-preserving, then as the curvature increases, the wing span also increases. The increase in the wing span may be computed as $$\Delta b = 2 \int_{y_r}^{y_v} \left( \sqrt{1 + [V'(yv)]^2 + [W'(yv)]^2} - 1 \right) dy \approx \int_{y_r}^{y_z} \{[v'(yv)]^2 + [w'(yv)]^2\} dy \quad (2.9)$$

The engine geometry and the pylon geometry may also be affected by the coordinate transformation of the wing geometry. Thus, coordinate transformations of the engine geometry and the pylon geometry are also performed in order to keep the relative positions of the engines and pylons with respect to the wing geometry the same at the engine mount locations on the wings. The vehicle geometry may also include the following additional features:

1. A "squashed" fuselage geometry may be modeled by scaling the $y_v$- and $z_v$-coordinates of the fuselage by specified scaling factors. The squashed fuselage concept is of particular interest, since it may provide an additional lift contribution derived from the fuselage itself. As a result, the wing lift is reduced that results in lower lift-induced drag. 2. A "high-wing" geometry allows the wing position to be placed above the fuselage centerline. The majority of commercial aircraft are of low-wing configurations which provides added roll stability with a positive wing dihedral. Many military transports such as Lockheed C-5 Galaxy are designed with a high-wing configuration.

3. A "V-tail" geometry is available that allows the V-tails to serve as both directional stabilizer and horizontal stabilizer. This may be an advantage if the wing curvature is significant that may also contribute to the directional stability, thereby allowing the vertical tail to be eliminated for weight savings.

4. A new type of low-drag variable camber continuous trailing edge flap system is also included in the vehicle geometry model. The benefit of drag reduction due to this type of flap concepts will be described in great detail in subsequent paragraphs.

The ability of the geometric modeler to superimpose bending deflection shapes and twist on a rigid wing shape provides a design and analysis capability for developing a coupled aeroelastic-aerodynamic modeling tool by coupling an aerodynamic code with a structural analysis code that computes bending deflection shapes and twist.

Vehicle Design Optimization Approach is a computational method for identifying optimal elastic wing shapes for drag reduction. The aerodynamic optimization is conducted to develop candidate elastically shaped air vehicles that achieve lower drag than that of a conventional vehicle. One of the objectives of the design optimization is a new elastic wing geometry that replaces the conventional wing of a benchmark vehicle as shown in (a) of FIG. 1A. Any potential benefit of other geometric features such as squashed fuselage or V-tail may also be added to the new wing geometry.

Given that the use of modern light weight composites materials is becoming more prevalent in modern aircraft due to the benefit of weight savings while providing sufficient load carrying capacities, the conventional straight wing design may give way to a new type of wing that may include significant curvatures and flexibility that may be tailored for improved aerodynamic efficiency. Thus, one of the objectives of the optimization is to allow each wing section to possess all three degrees of freedom in chordwise displacement, flapwise displacement, and twist. These three degrees of freedom may then become the design variables in the optimization. A simpler approach is presented in the interest of time and for the ease of explanations and illustrations. This simpler approach parameterizes the wing degrees of freedom by using assumed shape functions with unknown coefficients.

In particular, each shape function may be described by a fourth-degree polynomial with five unknown coefficients or design variables. Moreover, the wing sections inboard of the normalized BBL (Body Butt Line normalized to the BBL of the wing tip) 0.3477 at the engine station are assumed to be unaffected for simplicity due to the large structural stiffness near the wing root that may present a challenge to shape a wing. Thus, the shape function starts at the normalized BBL 0.3477. Furthermore, the displacement and slope of the shape function are enforced to be zero at this location. This enforcement reduces the number of design variables from five to three. A further simplification may be made by eliminating the chordwise displacement components in a particular design where chordwise wing shape may not offer a significant performance advantage. Thus, the shape functions are given by $$W(yv) = \begin{cases} a_4\left(\frac{y_v - y_e}{y_t - y_r}\right)^4 + a_3\left(\frac{y_v - y_e}{y_t - y_r}\right)^3 + a_2\left(\frac{y_v - y_e}{y_t - y_r}\right)^2 & y_t \leq y_v < y_e \\ 0 & y_v \leq y_e \end{cases} \quad (2.10)$$

$$\Theta(yv) = \begin{cases} b_4\left(\frac{y_v - y_e}{y_t - y_r}\right)^4 + b_3\left(\frac{y_v - y_e}{y_t - y_r}\right)^3 + b_2\left(\frac{y_v - y_e}{y_t - y_3}\right)^2 & y_t \leq yv < y_e \\ 0 & y_v \leq y_e \end{cases} \quad (2.11)$$

where $y_e$ is the BBL of the engine station and $y_t$ is the BBL of the wing tip.

The shape function optimization thus becomes a parametric optimization where the design variables are $a_i$ and $b_i$, i=2, 3, 4. Upper and lower limits on the shape functions are imposed as constraints on the flapwise bending displacement and twist at the wing tip such that $$|W(y_t)| = |a_4 + a_3 + a_2| \leq W_{t,max} \quad (2.12)$$

$$|\Theta(y_t)| = |b_4 + b_3 + b_2| \leq \theta_{t,max} \quad (2.13)$$

where $W_{t,max}$ is the maximum allowable flapwise bending displacement and $\theta_{t,max}$ is the maximum allowable twist at the wing tip. Be it for example only, a value $W_{t,max}=0.3219$ of the BBL of the wing tip and $\theta_{t,max}=4.5$ deg. may be chosen for a particular design optimization.

It shall be noted that the particular fourth-degree polynomial shape function is one possible candidate shape function chosen for a particular design optimization. Other candidate shape functions that are equally applicable to any general design optimization could be any mathematically smooth functions such as Fourier sine series, or higher degree polynomials.

Moreover, an additional constraint is imposed on the optimization and that is the cruise condition. For a given vehicle weight flying at a given airspeed and altitude, there corresponds a lift coefficient that the vehicle must operate at. Thus, the cruise condition is expressed as $$C_L = \frac{W}{q_\infty S} \quad (2.14)$$

Figure 1B:
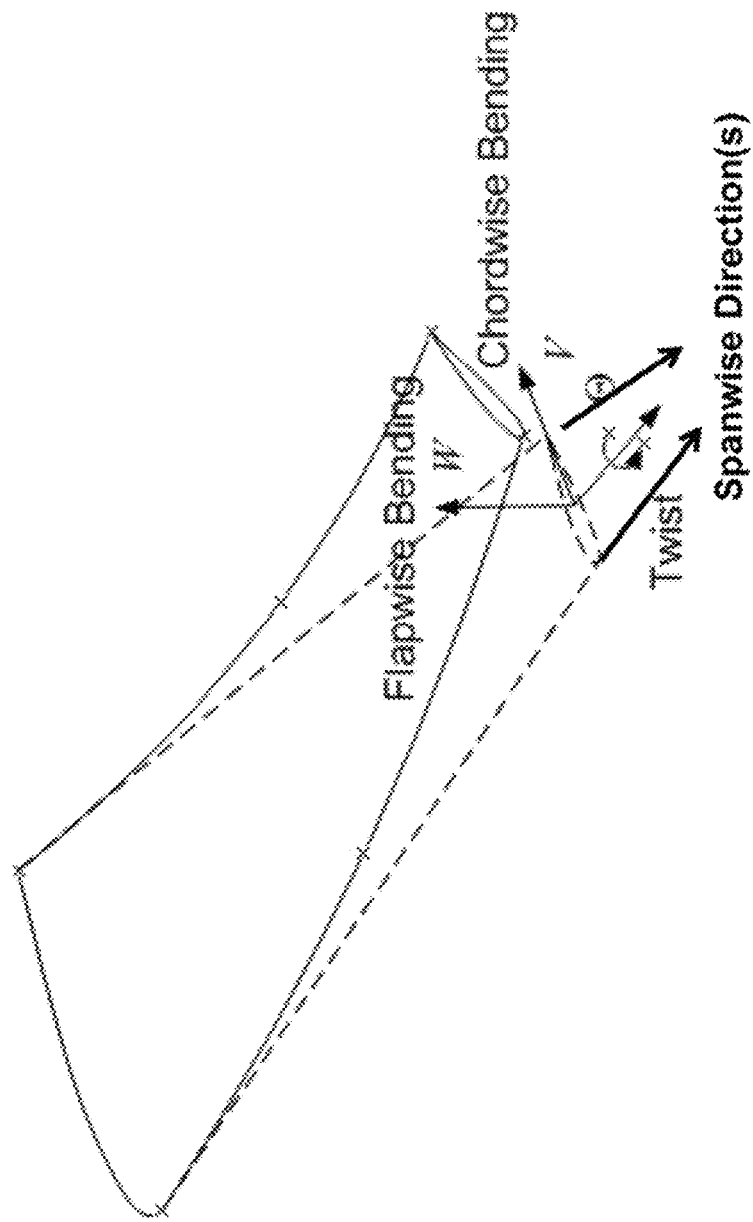
FIG. 1B shows the notations of wing bending, deflections, and twist.
Figure 1D:
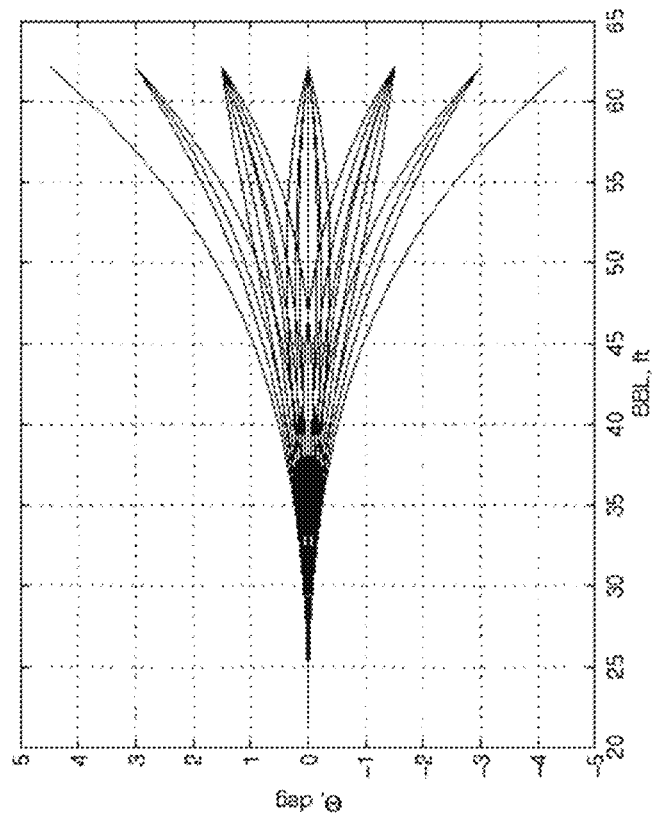
FIG. 1D shows an exemplary wing torsion shape function in some embodiments.

The design point for the benchmark aircraft as shown in FIG. 1A-(a) is selected for an operating weight of W=200,000 pounds, cruise speed of $M_\infty=0.8$, and cruise altitude at 30,000 feet. The design cruise lift coefficient is $C_L=0.364$. This design lift coefficient is enforced during the optimization. The optimization is conducted using a sampling method over a chosen design space. The design space is chosen such that each design variable $a_i$ and $b_i$, i=2, 3, 4, may take on any one of three preselected values as shown in Table 1 such that the wing tip constraints are satisfied. This is a sample of 729 possible shape functions or design points, which is fairly limited due to the time constraint. All the possible shape functions are plotted in FIGS. 1C and 1D.

TABLE 1

Design Space for Parametric Optimization

| $a_4$ | $a_3$ | $a_2$ | $b_4$ | $b_3$ | $b_2$ |
| --- | --- | --- | --- | --- | --- |
| 0, ± 7.5 | 0, ± 3.75 | 0, ± 8.75 | 0, ± 1.5 | 0, ± 1.5 | 0, ± 1.5 |

To implement the optimization, a computer code is developed to couple the vehicle geometry modeler with an aerodynamic code. Each design point is evaluated with a different combination of the parameters $a_i$ and $b_i$, i=2, 3, 4.

Figure 1C:
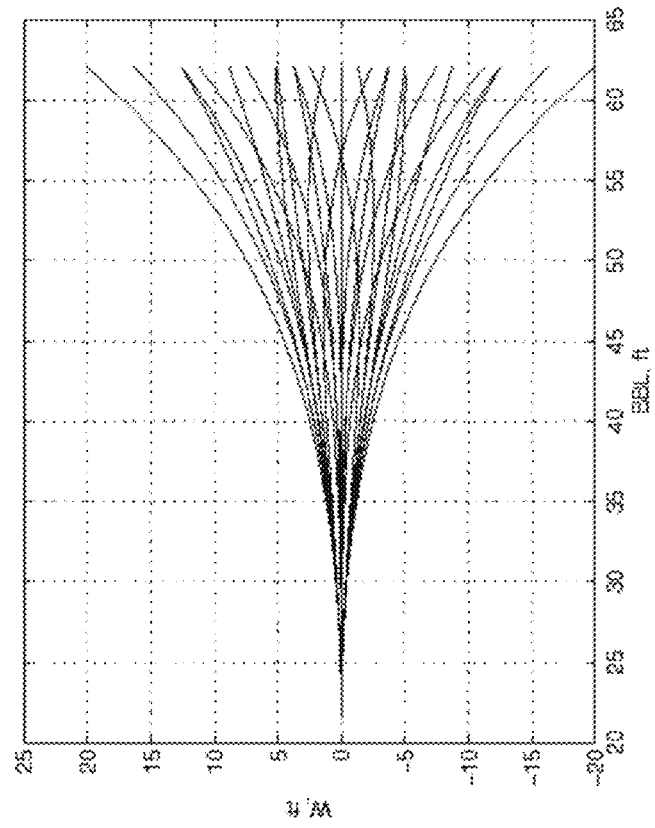
FIG. 1C shows an exemplary wing bending shape function in some embodiments.

The design optimization approach as taught by the present invention may result in a number of possible elastic wing shapes. One such wing shape is a drooped wing shape which can offer a significant drag reduction benefit over a conventional straight wing. A drooped-wing aircraft is illustrated in FIG. 1A-(b). Yet, another possible elastic wing shape is an inflected wing shape as illustrated in FIG. 1A-(c). Other elastic wing shapes may also be realized by a particular design optimization.

Elastic Wing Shaping Control Actuation is an enabling feature of the present invention whereby the elastic wing of an aircraft may be actively shaped in-flight to achieve a drag reduction objective or a performance requirement such as high-lift requirement as dictated by a mission need in the flight envelope.

A drooped-wing aircraft as shown in configuration (b) in FIG. 1 is selected for the active wing shaping control design only for illustration because this configuration provides the best induced drag reduction among the models as shown in FIG. 1A during simulations. In some embodiments, other wing shapes including a conventional straight wing with sufficient elasticity may be actively controlled to maintain the best cruise efficiency. An exemplary operation is listed as follows:

1. The design point for wing shaping control actuator requirements may be defined to be at the half way point of cruise at 30,000 feet corresponding to an aircraft weight of 175,000 pounds with 50 percent fuel in the tank.

2. The active wing shaping control actuator may comprise a series of variable camber continuous leading edge slats and trailing edge flaps in this example.

3. The wing shape at the design point corresponds to the optimal drooped-wing shape in some embodiments. For example, the as-built wing shape may be the optimal drooped wing shape minus the differential bending and, torsional deflections at 1 g (g-force) loading at the design point. Under the 1 g loading at cruise, the wing shape is aerodynamically loaded and deflected into the optimal drooped-wing shape with no flap or slat deflection.

4. At the start of cruise, the aircraft weight is assumed to be 190,000 pounds with 80 percent fuel in the tank in these examples. This configuration corresponds to a higher wing loading that may cause the wing shape to move up from the optimal drooped wing shape. Active wing shaping control flaps and slats may thus be deployed to bring the wing shape back to the optimal drooped wing shape. This may result in a lower wing loading that may cause the aircraft to decrease in altitude.

5. At the end of cruise, the aircraft weight is assumed to be 160,000 pounds with 20 percent fuel in the tank in these examples. This corresponds to a lower wing loading that causes the wing shape to move down from the optimal drooped wing shape. Active wing shaping control flaps and slats may then be deployed to bring the wing shape back to the optimal drooped wing shape. This may also result in a higher wing loading that may cause the aircraft to increase in altitude.

Two wing shaping control actuator mechanisms are considered in these embodiments: a conventional flap mechanism in some embodiments referred to as baseline flap and slat systems, and a novel variable camber continuous trailing edge flap mechanism in some other embodiments.

For the baseline flap and slat layout, the flap and slat systems for active wing shaping control are based on a conventional simple flap design. A candidate flap and slat layout is as shown in FIG. 2. There are 6 flaps and slats on each wing that may be actuated independently to provide necessary control forces and moments to actively shape the aircraft wings. They are numbered from 1 to 6 from outboard to inboard. The outboard flaps may be configured as ailerons for roll control as needed. The slats have constant chords of 0.3506 of the chord at the wing tip that span from the normalized BBL 0.4233 to the normalized BBL 1.0 at the wing tip. The flaps have linearly tapered chords from 0.3615 of the wing chord at BBL 0.4007 to 0.5259 of the wing chord at BBL 1.0. The flap drive systems are sized to provide sufficient flap deflection travel and be fast enough for feedback control. It shall be noted that a smaller slat chord and flap chord may be employed as needed to prevent any possible interference with the wing box structure.

Flap and slat deflection requirements are sized to provide sufficient forces and moments to actively shape an aircraft wing. The flap and slat systems are designed to provide sufficient aeroelastic forces and moments to change the wing shape in-flight. The flap and slat deflections may be proportional to the aeroelastic deflections between the optimal drooped wing shape and the operating wing shape in some embodiments. It shall be noted that the same approach may also apply to other wing shapes with full, equal effects. The requirements for the flap and slat deflections may be established by the differences between the wing shapes at the start and end of cruise and the optimal drooped wing shape at the half way point of cruise in some embodiments where minimizing fuel consumption is one of the primary objectives.

It shall also be noted that other requirements for the flap and slat deflections may also be similarly established to improve or optimize other performance aspects of an air vehicle (e.g., to achieve the minimum turning radius, to achieve high-lift requirements, and others). To estimate the flap and slat deflections, a static aeroelastic analysis is conducted to compute the generalized aeroelastic stiffness and the generalized deflection of the wing shapes in bending and torsion, and the generalized force derivative for the flaps and slats. The aeroelastic analysis is described in greater details in subsequent paragraphs.

Using a pseudo-inverse method, the flap and slat deflections may be computed as:

$$f = RG^T(GRG^T)^{-1}(K_d \delta_d - K\delta) \quad (3.1)$$

where $f = [f_1 \, f_2 \, \ldots \, f_6 \, s_1 \, s_2 \, \ldots \, s_6]^T$ are the flap and slat deflections, $\delta = [w \, \theta]^T$ is the generalized aeroelastic deflections in bending and torsion, $\delta_d$ is the desired generalized aeroelastic deflections which may be taken to be those at the half way point of cruise, $K$ and $K_d$ are the actual and desired generalized stiffness values in bending and torsion, $G$ is the generalized force derivative for the flaps and slats, and $R > 0$ is a positive-definite weighting matrix.

Numerically, these quantities are computed to be $$x_d = \begin{bmatrix} 1.5277 \\ -0.0272 \end{bmatrix} \quad x_s = \begin{bmatrix} 1.6290 \\ -0.0311 \end{bmatrix} \quad x_e = \begin{bmatrix} 1.4260 \\ -0.0233 \end{bmatrix}$$

$$K_d = 10^6 \begin{bmatrix} 0.0209 & 0.9378 \\ -0.0611 & 3.0680 \end{bmatrix} \quad K_s = 10^6 \begin{bmatrix} 0.0209 & 0.9360 \\ -0.0610 & 3.0743 \end{bmatrix}$$

$$K_e = 10^6 \begin{bmatrix} 0.0210 & 0.9397 \\ -0.0612 & 3.0616 \end{bmatrix}$$

$$G_s = 10^5 \begin{bmatrix} 0.0012 & 0.0249 & 0.1601 & 0.0269 & 0.2790 \\ -0.0012 & -0.0334 & -0.3258 & -0.0787 & -1.2337 \end{bmatrix}$$
$$\begin{bmatrix} 0.0298 & -0.0002 & 0.0249 & 0.1601 & 0.0269 & 0.2790 & 0.0298 \\ -0.2137 & 0.0002 & 0.0044 & 0.0206 & 0.0062 & 0.0251 & 0.0061 \end{bmatrix}$$

$$G_e = 10^5 \begin{bmatrix} 0.0013 & 0.0253 & 0.1609 & 0.0269 & 0.2808 \\ -0.0014 & -0.0339 & -0.3275 & -0.0787 & -1.2415 \end{bmatrix}$$
$$\begin{bmatrix} 0.0304 & -0.0002 & 0.0253 & 0.1609 & 0.0269 & 0.2808 & 0.0304 \\ -0.2184 & 0.0002 & 0.0044 & 0.0206 & 0.0062 & 0.0250 & 0.0039 \end{bmatrix}$$

where the subscripts s and e denote the start and end of cruise, respectively.

Note that the actual deflections may be computed by multiplying the generalized deflections by the first bending (1B) and first torsion (1T) normalized mode shapes. For these mode shapes, the bending and torsional deflections at the wing tip are $2$ and $\sqrt{2}$, respectively. Thus the actual deflections at the wing tip are $$\begin{bmatrix} W(y_t) \\ \Theta(y_t) \end{bmatrix}_d = \begin{bmatrix} 3.0554 \\ -0.0385 \end{bmatrix} \begin{bmatrix} W(y_s) \\ \Theta(y_s) \end{bmatrix}_s = \begin{bmatrix} 3.2581 \\ -0.0440 \end{bmatrix} \begin{bmatrix} W(y_t) \\ \Theta(y_t) \end{bmatrix}_e = \begin{bmatrix} 2.8519 \\ -0.0330 \end{bmatrix}$$

where W is in feet and θ is in radians.

There are multiple solutions of the flap and slat deflections. One thing to note is that the flaps and slats will incur a drag penalty as they are used to control the wing shape to reduce the induced drag. If the flap and slat deflections are too large, there may be a significant drag penalty associated with the flap and slat deflections. Thus, to minimize the drag penalty, an optimization method is used to find the flap and slat deflection requirements that minimize the following cost functional:

$$J = |C_{D_f}||f| \quad (3.2)$$

where $C_{D_f}$ is the drag derivative due to the flap and slat deflections which are computed at zero flap and slat deflection to be $$C_{D_f} = [0.0009 \ 0.0044 \ 0.0159 \ 0.0097 \ 0.0185 \ 0.0107 \\ 0.0002 \ 0.0004 \ -0.0024 \ -0.0025 \ 0.0012 \ 0.0085]$$

To optimize the deflection requirements, the weighting matrix R is adjusted randomly to seek a minimum value of the cost function J. Tables 2.1 and 2.2 show the flap and slat deflection requirements as computed from the optimization.

TABLE 2.1

Flap and Slat Deflection Requirements at Start of Cruise

| | 1 | 2 | 3 | 4 | 5 | 6 |
|---|---|---|---|---|---|---|
| Flap, deg | 0.0270 | 0.2402 | 5.2260 | 0.0226 | −9.5552 | −0.0467 |
| Slat, deg | −0.0027 | 0.7553 | 7.6052 | 2.5670 | 4.6545 | 3.2970 |

TABLE 2.2

Flap and Slat Deflection Requirements at End of Cruise

| | 1 | 2 | 3 | 4 | 5 | 6 |
|---|---|---|---|---|---|---|
| Flap, deg | −0.0301 | −0.2412 | −5.2001 | −0.0225 | 9.5031 | 0.0472 |
| Slat, deg | 0.0026 | −0.7576 | −7.5604 | −2.5392 | −4.6332 | −3.2568 |

For the example baseline flap and slat layout, the minimum incremental $C_D$ values due to the deflections are 0.00189 at the start of cruise and 0.00188 at the end of cruise. It shall be noted that the minimum incremental $C_D$ estimates are non-conservative using the drag derivative at zero deflection. As a check, these flap deflections are incorporated in an aerodynamic analysis code for drag estimation. The analysis results indicated that the incremental $C_D$ values are 0.00630 at the start of cruise and 0.00437 at the end of cruise. These incremental $C_D$ values are much larger than those estimated using the drag derivative. Thus, the drag penalty of the conventional baseline flap and slat system is substantial.

It is noted that flaps 1, 2, 4, and 6, and slat 1 are not very active in some embodiments. Thus, this suggests a possibility for a better flap and slat layout that may reduce the numbers of flaps and slats.

A better estimation may require an iterative process by using the flap estimates to compute the new drag values iteratively in the optimization. It is noted that even the best effort in minimizing the drag penalty may not improve the situation much if the aerodynamic losses due to the conventional flap system are too great to overcome. This realization leads to the development of a novel variable camber continuous trailing edge flap system that will be presented in some embodiments in subsequent paragraphs.

Figure 3:
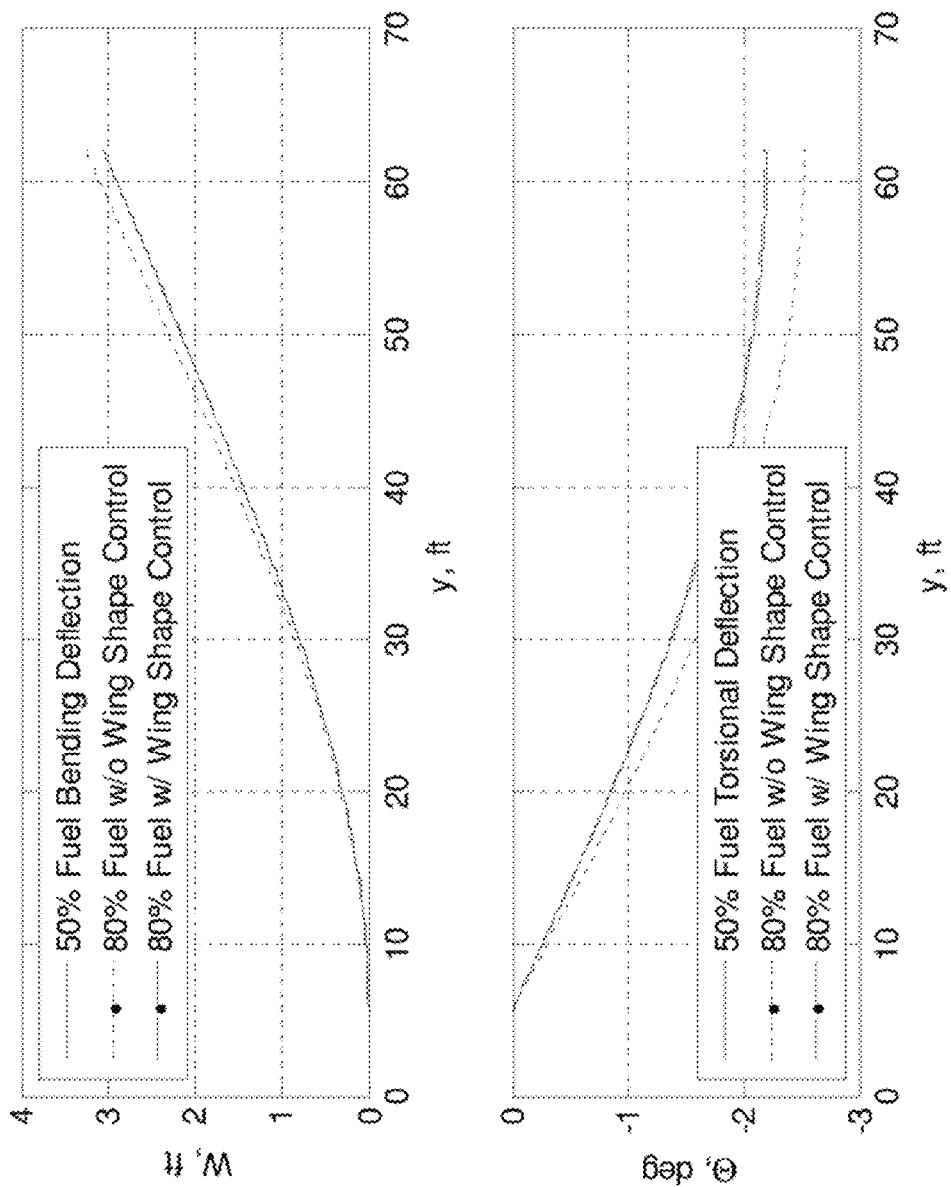
FIG. 3 shows wing bending and torsion deflections at the start of cruise with 50 percent and 80 percent fuel with and without wing shape control in some embodiments.
Figure 4:
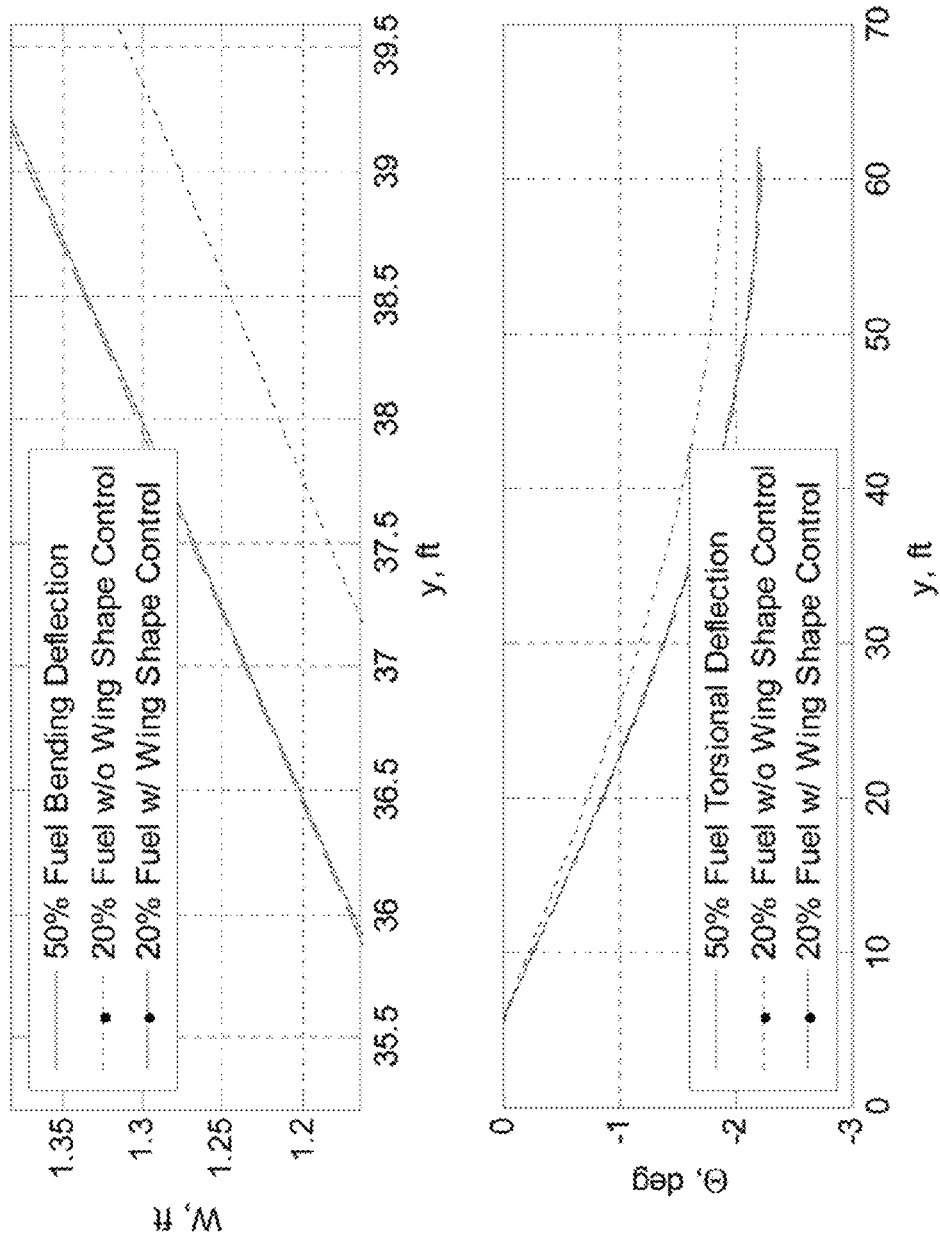
FIG. 4 shows wing bending and torsion deflections at the end of cruise with 50 percent and 20 percent fuel with and without wing shape control in some embodiments.

FIGS. 3 and 4 show the bending and torsional deflections with and without active wing shaping control. The differences between the deflections at the start and end of cruise and the deflection for the optimal drooped wing shape represent the actual wing deflections since the as-built drooped wing already accounts for the 1-g deflection.

A low-Drag Variable Camber Continuous Trailing Edge Flap System of the present invention is now described in further detail. In a conventional flap design, individual flaps may be actuated independently. Without any special provision, the trailing edge of a wing formed by the flap deflections is discontinuous as a result. This discontinuity is a source of drag penalty as well as acoustic emissions. Aerodynamic analysis results show that the drag penalty due to the conventional flap system may be so substantial as to offset any aerodynamic benefit that may be derived from the independently actuated conventional flap system. One way to reduce the drag penalty may use a single flap surface over a wide wing span. However, this single flap surface may compromise the flexibility and effectiveness of wing shaping control. A novel new flap approach is thus introduced to address the drag reduction goal. This flap system may be called a variable camber continuous trailing edge (VCCTE) flap system. FIG. 2 illustrates the continuous flap system.

Figure 5A:
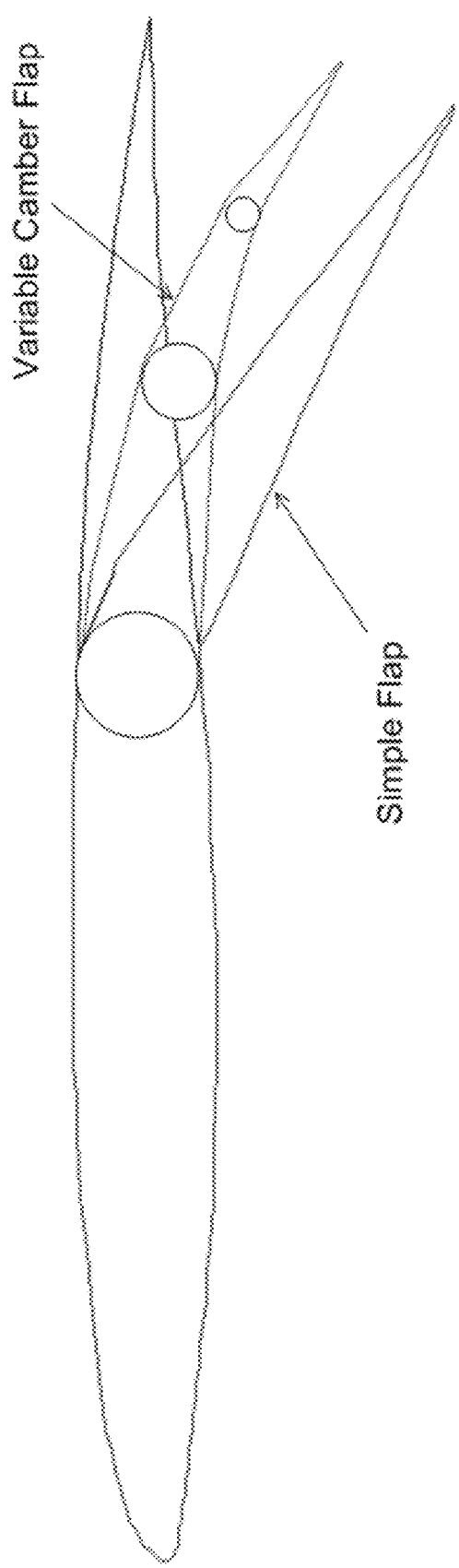
FIG. 5A shows a simplified exemplary variable camber flap system overlaid on a conventional simple flap system in some embodiments.

The two main features of this VCCTE flap system that provide significant drag reduction benefits are:

1. Variable Camber Flap:

The flap chord is comprised of three chordwise segments of equal chord length as shown in FIG. 5A. These three flap segments are actuated in unison when a flap deflection command is given. Each flap segment is deflected by an angle equal to one third of the commanded flap deflection relative to each other. This equal relative deflection creates a circular arc camber for the trailing edge surface to improve aerodynamic efficiency.

It shall be noted that a VCCTE flap system may comprises two or more chordwise segments having one or more chord lengths, and that the illustration of three chordwise segments is merely for the ease of explanations and illustrations.

In addition, each of the two or more chordwise segments need not be deflected by an angle equal to one third of the command flap deflection relative to each other. Rather, each chordwise segment may be independently actuated by an arbitrary amount such that the entire flap system comprising of multi flap segments is actuated to achieve its intended purposes (e.g., for wing shaping control, for improving aerodynamic capabilities of an air vehicle, and others).

For example, for a commanded flap deflection of 12 degrees, flap segment 1 which is positioned next to the wing is deflected 4 degrees, flap segment 2 that follows flap segment 1 is deflected 8 degrees, and flap segment 3 at the trailing edge is deflected by 12 degrees. Thus $$f_1 = \frac{f_c}{3} \quad (3.3)$$

$$f_2 = \frac{2f_c}{3} \quad (3.4)$$

$$f_3 = f_c \quad (3.5)$$

where $f_c$ is the commanded flap deflection.

For a circular arc camber, the camber angle of the flap is the difference between $f_3$ and $f_1$. Thus, the variable camber angle $\chi = 2f_c/3$ is a function of the commanded flap deflection. A cambered flap is more effective in producing lift than a straight uncambered flap. The variable camber flap produces about the same downwash as a simple plain flap deflected by the same angle, as seen in FIG. 5A. However, the normal surface area of the variable camber flap exposed to the flow field is significantly reduced. Thus, the drag reduction benefit of the variable camber flap is realized since the pressure drag across the flap surface is reduced due to having less exposed normal surface area.

It shall be noted that FIG. 5A illustrates a variable camber flap system with three chordwise flap segments where the three chordwise flap segments are joined at the ends. Nonetheless, a variable camber flap system may include two or more chordwise flap segments in various embodiments. It shall be noted that as the number of chordwise flap segments, the variable camber flap may exhibit a smoother streamline and may also exhibit more complex geometric forms, rather than merely a circular arc shape as illustrated.

Figure 5B:
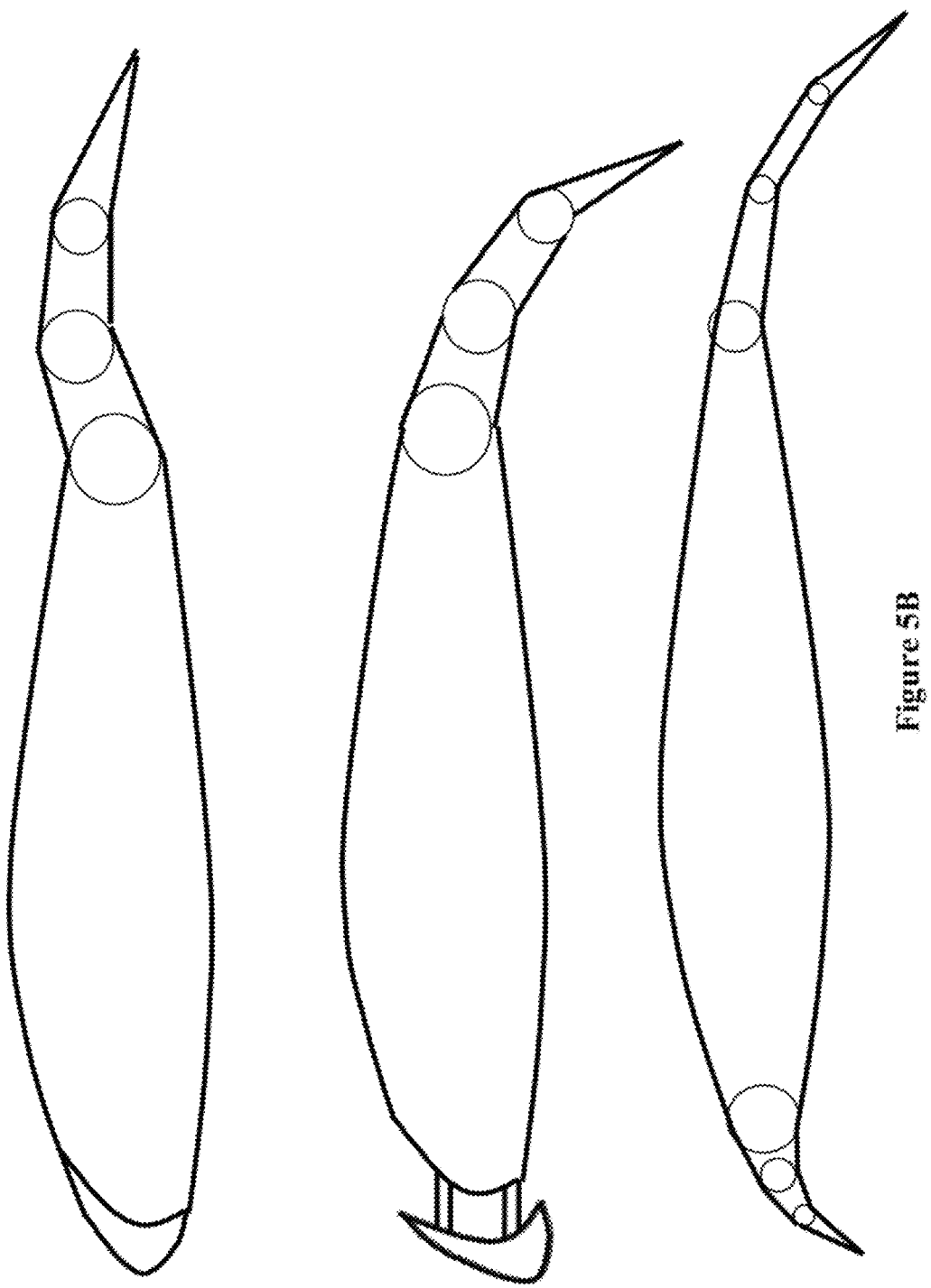
FIG. 5B shows some other simplified exemplary variable camber flap systems and variable camber slat systems in some embodiments.
Figure 5C:
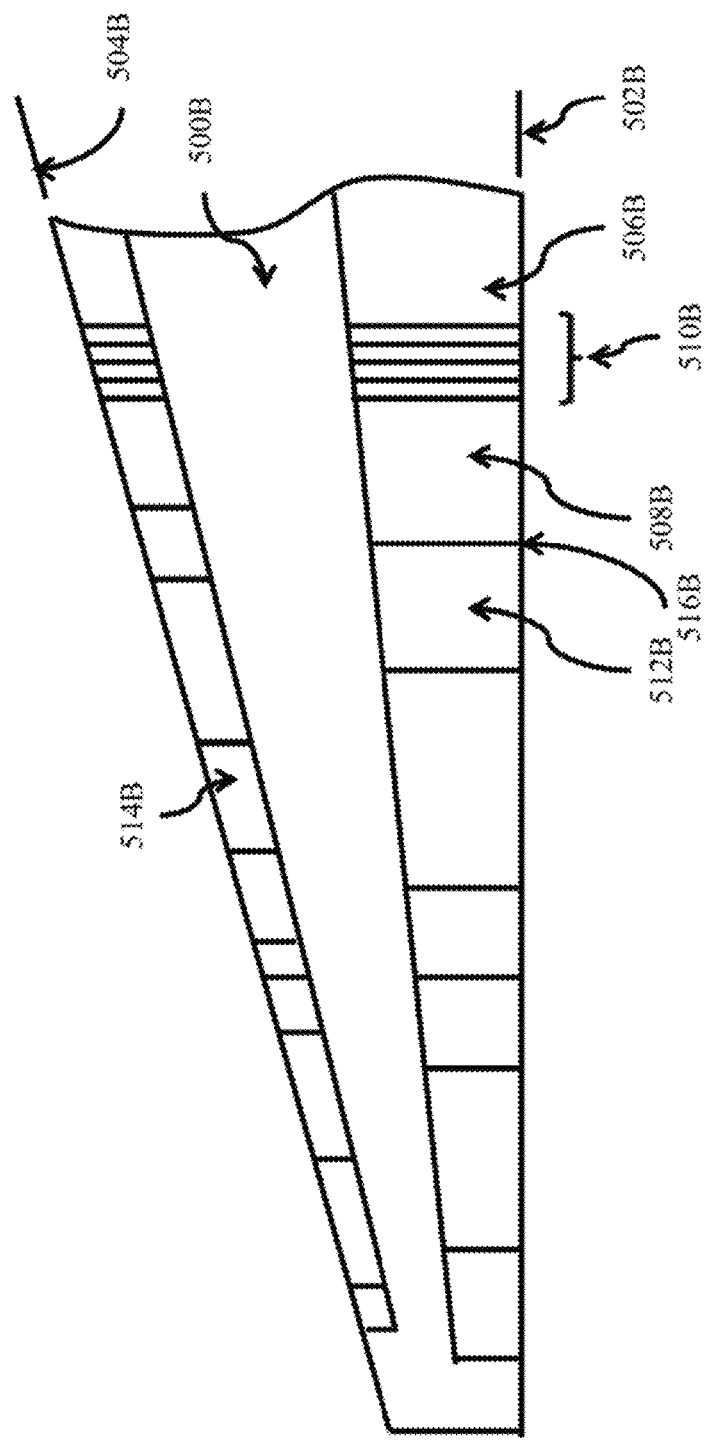
FIG. 5C shows an exemplary top view of a section of a left wing of an air vehicle with the continuous trailing edge flaps and the continuous leading edge slats in some embodiments.
Figure 5E:
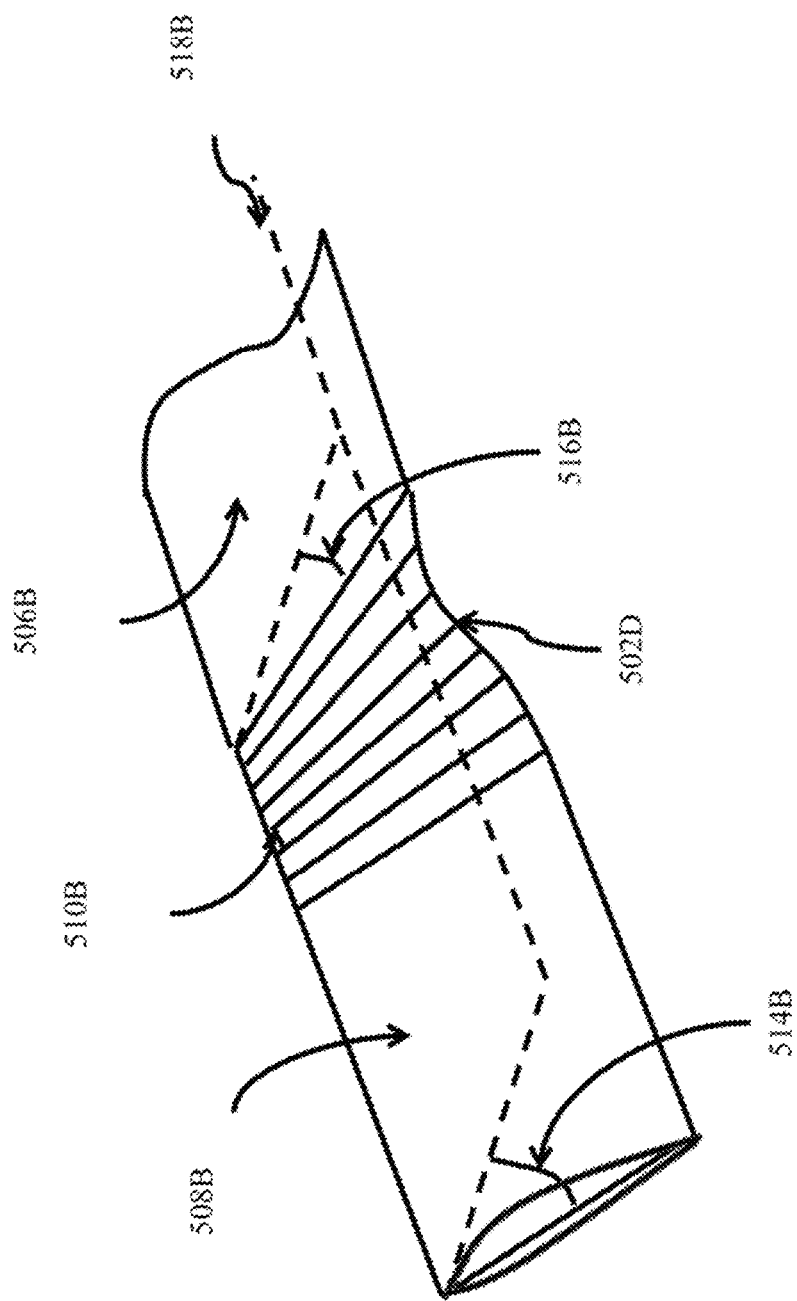
FIG. 5E shows more details of two spanwise segments of the continuous trailing edge flaps actuated at different angles with another intermediate junction system to reduce separation of the trailing edges of the two spanwise flap segments.
Figure 5F:
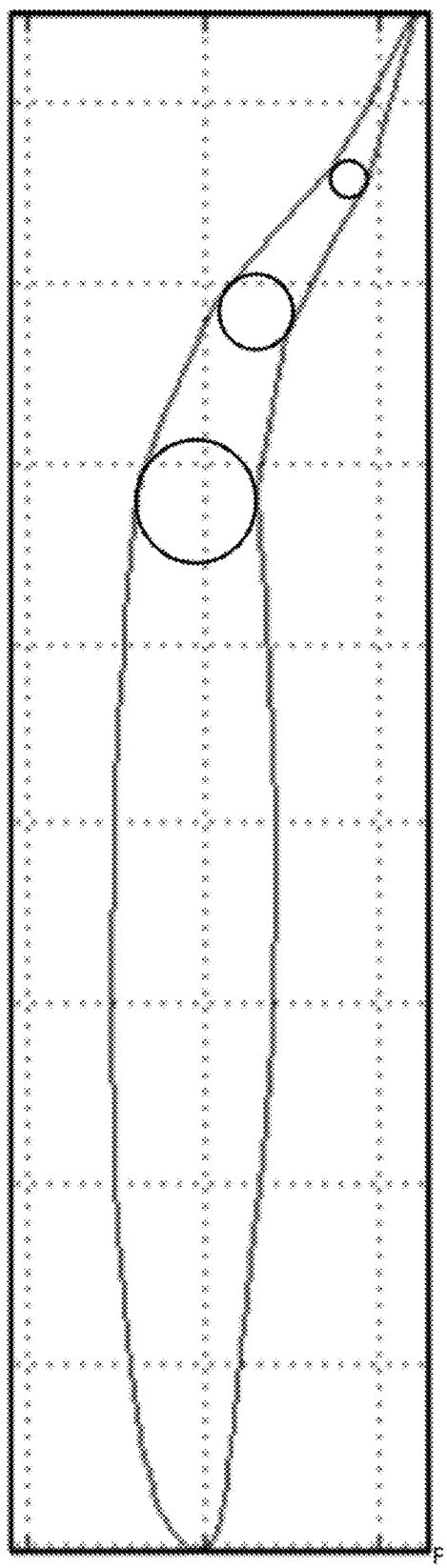
FIG. 5F shows a variable camber flap commanded to create an S-shape camber in some embodiments.

For example, the variable camber flap may be commanded to create an S-shape camber as shown in FIG. 5F. It shall also be noted that these chordwise flap segments do not necessarily have to be joined at the ends as illustrated in FIG. 5A in some embodiments. For example, one chordwise flap segment, when retracted, may tuck under another chordwise flap segment in some embodiments. Different arrangements of these chordwise flap segments may require different actuation mechanisms while serving substantially similar purposes—achieving variable camber angles with the flap system as described herein.

FIG. 5B illustrates schematic sketches of three cross-sections of a wing with variable camber flaps and variable camber slats as well as a conventional, retracted slat and a conventional extended slat. It shall be noted that FIG. 5B also illustrates three chordwise slat segments. Nonetheless, some embodiments may include two or more chordwise slat segments.

FIG. 5C illustrates a top view of a section of a wing 500B with multiple spanwise slat segments 514B along the first spanwise direction 504B and multiple spanwise flap segments (506B, 508B, and 512B) along the second spanwise direction 502B.

FIG. 5C also shows a transition area 510B between the spanwise flap segments 506B and 508B. The transition area 516B is illustrated as a single line joining the two spanwise flap segments 508B and 512B. The transition areas 510B and 516B will be described in greater details in subsequent sections. It shall be noted that the flap segments (506B, 508B, and 512B), the slat segments (514B), and the transition area (510B) are illustrated with single chordwise segments for the ease of illustration and explanation. Therefore, the variable camber flap system, the variable camber slat system, or both may be employed in various embodiments without limitations.

2. Continuous Trailing Edge Flap:

The continuous flap comprises 12 spanwise segments to form a continuous (or piecewise continuous) trailing edge when the flap is deflected. This continuous trailing edge may reduce or even eliminate vortices which otherwise would have formed at the conventional flap discontinuity in the trailing edge region. By reducing or eliminating vortex formation, drag losses as well as acoustic emissions from turbulence may be attenuated. Thus, this feature further provides a drag reduction benefit and noise attenuation in addition to the variable camber flap system.

It shall be noted the choice of 12 spanwise segments to form the VCCTE flap system is also for the ease of illustration and explanation. It shall be appreciated that more spanwise segments may form a more continuous trailing edge, while fewer spanwise segments form a less continuous trailing edge, and that different numbers of spanwise segments may be determined based on the design and performance objectives of each air vehicle at issue in different embodiments.

FIG. 5D shows a schematic, not-to-scale illustration of a continuous trailing edge flap system in some embodiments. It shall be noted that a substantially similar configuration may also be implemented for the continuous leading edge slat system in some embodiments. FIG. 5D shows two spanwise flap segments, 508B and 512B. One or both spanwise flap segments include a pocket or a recessed area 505C to accommodate a part of a transition mechanism 504C, which may be made of a single, compliant piece of material or of a plurality of pieces of material that jointly exhibit some compliance to accommodate foreseeable differences in the amounts of deflections of two neighboring segments, that extends into the recessed area within 508B and/or the recessed area within 512B. The transition mechanism 504C may have an airfoil shape similar to the airfoil shape of the spanwise flap segments 508B and 512B. With a similar airfoil shape as neighboring flap segments, the transition mechanism 504C provides a nearly smooth upper flap surface and lower flap surface between the spanwise flap segments 508B and 512B. The transition mechanism 504C may also be configured to form a piecewise continuous trailing edge between spanwise flap segments 508B and 512B.

When the two neighboring spanwise flap segments 508B and 512B receive a flight control command to deflect at two different amounts (e.g., 508B is to deflect 10 degrees, and 512B is to deflect 15 degrees), the flight control command causes the respective actuation mechanisms to actuate 508B to 10-degree deflection and 512B to 15-degree deflection. The compliant transition mechanism 504C may deform or flex to bridge the different amounts of deflections of 508B and 512B. Note that the trailing edge 506C and 504C are not truly, mathematically "smooth" because the transitional mechanism 504C, depending on the design choices, may or may not extend all the way to the trailing edge 506C and 502C because 504C in some embodiments where the transitional mechanism is housed within the segments 508B and 512B.

Nonetheless, the transitional mechanism 504C provides at least some continuity to bridge the two flap segments, and such continuity alleviates the problems caused by the separation of the two spanwise flap segments by, for example, reducing the generation of vortices caused by the separation of the two neighboring flap segments and thus reducing the drag induced by vortices.

In some embodiments where a spanwise flap segment is made of materials with sufficient compliance, which may be determined based at least on the differences in the amount of deflection that the spanwise flap segment needs to accommodate within the flight envelope, the spanwise flap segment may be actuated with different deflections at different locations along the spanwise flap segment. In these embodiments, the need for the transitional mechanism 504C may be alleviated or eliminated because the spanwise flap segments may be sufficiently compliant to form the continuous trailing edge.

Some embodiments further take the fatigue or service life into consideration in determining, for example, the material(s) or design(s), or both, of the continuous trailing edge flap system or the continuous leading edge slat system. In some embodiments, a spanwise flap segment may not be entirely actuated independently of the neighboring segment(s). Rather, one or both ends of a spanwise flap segment (depending on the position of the spanwise flap segments in the flap system) may be actuated in a constrained manner by, for example, the existence of the transitional mechanism 504C because the transitional mechanism 504C serves to constrain the amount of deflection of the flap segment. In some of these embodiments, the trailing edge (e.g., 502C) of a spanwise flap segment (e.g., 512C) may thus exhibit some curvature due to different deflections along the spanwise flap segment along the spanwise direction.

FIG. 5E shows a schematic, not-to-scale illustration of a continuous trailing edge flap system in some embodiments. It shall be noted that a substantially similar configuration may also be implemented for the continuous leading edge slat system in some embodiments. FIG. 5E shows two spanwise flap segments, 508B and 506B, with a transitional mechanism 510B therebetween. The transitional mechanism 510B may comprise a plurality of sub-pieces that are arranged or constrained in a way that the transitional mechanism 510B may expand or contract its planar coverage while exhibiting some compliance in the normal direction (e.g., the direction perpendicular to the plane of the transitional mechanism 510B.

When the two neighboring spanwise flap segments 508B and 506B receive a flight control command to deflect at two different amounts (e.g., 506B is to deflect 10 degrees 514B, and 508B is to deflect 15 degrees 516B from the neutral position as indicated by 518B), the flight control command causes the respective actuation mechanisms to actuate 506B to 10-degree deflection and 508B to 15-degree deflection. The transition mechanism 510B may expand on the end indicated by 520D, and its compliance may bridge 506B and 508B with a smooth transitional surface to for the continuous trailing edge while maintaining the different deflections for two neighboring spanwise flap segments. It shall be noted that other means for forming a continuous trailing edge or a continuous leading edge may also be employed to achieve substantially similar purposes and are thus considered to be within the scope of this invention.

The flap spans the wing trailing edge from the normalized BBL 0.1011, which is abutted to the fuselage, to the normalized BBL 0.8975. The flap deflection angle varies continuously from zero at these two BBL stations to the maximum commanded flap deflection at the normalized BBL 0.4007. The chord is tapered from 0.3615 of the wing chord at the normalized BBL 0.4007 to 0.4642 of the wing chord at the normalized BBL 0.8975, and then remains constant at 0.3615 of the wing chord at the normalized BBL 0.4007 between the normalized BBL 0.1011 to the normalized BBL 0.4007. A theoretical smooth trailing edge shape is generated by a fifth-degree polynomial to enforce the boundary conditions as follows:

$$f_n(y)=a_5 y^5 + a_4 y^4 + a_3 y^3 + a_2 y^2 + a_1 y + a_0 \quad (3.6)$$

where $f_n$ is the continuous flap deflection of flap n, n=1, 2, 3, y is the actual BBL station, and $a_i$, i=1, 2, 3, 4, 5 are the polynomial coefficients that satisfy the following boundary conditions $$f_n(y_1=0.1011 y_t)=0$$

$$f_n'(y_1=0.1011 y_t)=0$$

$$f_n(y_2=0.4007 y_t)=\frac{nf_c}{3}$$

$$f_n'(y_2=0.4007 y_t)=0$$

$$f_n(y_3=0.8975 y_t)=0$$

$$f_n'(y_3=0.8975 y_t)=0$$

where $y_t$ is the actual BBL station of the wing tip.

The coefficients $a_i$, i=1, 2, 3, 4, 5 are determined as $$\begin{bmatrix} a_5 \\ a_4 \\ a_3 \\ a_2 \\ a_1 \\ a_0 \end{bmatrix} = \begin{bmatrix} y_1^5 & y_1^4 & y_1^3 & y_1^2 & y_1 & 1 \\ 5y_1^4 & 4y_1^3 & 3y_1^2 & 2y_1 & 1 & 0 \\ y_2^5 & y_2^4 & y_2^3 & y_2^2 & y_2 & 1 \\ 5y_2^4 & 4y_2^3 & 3y_2^2 & 2y_2 & 1 & 0 \\ y_3^5 & y_3^4 & y_3^3 & y_3^2 & y_3 & 1 \\ 5y_3^4 & 4y_3^3 & 3y_3^2 & 2y_3 & 1 & 0 \end{bmatrix}^{-1} \begin{bmatrix} 0 \\ 0 \\ \frac{nf_c}{3} \\ 0 \\ 0 \\ 0 \end{bmatrix} \quad (3.7)$$

It shall be noted that in addition to the fifth-degree polynomial, other mathematical expressions (e.g., series expansions or other polynomial forms, and others) may also be used to describe the trailing edge shape in some embodiments with or without the enforced boundary conditions. It shall be further noted that the zero displacement and zero slope boundary conditions may be used to reduce the wing tip vortex formation by ensuring a gradual transition to zero flap deflection at the wing tip.

Figure 5G:
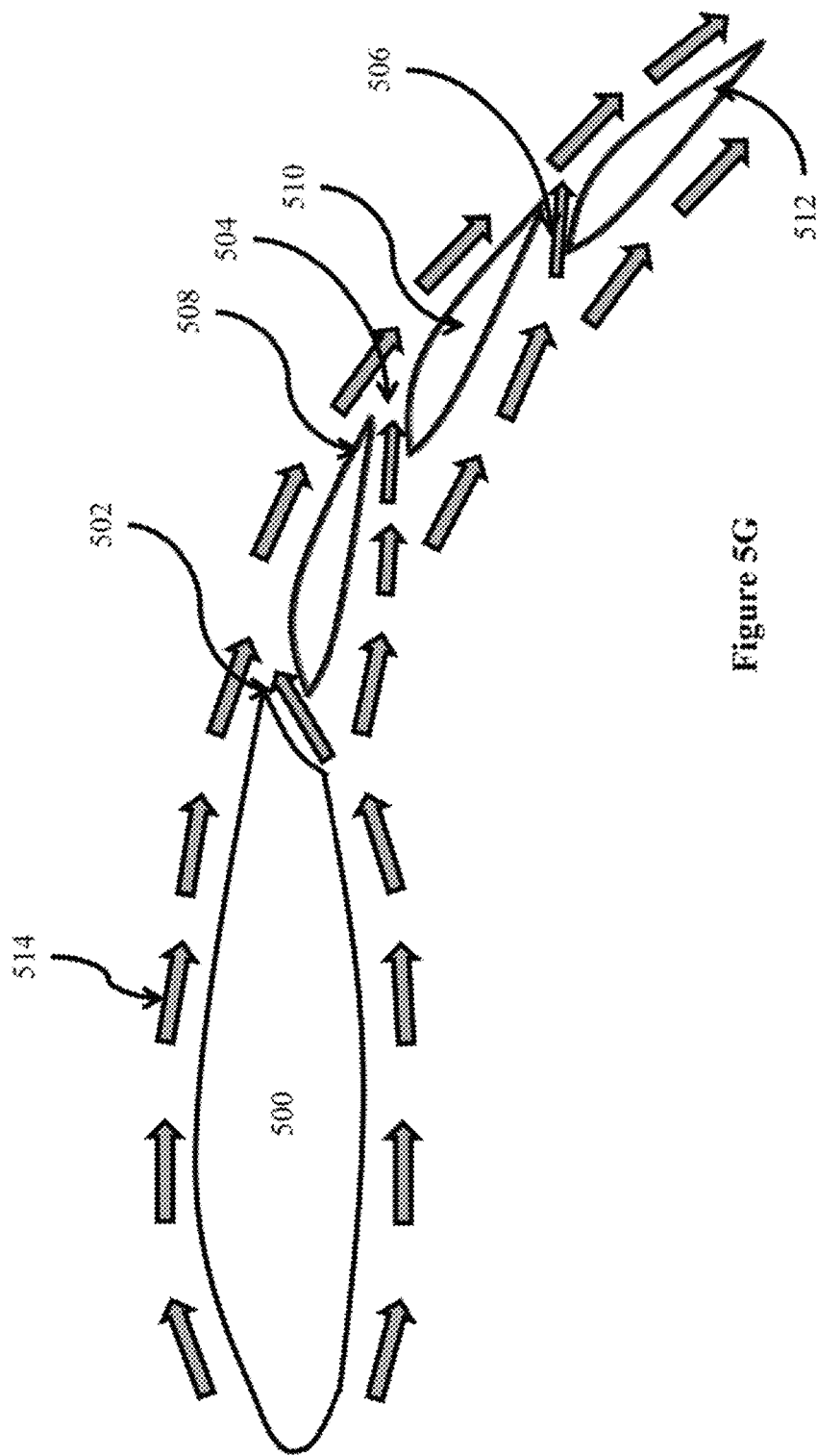
FIG. 5G shows exemplary variable camber flap with three chordwise flap segments having one or more slots in some embodiments.

As shown in FIG. 5G, the flap system may further comprise one or more slots between the wing and at least one chordwise flap segment or between two chordwise flap segments such that some of the airflow under the wing will go through the one or more slots to flow over the top surface of the at least one chordwise flap segment so as to help the airflow to remain attached to the top surface of the at least one flap segment, rather than separating from the top surface.

FIG. 5G shows exemplary variable camber flap with three chordwise flap segments having one or more slots in some embodiments. It shall be noted that although FIG. 5G illustrates a first slot 502 between the wing 500 and the first chordwise segment 508, a second slot 504 between the first chordwise flap segment 508 and the second chordwise flap segment 510, and a third slot 506 between the second chordwise flap segment 510 and the third chordwise flap segment 512 in some embodiments, various embodiments may have all or a smaller subset of these slots shown in FIG. 5G.

It shall also be noted that the arrowheads 514 pictorially indicate how these slots (502, 504, and 506) may help reduce separation of the air flow through the wings. Similarly, the slat system may further comprise one or more slots between the wing and at least one chordwise slat segment such that some of the airflow under the slat segments will go through the one or more slots to flow over the top surface of the wing so as to help the airflow to remain attached to the top surface of the wing, rather than separating from the top surface. In these embodiments, the one or more slots may further help reduce the formation of vortices.

Figure 6:
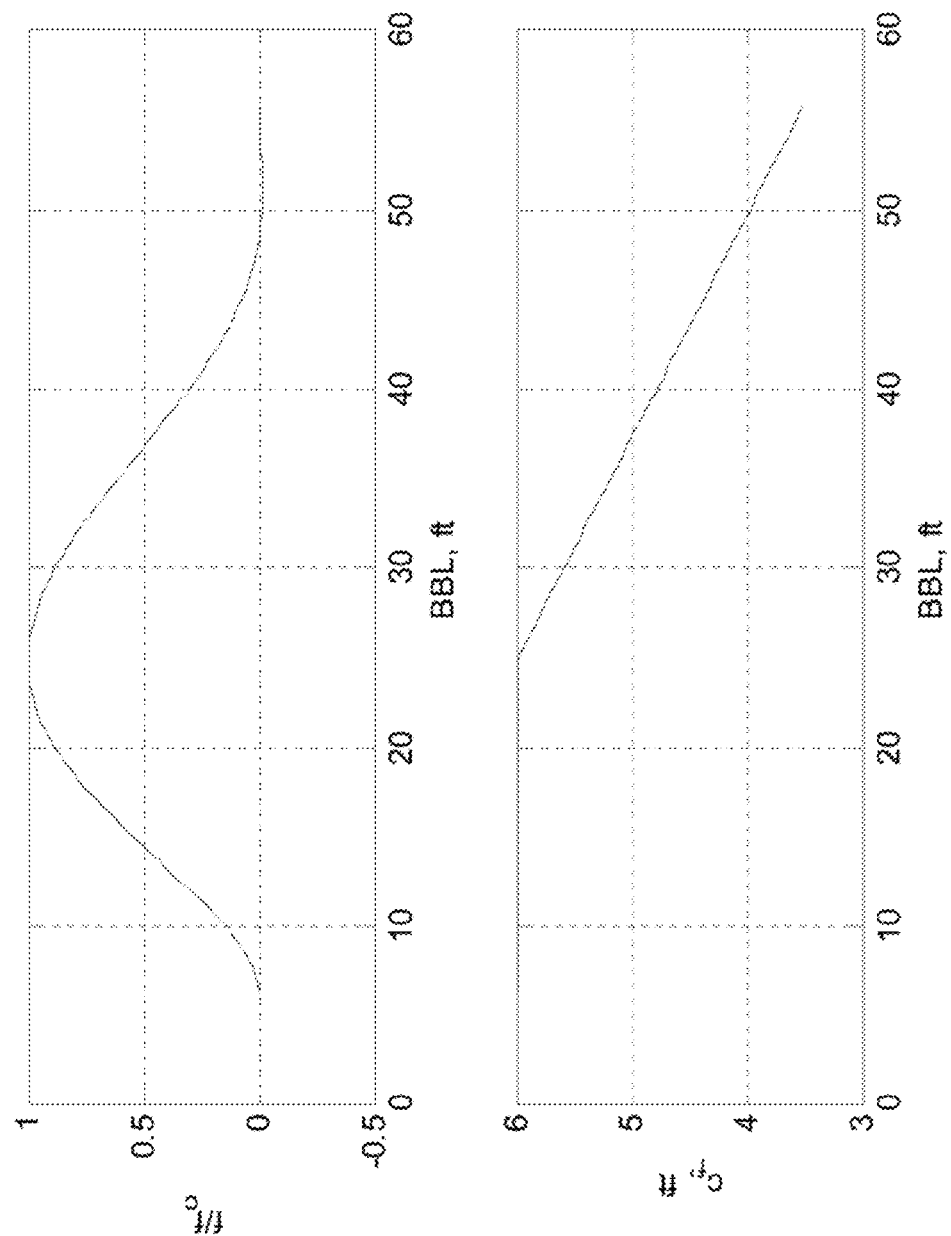
FIG. 6 shows plots of a theoretical continuous trailing edge flap deflection.

FIG. 6 shows the theoretical continuous trailing edge flap deflection curve and the flap chord distribution. To approximate this continuous trailing edge curve, the continuous flap system may comprise 12 individual spanwise flap segments where these flap segments join together to form a continuous trailing edge in some embodiments. Each flap segment is designed to be actuated in relation to the adjacent flap segment(s) in the spanwise direction to form a continuous trailing edge, as well as in the chordwise direction to form a desired camber. Tables 3.1 and 3.2 show the BBL stations of the 12 flap segments numbered from 1 to 12 from outboard to inboard.

TABLE 3.1

Continuous Trailing Edge Flap Segments 1 to 6

|  | 1 | 2 | 3 | 4 | 5 | 6 |
|---|---|---|---|---|---|---|
| Outboard Normalized BBL | 0.8975 | 0.7911 | 0.7443 | 0.6865 | 0.4996 | 0.4573 |
| Inboard Normalized BBL | 0.7911 | 0.7443 | 0.6865 | 0.4996 | 0.4273 | 0.4306 |
| Outboard $3 f_n/n f_c$ | 0 | −0.0085 | 0.0390 | 0.1669 | 0.8374 | 0.9433 |
| Inboard $3 f_n/n f_c$ | −0.085 | 0.0390 | 0.1669 | 0.8374 | 0.9433 | 0.9837 |

TABLE 3.2

Continuous Trailing Edge Flap Segments 7 to 12

|  | 7 | 8 | 9 | 10 | 11 | 12 |
|---|---|---|---|---|---|---|
| Outboard Normalized BBL | 0.4306 | 0.4007 | 0.3660 | 0.3327 | 0.2837 | 0.1524 |
| Inboard Normalized BBL | 0.4007 | 0.3660 | 0.3327 | 0.2837 | 0.1524 | 0.1011 |
| Outboard $3 f_n/n f_c$ | 0.9837 | 1.0000 | 0.9772 | 0.9115 | 0.7430 | 0.1095 |
| Inboard $3 f_n/n f_c$ | 1.0000 | 0.9772 | 0.9115 | 0.7430 | 0.1095 | 0 |

Figure 7:
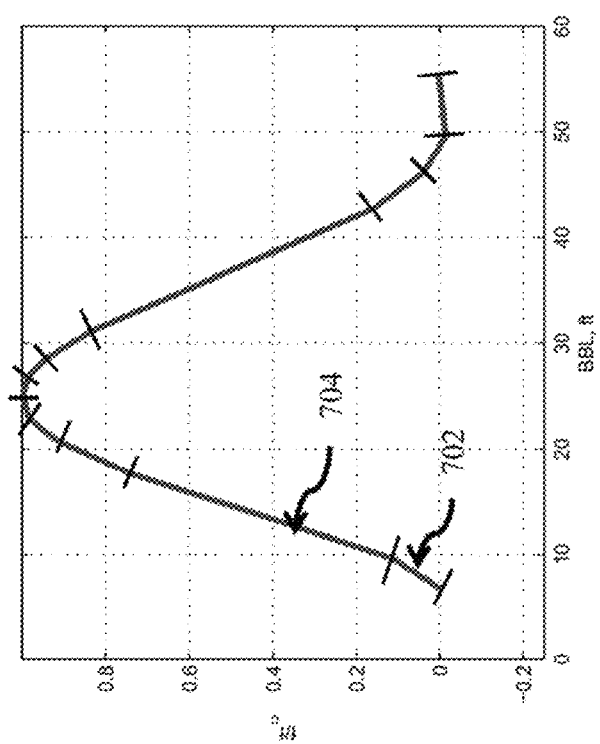
FIG. 7 shows an exemplary segmentation of a flap system into an exemplary twelve segments based on the theoretical continuous trailing edge flap deflection shown in FIG. 6.

FIG. 7 shows the BBL stations of the 12 flap segments based on the theoretical continuous trailing edge flap deflection shown in FIG. 6 in some embodiments. The small line segments on the curve indicate where each flap segment spans. For example, 702 represents a first spanwise flap segment, and 704 represents a second spanwise flap segment. It shall be noted that different embodiments may employ different flap segments, and that more flap segments can always better approximate the theoretical continuous trailing edge flap deflection curve as shown in, for example, FIG. 6, although more flap segments may probably make the control system and the actuation system more complex than those for a fewer flap segments configuration.

In some embodiments, the continuous trailing edge does not necessarily imply any order of the derivatives of the function of the trailing edge in terms of deflections is another continuous function. Rather, the continuous trailing edge is defined in a manner such that the value (e.g., the deflection at a point along the trailing edge of a flap segment) of the function of the trailing edge does not exhibit a substantial discontinuity or a physical separation between the flap segments at the trailing edge. In some embodiments, the continuous trailing edge flap system may comprise a piecewise continuous function $\delta=f(x)$, where x denotes a location of a point along the trailing edge of a flap system, and $\delta$ denotes the deflection in the flapwise direction (e.g., gravity direction) where a small change in x corresponds to a small change in $\delta$. It shall be noted that the terms "continuous" and "piecewise continuous" do not necessarily refer to their respective rigorous mathematical definitions due to, for example, allowances and tolerances in mechanical design or manufacturing.

Some embodiments may also employ a substantially similar mechanism for the leading edge slat system. In these embodiments, the substantially similar mechanism may be more correctly termed as the "continuous leading edge slat system." Nonetheless, unless otherwise specified or claimed, this application may refer to any of such control surfaces when using the term "flap" and thus the "continuous trailing edge flap system" throughout the entire application.

The variable camber continuous trailing edge flap system may be implemented in an aerodynamic analysis code to estimate the potential drag reduction benefit. The commanded flap deflection is adjusted until the $C_L$ (coefficient of lift) versus $\alpha$ (angle of attack) curve matches that for the example drooped-wing aircraft with the previously computed conventional flap deflections at the start and end of cruise.

Figure 8:
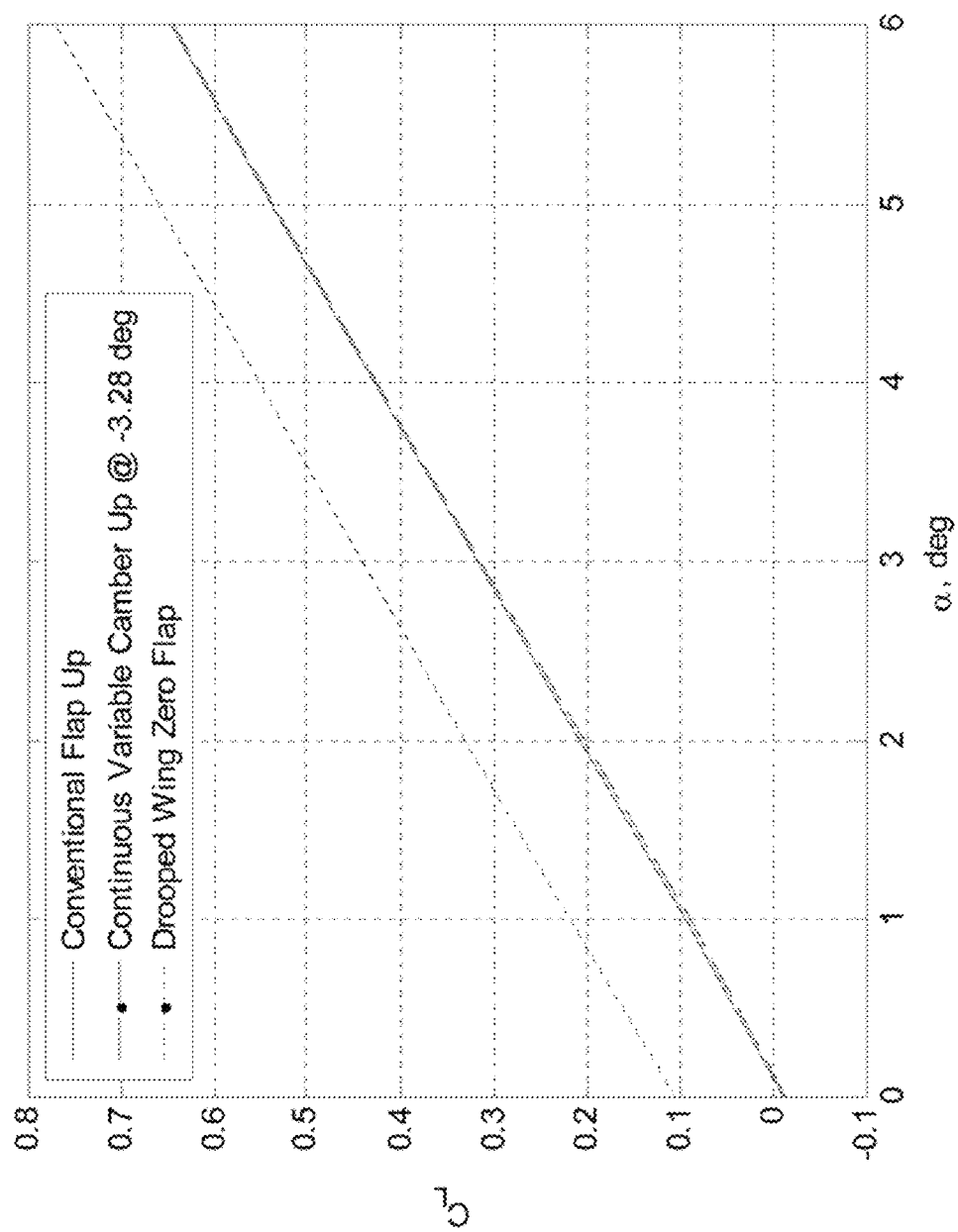
FIG. 8 shows the plot of the coefficient of lift ($C_L$) versus the angle of attack ($\alpha$) for negative flaps at the start of cruise of benchmark configurations.
Figure 9:
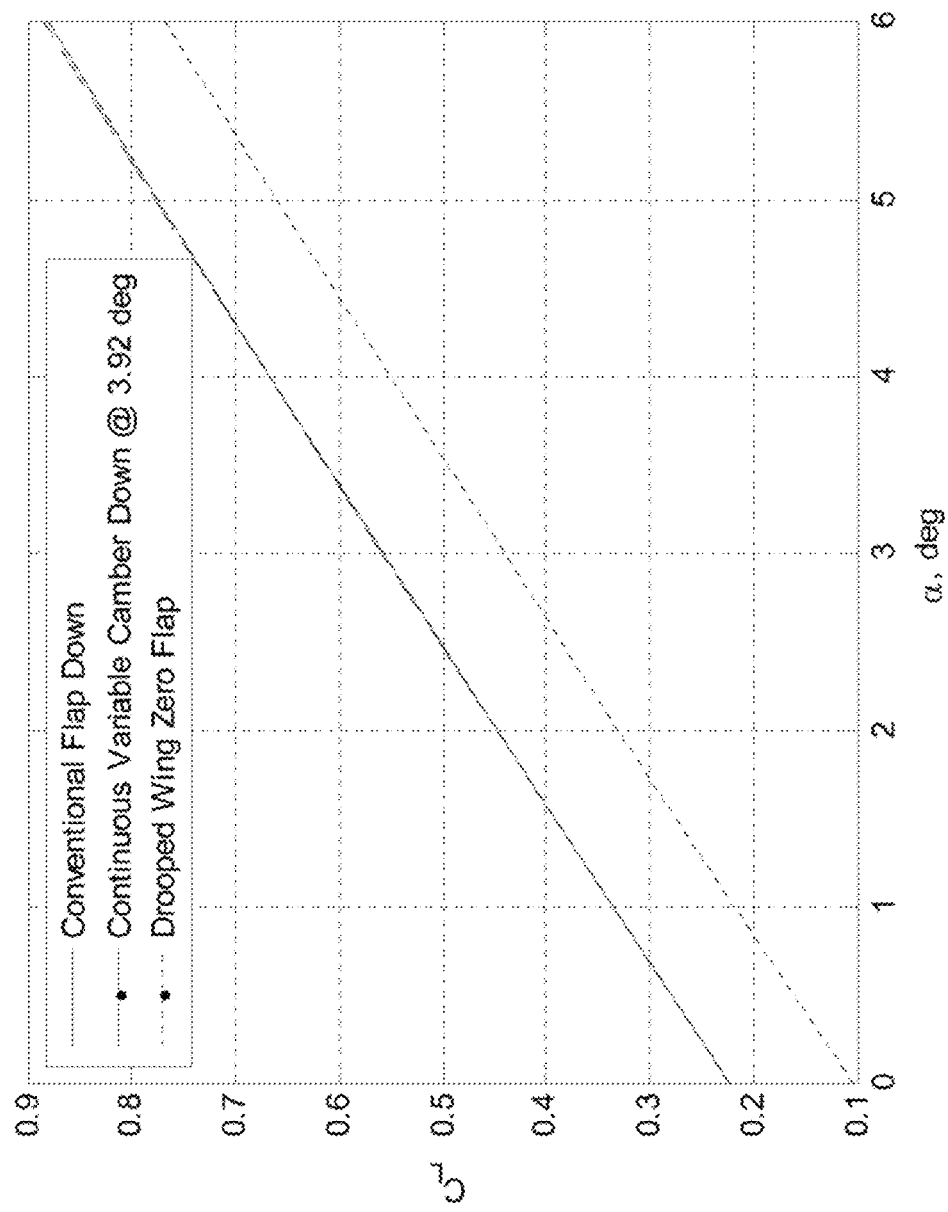
FIG. 9 shows the plot of the coefficient of lift ($C_L$) versus the angle of attack ($\alpha$) for negative flaps at the end of cruise of benchmark configurations.
Figure 10:
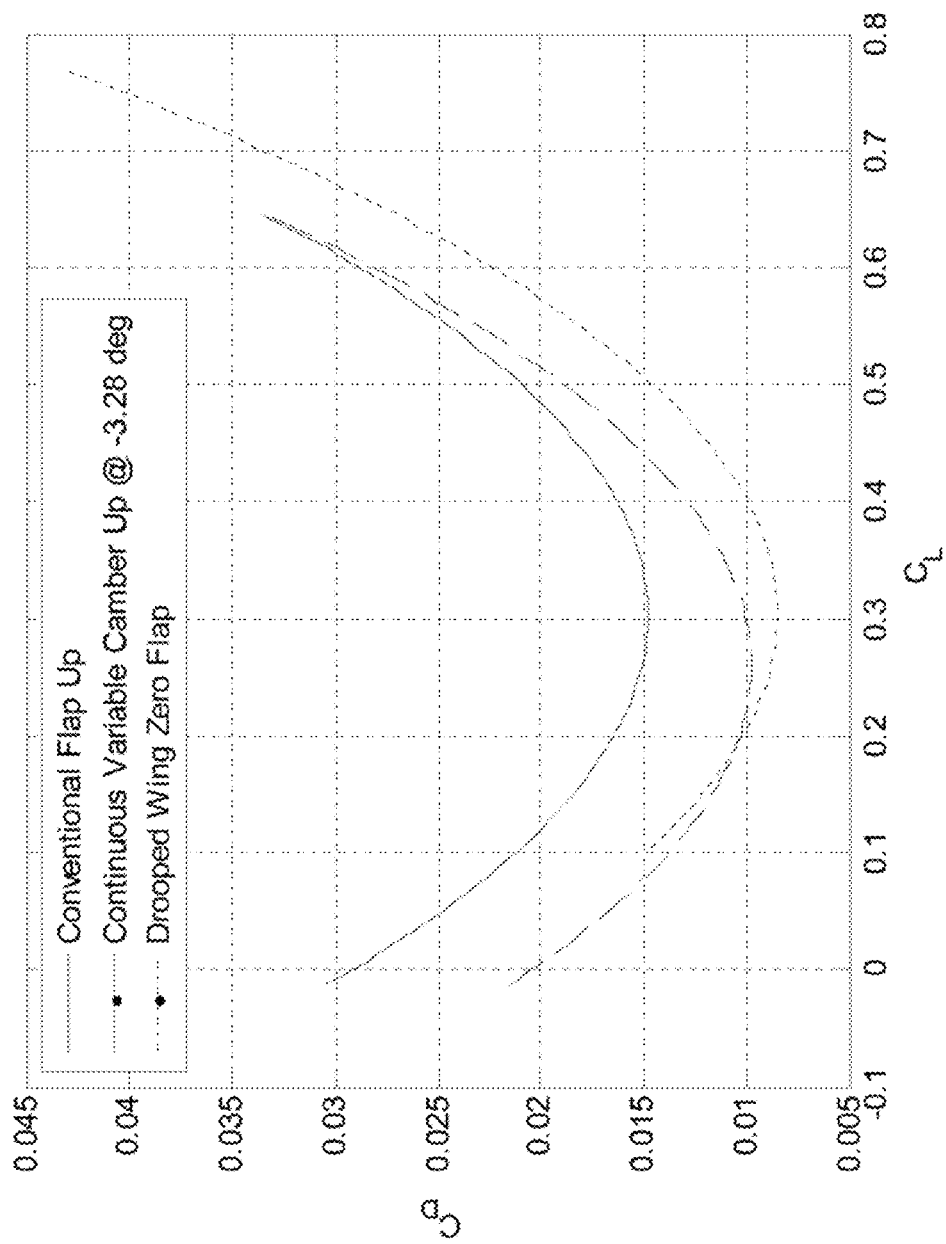
FIG. 10 shows drag polars for plain discrete flaps and variable camber continuous trailing edge flat at some negative deflection of three benchmark configurations.
Figure 11A:
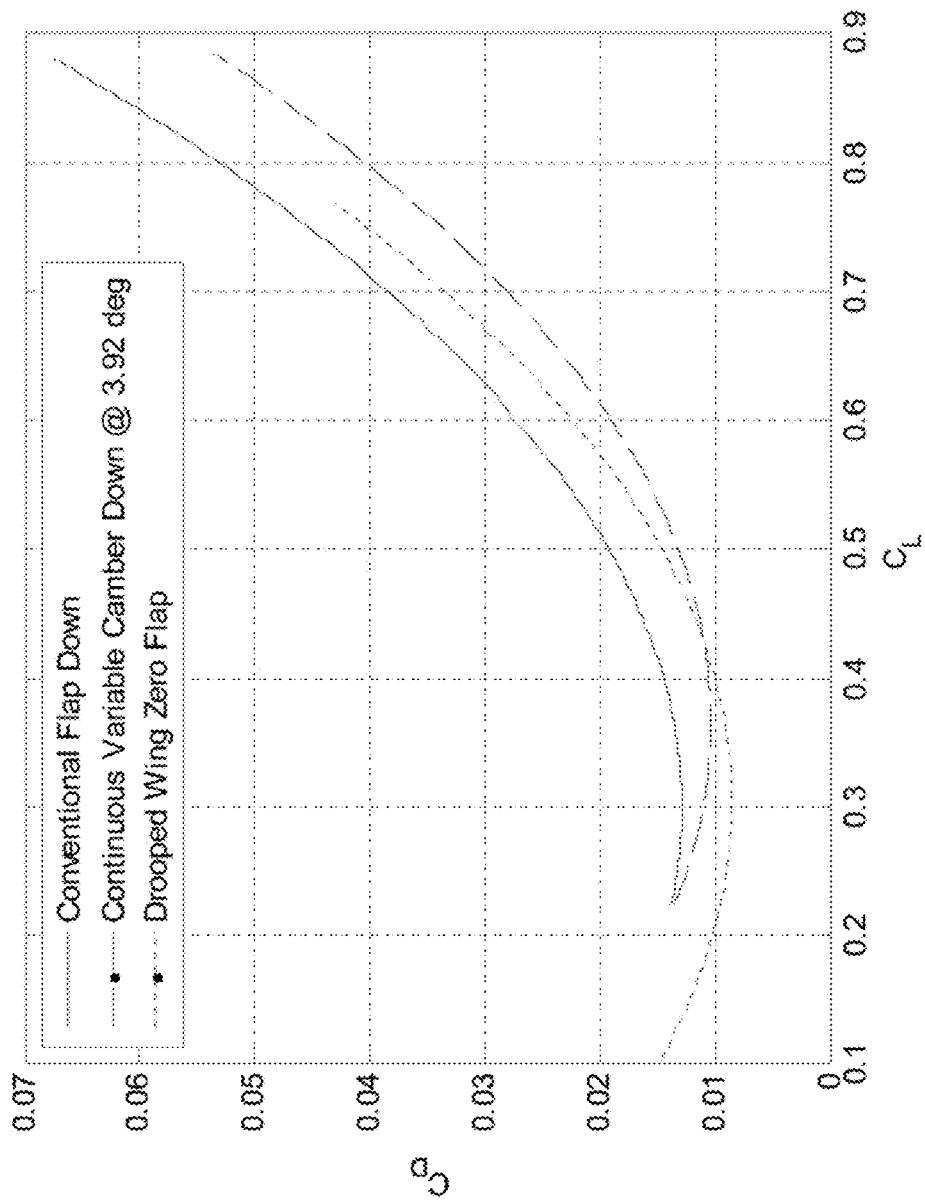
FIG. 11A shows drag polars for plain discrete flaps and variable camber continuous trailing edge flat at some positive deflection of three benchmark configurations.

FIGS. 8 and 9 show the $C_L$ versus $\alpha$ curves for the flap deflections at the start and end of cruise, respectively. The drag reduction benefits of the variable camber continuous trailing flap system may be demonstrated by FIGS. 10 and 11A. It is apparent that the variable camber continuous trailing edge flap system offers substantial drag reduction benefits. The incremental $C_D$ (coefficient of drag) values are 0.00216 at the start and 0.00234 at the end of cruise. The results show drag reduction benefits ranging from 66 percent at the start of cruise to 46 percent at the end of cruise.

Moreover, it is noted that the $C_D$ values for the variable camber continuous trailing edge flap are even lower than the baseline values for the drooped wing for $C_L$ values greater than 0.43. This implies that the variable camber continuous flap system is more aerodynamically efficient of producing lift at high $C_L$ values.

In some embodiments, the variable camber continuous trailing edge flap is enabled in operation by a special multi-objective drag-cognizant flight control design and guidance law for wing shaping control to achieve fuel savings in cruise. The wing shaping control design will be further described in subsequent paragraphs.

1. Multi-Objective Drag-Cognizant Flight Control Design:

Flight control design is an integral part of aircraft design. A typical flight control design usually takes into account different sets of requirements for performance and stability that must be considered during a design process in some embodiments. Performance within the context of flight control implies the ability for a flight control system to follow a pilot command. However, in some embodiments, a new notion of aerodynamic performance is introduced into the flight control framework.

One of the objectives of the new vehicle is to achieve low drag through active wing shaping control actuation in some embodiments. In these embodiments, drag penalty due to the wing shaping control flap and slat deflections may be considered in a flight control design. Hence, a new implementation of multi-objective drag-cognizant flight control is developed to not only achieve the objective of following a pilot command but also the objective of minimizing or reducing the drag in some embodiments.

Stability is of paramount importance for any flight vehicle. Structural flexibility of airframes including wings may cause significant aeroelastic interactions that may degrade vehicle stability margins, potentially leading to loss of control. There may exist a trade-off between the desire of having light weight, flexible structures for weight savings and the need for maintaining sufficient robust stability margins from aeroelastic instability in some embodiments. In these embodiments, as may be seen, the overall aircraft is marginally unstable due to low damping ratio of the 1T mode. Thus, a flight control system may be able to stabilize aeroelastic modes.

The wing shaping control flap and slat systems may thus be used to achieve this objective. Clearly, it is generally not desirable to operate an unstable vehicle. Thus, in practice, aeroelastic tailoring in the design process may be used to increase aerodynamic and structural damping in some embodiments. Then, the role of a flight control system may be relegated to stability augmentation as opposed to or rather than a more demanding task of stabilization. This may be acceptable in some embodiments where there are many stability augmentation controllers such as yaw dampers in use to provide desired damping characteristics to meet pilot handling quality requirements.

Another objective of a flight control design is to derive requirements for flight control frequency bandwidth and dynamic amplitudes of control surfaces for proper actuation sizing. As the wing shaping control surfaces employing the variable camber continuous trailing edge flaps are used for both static wing shaping control as well as for stability augmentation or stabilization in some embodiments, the dynamic deflection requirements for the wing shaping control flap and slat systems may be added to the static deflection requirements to define the overall actuation system design requirements. In some embodiments, one focus is on outlining the multi-objective drag-cognizant flight control framework. Simulations are performed using the standard optimal control method to demonstrate stabilizing the unstable 1T mode while tracking the angle of attack command. In some embodiments, dynamic deflection requirements may also be considered by following a similar approach as outlined herein.

Because of the presence of potential structural mode interactions that may compromise aircraft stability, feedback flight control may be used to stabilize aeroelastic modes in some embodiments. As an example for illustration and explanation, one may consider the state space representation of the aeroservoelastic flight dynamic model $$\dot{x} = Ax + Bu \quad (6.1)$$

where $x = [\alpha \ q \ w \ \theta \ \dot{w} \ \dot{\theta}]^T$ is a state vector and $u = [\delta_{e,f}]$ is a control vector, assuming that all the states and control inputs are accessible in some embodiments.

One may further consider a flight control design to follow a desired angle of attack in-flight. Let $$z = \int_0^t \Delta \alpha d\tau$$

be an integral error state of the angle of attack, where $\Delta \alpha = \alpha - \alpha_c$ is the error between the angle of attack and its command signal. The augmented plant is expressed as $$\begin{bmatrix} \dot{z} \\ \dot{x} \end{bmatrix} = \begin{bmatrix} 0 & I_\alpha \\ 0 & A \end{bmatrix} \begin{bmatrix} z \\ x \end{bmatrix} + \begin{bmatrix} 0 \\ B \end{bmatrix} u - \begin{bmatrix} \alpha_t \\ 0 \end{bmatrix} \quad (6.2)$$

where $I_\alpha = [1 \ 0 \ 0 \ 0 \ 0 \ 0]$.

Let $\bar{x} = [\alpha \ \alpha q \ w \ \theta \ \dot{w} \ \dot{\theta}]^T$ be an augmented state vector. Then $$\dot{\bar{x}} = \bar{A}\bar{x} + \bar{B}u \quad (6.3)$$

$$\bar{A} = \begin{bmatrix} 0 & I_\alpha \\ 0 & A \end{bmatrix} \ \bar{B} = \begin{bmatrix} 0 \\ B \end{bmatrix} \ \hat{x}_c = -\begin{bmatrix} \alpha_c \\ 0 \end{bmatrix}$$

An improved or optimal control may be designed to minimize the following linear quadratic regulator (LQR) cost functional in some embodiments:

$$J_1 = \frac{1}{2} \int_0^{t_f} (\bar{x}^T Q \bar{x} + u^T R u) dt \quad (6.4)$$

where $Q = Q^T \geq 0$ and $R = R^T > 0$ are weighting matrices.

However, due to the drag penalty associated with the flap and slat deflections, the control objective may also attempt to minimize the drag penalty. Thus, a multi-objective optimal or improved control problem is posed in some embodiments by imposing an additional cost functional for minimization $$J_2 = \int_0^{t_f} |C_{D_f}||f|dt \quad (6.5)$$

This is a mixed $\mathcal{L}_1$ and $\mathcal{L}_2$ optimal control problem whose solution must satisfy both cost functionals (6.4) and (6.5) simultaneously in these embodiments. The design is an iterative process whereby an optimal control is obtained using the LQR method. The cost functional $J_2$ may be evaluated over the time interval; the control weighting matrices Q and R may then be adjusted by some techniques such as the gradient method to generate a new set of control inputs.

In these embodiments, one of the goals is then to seek optimal or improved weighting matrices Q and R that solve the multi-objective optimization problem. Due to the dimensionality of the weighting matrices Q and R and the time evolution of the solution which may be unstable, the optimization may be quite complex in some embodiments. In some embodiments, the LQR problem is considered at this time for the sole purpose of illustration and explanations, although other approaches may also be adopted.

For the purpose of illustration only, consider the $\mathcal{L}_2$ optimal control problem which is well-known to one of the ordinary skill in the art. The Hamiltonian of the system is given by $$H = \frac{1}{2}(\bar{x}^T Q \bar{x} + u^T R u) + \lambda^T (\bar{A}\bar{x} + \bar{B}u - \bar{x}_c) \quad (6.6)$$

where $\lambda$ is an adjoint state vector.

The optimality conditions are given by the adjoint equation $$\dot{\lambda} = \frac{\partial H^T}{\partial \bar{x}} = -Q\bar{x} - \bar{A}^T \lambda \quad (6.7)$$

and the optimal control $$\frac{\partial H^T}{\partial u} = Ru + \bar{B}^T \lambda = 0 \quad (6.8)$$

To solve for these equations in some embodiments, the adjoint equation and the state equation must be solved simultaneously along with the optimal control. Let $\lambda = P\bar{x} + S\bar{x}_c$ be a solution of the optimality conditions. Then, the adjoint equation is obtained as $$\dot{P}\bar{x} + P[\bar{A}\bar{x} - \bar{B}R^{-1}\bar{B}^T(P\bar{x} + S\bar{x}_c) - \bar{x}_c] + \\ \dot{S}\bar{x}_c + S\dot{\bar{x}}_c = -Q\bar{x} - \bar{A}^T(P\bar{x} + S\bar{x}_c) \quad (6.9)$$

Let $\alpha_c$ be a step input so that $\dot{\alpha}_c = 0$. Let $t_f \to \infty$, then the optimal solution approaches a steady state solution. Therefore, $\dot{P}(0) = 0$ and $\dot{S}(0) = 0$. Then, separating terms yields the following expression $$(P\bar{A} + \bar{A}^T P - P\bar{B}R^{-1}\bar{B}^T P + Q)\hat{x} + (-P\bar{B}R^{-1}\bar{B}^T S - P + \bar{A}^T S)\bar{x}_c = 0 \quad (6.10)$$

The optimal control is then obtained as $$u = -K\bar{x} + K_c \bar{x}_c \quad (6.11)$$

where $K = R^{-1}\bar{B}^T P$ is a feedback gain matrix, $K_C = R^{-1}\bar{B}^T S$ is a command feed forward gain matrix, and P and S are the steady state solutions of Eq. (6.10) given by $$P\bar{A} + \bar{A}^T P - P\bar{B}R^{-1}\bar{B}^T P + Q = 0 \quad (6.12)$$

$$S = (\bar{A}^T - P\bar{B}R^{-1}\bar{B}^T)^{-1} P \quad (6.13)$$

In some embodiments, multi-objective drag-cognizant optimal flight control for drag minimization that addresses the minimization of the cost functional $J_2$ will be further described in subsequent paragraphs.

Multi-objective Drag-Cognizant Flight control design for drag reduction is an enabling feature of the present invention. A typical flight control design usually takes into account different sets of requirements for performance and stability that must be considered during a design process. Performance in the context of flight control implies the ability for a flight control system to follow a pilot's command. However, in some embodiments, a new notion of aerodynamic performance is introduced into the flight control framework. One of the goals of the new air vehicle is to achieve low drag through active wing shaping control actuation. Drag penalty due to the VCCTE flap deflection is considered in a flight control design in some embodiments. Hence, a new scheme of multi-objective flight control is developed to not only achieve a pilot's command following objective but also a drag reduction objective during various flight maneuvers such as a pitch command or roll command.

Stability is of paramount importance for any air vehicle. Structural flexibility of airframes including wings may cause significant aeroelastic interactions that may degrade vehicle stability margins, potentially leading to loss of control. There exists a trade-off between the desire of having light weight, flexible structures for weight savings and the need for maintaining sufficient, robust stability margins from aeroelastic instability.

In some embodiments, as may be seen, the flutter speed occurs at a relatively low Mach number. Thus, a flight control system must be able to stabilize aeroelastic modes in these embodiments. The VCCTE flap system is designed to achieve this objective. Clearly, it is generally not desirable to operate an unstable vehicle. Thus, in practice, aeroelastic tailoring in the design process may be used to increase aerodynamic and structural damping. Then, the role of a flight control system is relegated to stability augmentation as opposed to or rather than a more demanding task of stabilization. This is acceptable in some embodiments as there are many stability augmentation controllers such as yaw dampers in use to provide desired damping characteristics to meet pilot handling quality requirements.

Gust load alleviation control is also an important part of the overall flight control strategy for flexible aircraft such as the ESAC (Elastically Shaped Aircraft Concept) in some of the previous described embodiments. As flexibility increases, the vehicle aeroelastic response to wind gust disturbances may result in handling quality issues for all air vehicles as well as ride quality problems for, for example, passenger air vehicles. Gust load alleviation control will reduce the aeroelastic response by reactive feedback control or predictive feed-forward control using early detection turbulence sensors. For reactive feedback control, adaptive control may potentially provide an effective solution.

The variable camber feature of the VCCTE flap is created by the three chordwise flap segments in some exemplary embodiments. It shall be noted that the three chordwise flap segments are chosen for these exemplary embodiments for the ease of illustration and explanation, and that a VCCTE flap system may comprise two or more chordwise flap segments in various embodiments. For flight control functions, the outermost chordwise flap segment is designed to be a fast acting control surface in some embodiments. This flap segment is assumed to span the entire wing and to have sufficient bandwidth and control power for roll control and flutter suppression control as well as drag reduction control in these embodiments.

Because the VCCTE flap may comprise a piecewise continuous control surface in some embodiments, the VCCTE flap needs to be treated in a special way.

For the ease of illustration and explanation, it may assumed that the ideal continuous trailing edge of the VCCTE flap is mathematically smooth and may be described by a Fourier sine series in some embodiments as follows:

$$\delta^*(x) = A_0 + \sum_{n=1}^{N} A_n \sin\frac{n\pi x}{L} \quad (113)$$

where $\delta^*(x)$ is a theoretical VCCTE flap deflection and N is the number of terms in the Fourier sine series. It shall be noted that other mathematical expressions, such as other series expansions or polynomial expressions, may also be used to describe the continuous trailing edge of the VCCTE flap.

In these embodiments, the trailing edge of the VCCTE flap is only piecewise continuous due to a physical implementation. Therefore, the actual VCCTE flap deflection is a piecewise linear approximation of the theoretical VCCTE flap deflection. Thus $$\delta(x) = A_0 + \frac{x}{x_{i+1} - x_i} \sum_{n=1}^{N} A_n \left(\sin\frac{n\pi x_{i+1}}{L} - \sin\frac{n\pi x_i}{L}\right), x_i \leq x < x_{i+1} \quad (114)$$

where $x_i$, i=1, 2, . . . , m is the location of one of the two edges of a spanwise flap segment, and m is the number of spanwise segments of the VCCTE flap deflection.

Note that $A_0$ is the constant flap deflection that is needed to provide flexibility for multi-objective flight control, especially for drag reduction control in these embodiments. The constant flap deflection at the wing tip may be used to create a zero lift condition to minimize tip vortices. The quantities $A_n$, n=0, 1, . . . , N may be viewed as virtual control variables. The virtual control variables may then be used in a flight control design to determine their command settings. In these embodiments, the actual VCCTE flap deflection command $\delta(x_i)$ may be computed from the virtual control commands $A_n$.

It is assumed that the distributed aeroelastic system of an elastic wing is converted into a finite-dimensional system using the Galerkin method, finite-element method, or other suitable mathematical techniques that are known to one of ordinary skill in the art. Then the state space representation of the aeroservoelastic flight dynamic model may be expressed as $$\begin{bmatrix} \dot{x}_e \\ \dot{x}_r \end{bmatrix} = \begin{bmatrix} A_e & A_{er} \\ A_{re} & A_r \end{bmatrix} \begin{bmatrix} x_e \\ x_r \end{bmatrix} + \begin{bmatrix} B_e & B_{er} \\ B_{re} & B_r \end{bmatrix} \begin{bmatrix} u_e \\ u_r \end{bmatrix} \quad (115)$$

where $x_e$ is the wing aeroelastic state vector, $x_r$ is the rigid-body aircraft state vector, $u_e = [A_0 \ A_1 \ \ldots \ A_N]^T$ is the virtual control vector, and $u_r$ is the deflection vector of conventional flight control surfaces such as the elevator, aileron, and rudder.

In some embodiments, the aeroelastic state vectors may not be accessible but may be estimated by an observer design which is a standard control practice. It may be assumed that sufficient aeroelastic deflection sensors such as accelerometers or fiber optics sensors are available for the observer design in some embodiments.

In addition or in the alternative, one may reconstruct the aeroelastic deflections from limited sensor measurements by, for example, a model-based approach. Assuming that the aeroelastic states may be reconstructed by an observer design for feedback control and that the estimation error is sufficiently small in some embodiments, then a flight control task may be designed with the estimated aeroelastic states as feedback state variables.

In some embodiments, the model-based approach for reconstruction of the aeroelastic deflections from limited sensor measurements involves a mathematical model that computes the aeroelastic deflection off-line. This mathematical model may be used to relate the relative amplitude and phase information at a particular frequency of any point on an aircraft wing to the amplitude and phase information at the sensor measurement locations. The sensor signals are then transformed into the frequency domain using a Fast Fourier Transform (FFT) method. By properly scaling of transformed signals at a particular frequency, the amplitude and phase information at any point on the aircraft wing may be estimated. Thus, a signal of the aeroelastic deflection may be reconstructed in the frequency domain in this manner. Using an inverse FFT method, the frequency signal may be transformed back into the time domain for use in the flight control system as a feedback signal.

As an example, consider a flight control design for an angle of attack command. Let $$x_a = \int_0^\tau \Delta \alpha d\tau$$

be an integral error state of the angle of attack, where $\Delta\alpha = \alpha - \alpha_c$ is the error between the angle of attack and its command signal. The augmented plant is expressed as $$x_a = A_a(x_r - x_c) \quad (116)$$

where $x_c$ is a command vector.

Let $x = [x_e \ x_r \ x_a]^T$ and $u = [u_e \ u_r]^T$. Then the augmented plant is expressed as $$\dot{x} = Ax + Bu + z \quad (117)$$

where $$A = \begin{bmatrix} A_e & A_{er} & 0 \\ A_{re} & A_r & 0 \\ 0 & A_a & 0 \end{bmatrix}, B = \begin{bmatrix} B_e & B_{er} \\ B_{re} & B_r \\ 0 & 0 \end{bmatrix}, z = \begin{bmatrix} 0 \\ 0 \\ -A_a x_c \end{bmatrix}$$

An optimal control is designed with the following multi-objective cost function $$J = \frac{1}{2} \int_0^{t_f} (x_a^T Q_a x_a + x_c^T Q_c x + u^T R u + q_D C_D) dt \quad (118)$$

In these embodiments, the first term in the cost function is designed to track the command signal; the second term in the cost function is designed to stabilize any aeroelastic modes; and the third term is designed to minimize the control effort. Hence, the first three terms in the cost function form the standard linear-quadratic regulator (LQR) cost function in these embodiments. The last term may be designed to minimize the drag coefficient with $q_D$ as a weighting constant and thus represents an enabling feature of the present invention. It is assumed that the drag coefficient may be estimated accurately via a drag polar model for which the drag polar parameters are known. The drag polar model may be expressed as $$C_D = C_{D_0} K (C_{L_0} + C_{L_x} x + C_{L_u} u)^2 + C_{D_u} u + u^T C_{D_u^2} u \quad (119)$$

where K is the drag polar parameter, $C_{L_x}$ is the lift stability derivative row vector, $C_{L_u}$ is the lift control derivative row vector, $C_{D_u}$ is the drag control derivative row vector, and $C_{D_u^2}$ is the positive-definite quadratic drag control derivative matrix.

The cost function may now be expressed as $$J = \frac{1}{2} \int_0^{t_f} \left[ x^T Q x + u^T R u + q_D C_{D_0} + q_D K (C_{L_0} + C_{L_u} x + C_{L_u} u)^2 + q_D C_{D_u} u + u^T q_D C_{D_u^2} u \right] dt \quad (120)$$

where $Q = Q^T > 0$.

The Hamiltonian function of the optimal control problem is defined as $$H = \frac{1}{2} \left[ x^T Q x + u^T R u + q_D C_{D_u} + q_D k (C_{L_0} + C_{L_u} x + C_{L_u} u)^2 + q_D C_{D_u} u + u^T q_D C_{D_u^2} u \right] + \lambda^T (Ax + Bu + z) \quad (121)$$

where $\lambda$ is the adjoint vector.

The adjoint equation may be obtained as $$\dot{\lambda} = -\frac{\partial H^T}{\partial x} = -Qx - q_D k C_{L_0}^T (C_{L_0} + C_{L_u} x + C_{L_u} u) - A^T \lambda \quad (122)$$

The optimality condition is $$\frac{\partial H^T}{\partial u} = 0 = Ru + q_D K C_{L_0}^T (C_{L_0} + C_{L_u} x + C_{L_u} u) + \frac{1}{2} q_D C_{D_u^2} u + B^T \lambda \quad (123)$$

Solving for the optimal control yields $$u = -(R + q_D K C_{L_u}^T C_{L_u} + q_D C_{D_u^2})^{-1} \left( q_D K C_{L_u}^T C_{L_0} + \frac{1}{2} q_D C_{D_u}^T + q_D K C_{L_u}^T C_{L_x} x + B^T \lambda \right) \quad (124)$$

To solve for these equations, the adjoint equation and the state equation must be solved simultaneously along with the optimal control. Let $\lambda = Px + Sz + \lambda_0$ be a solution of the adjoint vector. Then, the adjoint equation is obtained as $$\dot{P}x + P\dot{x} + \dot{S}z + S\dot{z} = -(Q + q_D K C_{L_x}^T C_{L_x} + A^T P)x - \quad (125)$$
$$A^T Sz - q_D K q_D K C_{L_x}^T C_{L_0} - A^T \lambda_0 +$$
$$q_D K C_{L_x}^T C_{L_u}(R + q_D K C_{L_u}^T C_{L_u} + q_D C_{D_{u^2}})^{-1}\Big(q_D K C_{L_u}^T C_{L_0} +$$
$$\frac{1}{2} q_D C_{D_u}^T + q_D K C_{L_u}^T C_{L_x} x + B^T P x + B^T S z + B^T \lambda_0\Big)$$

Let $\alpha_c$ be a step input so that $\dot{\alpha}_c=0$. Let $t_f \to \infty$, then the optimal solution approaches a steady state solution. Therefore, $\dot{P}(0)=0$ and $\dot{S}(0)=0$. Then, separating terms yields the following expressions $$PA + A^T P - (PB + q_D K C_{L_u}^T C_{L_x})(R + q_D K C_{L_u}^T C_{L_u} + q_D C_{D_{u^2}})^{-1}(B^T P + q_D K C_{L_u}^T C_{L_x}) + Q + q_D K C_{L_x}^T C_{L_x} = 0 \quad (126)$$

$$\lambda_0 = \quad (128)$$
$$[(PB + q_D K C_{L_x}^T C_{L_u})(R + q_D K C_{L_u}^T C_{L_u} + q_D C_{D_{u^2}})^{-1} B^T - A^T]^{-1} \times \times$$
$$[q_D K C_{L_x}^T C_{L_0} - (PB + q_D K C_{L_x}^T C_{L_u}) R + q_D K C_{L_u}^T C_{L_u} + q_D C_{D_{u^2}})^{-1}$$
$$\Big(q_D K C_{L_u}^T C_{L_0} + \frac{1}{2} q_D C_{D_u}^T\Big)]$$

Equation (126) is a Ricatti equation expressed in a non-standard form. It may be recast in a standard form as $$P\bar{A} + \bar{A}^T P - P B \bar{R}^{-1} B^T P + \bar{Q} = 0 \quad (129)$$

where $$\bar{A} = A - B\bar{R}^{-1} q_D K C_{L_u}^T C_{L_x} \quad (130)$$

$$\bar{R} = R + q_D K C_{L_u}^T C_{L_x} + q_D C_{D_u^2} \quad (131)$$

$$\bar{Q} = Q + q_D K C_{L_x}^T C_{L_x}(1 - \bar{R}^{-1} q_D K C_{L_u}^T C_{L_x}) \quad (132)$$

The optimal control is then given by $$u = \bar{R}^{-1}\Big[q_D K C_{L_u}^T C_{L_0} + \frac{1}{2} q_D C_{D_u}^T + \quad (133)$$
$$B^T \lambda_0 + (B^T P + q_D K C_{L_u}^T C_{L_x})x + B^T S z\Big]$$

In these embodiments, an optimal or improved control framework has been developed to address the drag reduction control during maneuvers for an aircraft with highly flexible wings. The multi-objective drag-cognizant flight control addresses simultaneously pilot command tracking tasks, aeroelastic stabilization, and drag reduction control simultaneously.

In these embodiments, wing shaping control has a potential drag reduction benefit. Variable embodiments demonstrate that to harvest the potential of wing shaping control, configuration changes in high-lift devices may have to be a part of the wing shaping control strategy. Flap and slat devices inherently generate drag as they increase lift. Conventional flap and slat systems as in the current generation aircraft are not aerodynamically efficient enough for drag-reducing control strategies like wing shaping control. The variable camber continuous trailing flap system or the variable camber continuous leading edge slat system developed in some embodiments may offer a big pay-off for drag reduction even when used in current generation aircraft.

In some embodiments, different performance objectives may be required such as take-off, landing, climb-out, or descent. The variable camber continuous trailing edge flap and or continuous leading edge slat system(s) may be configured to change the wing shape continually throughout the flight envelope in order to harvest the best potential of the flap and slat systems. For example, during take-off and landing, the variable camber continuous trailing edge flap and continuous leading edge slat may be configured to deflect uniformly along the wing span to some value of flap deflection that generate high lift needed for take-off and landing.

Figure 25A:
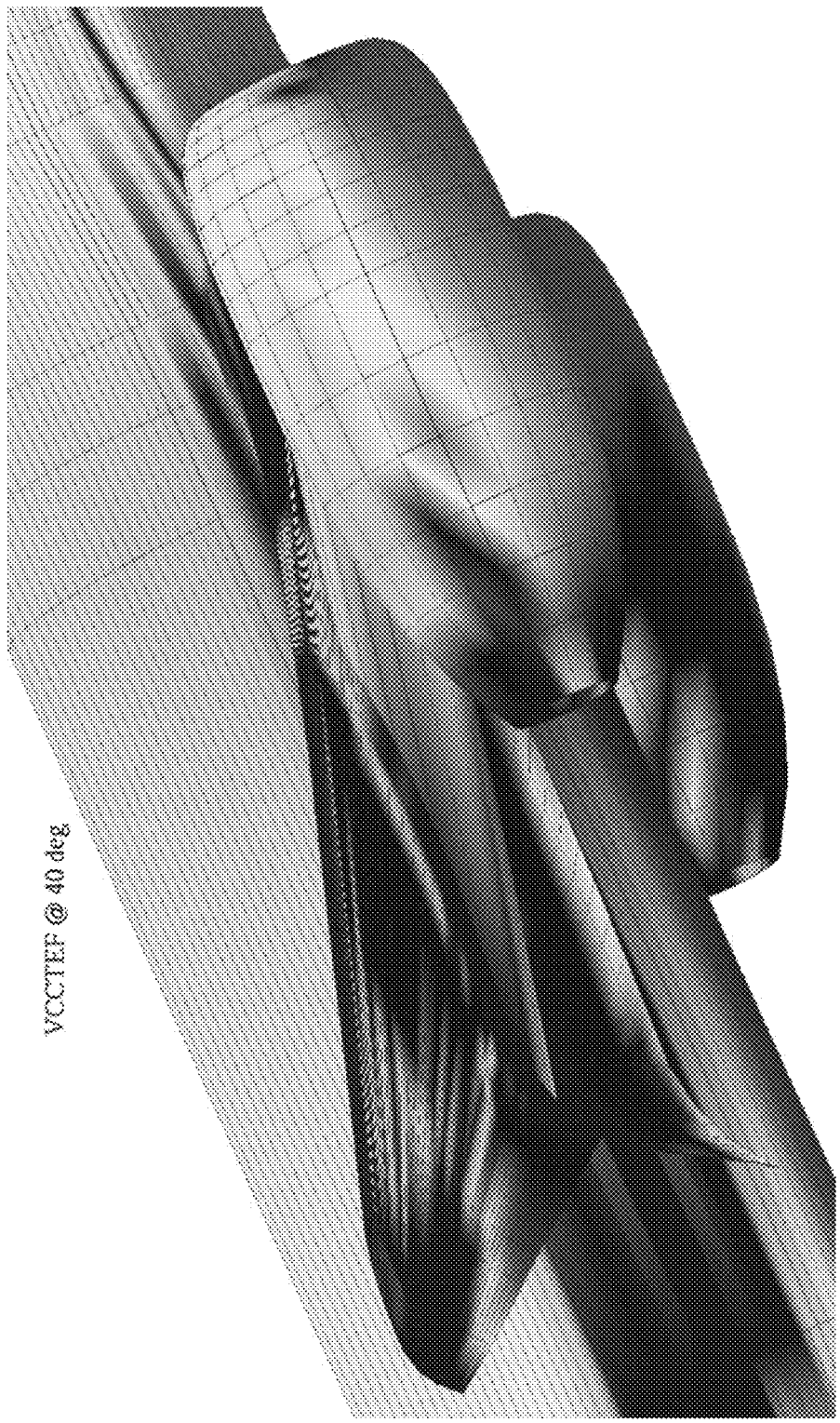
FIGS. 25A-B shows pressure distribution over a section of an exemplary airplane with the variable camber continuous trailing edge flap at a take-off and landing configuration whereby the flap deflection is at 40 degrees.
Figure 25B:

FIGS. 25A-B illustrate pressure distribution over a section of an exemplary airplane with the variable camber continuous trailing edge flap at a take-off and landing configuration whereby the flap deflection is at 40 degrees in some embodiments. FIGS. 25A-B illustrate plots of the lift coefficient ($C_L$) versus the angle of attack ($\alpha$) up to 10 degrees in some embodiments.

Figure 26A:
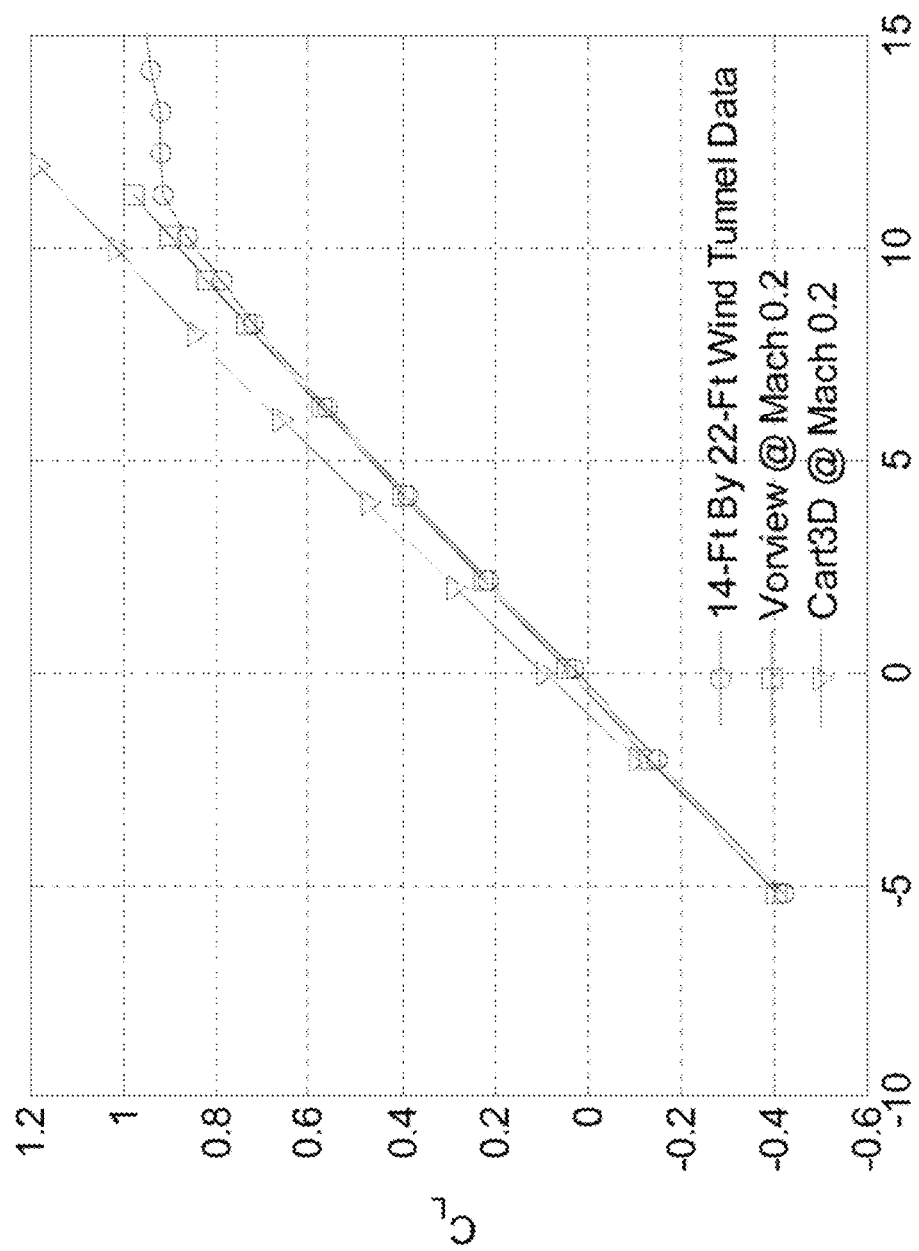
FIG. 26A shows that the vortex-lattice $C_L$ prediction agrees with wind tunnel data in an illustrative example.
Figure 26B:
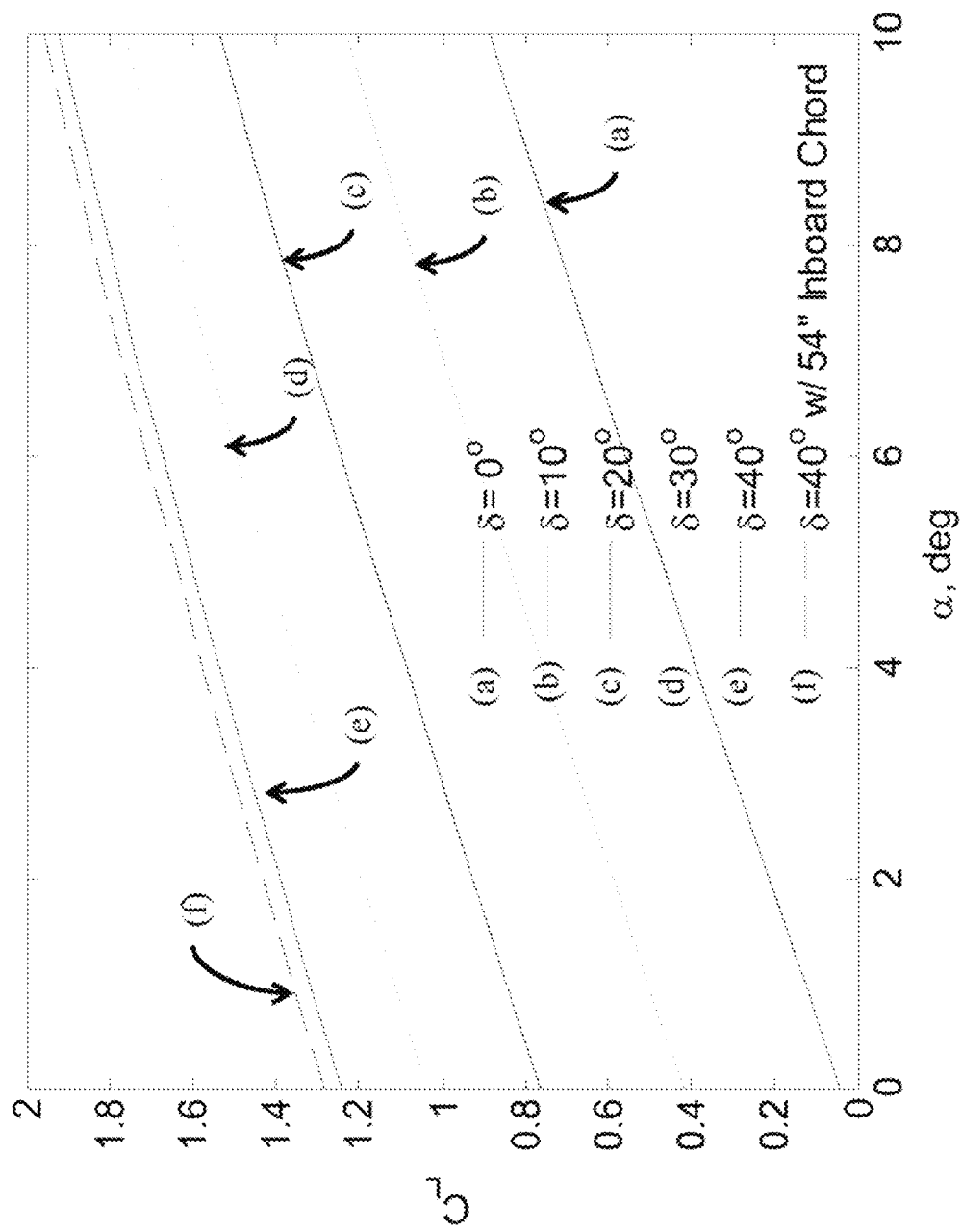
FIG. 26B shows plots of $C_L$ versus the angle of attack ($\alpha$) at multiple deflections of 48-inch inboard flap chord and a plot of $C_L$ versus the angle of attack ($\alpha$) at 40 degrees for a 54-inch inboard flap chord in some embodiments.

FIG. 26A shows that the vortex-lattice $C_L$ prediction agrees with wind tunnel data in an illustrative example. FIG. 26A further shows that the stall $\alpha$ occurs at about 12 degrees for a clean wing, and that the stall $\alpha$ is estimated to be reduced by 2 degrees (and hence 10 degrees stall $\alpha$) for wing-flap system. FIG. 26B shows plots ((a)-(e) in FIG. 26B) of $C_L$ versus the angle of attack ($\alpha$) at multiple deflections of 48-inch inboard flap chord and a plot ((f) in FIG. 26B) of $C_L$ versus the angle of attack ($\alpha$) at 40 degrees for a 54-inch inboard flap chord in some embodiments.

In FIG. 26B, the maximum lift coefficient, $C_L$, which may be generated by the variable continuous trailing edge flap may be as much as 1.956. In some embodiments, the variable camber continuous trailing edge flap may include a provision for creating a gap or slot between the wing portion and the flap system by allowing the flap to be extended backward as the flap is actuated to its deflected position for take-off and landing. Some embodiments may include a slot between two chordwise flap segments as illustrated in FIG. 5G. For example, with the slot provision, the maximum $C_L$ may be further increased to a value of about 2.3 required for a conventional take-off or approach speed for landing.

In some embodiments, the variable camber continuous trailing edge flap system may be deployed continuously in-flight as an aircraft climbs to an altitude and or descends from an altitude. The variable camber continuous trailing edge flap deflection may be optimized along with a trajectory optimization to achieve a combined optimal aerodynamic efficiency to minimize fuel burn. For example, the variable camber continuous trailing edge flap setting may be scheduled as a function of the altitude, airspeed, and aircraft weight or fuel weight along an optimal trajectory determined off-line from the trajectory optimization.

Another observation is made with regards to a wing shaping control strategy using flap-type actuation devices in that aerodynamic efficiency, which is the lift-to-drag ratio, may dictate wing shaping control flaps to operate only in the positive (downward) flap deflections in some embodiments. For a positively cambered wing section, a positive flap deflection causes the airfoil camber to increase that in turn generates more lift. Any attendant drag increase as a result of lift increase may be more desirable than drag increase as a result of lift decrease, as may be the case with negative (upward) flap deflections. The optimal point in cruise to harvest the most potential out of wing shaping control may be at the start of cruise when the aircraft wing may be at its desired optimal wing shape, which may require aeroelastic tailoring of the as-built wing shape.

Furthermore, the issues of wing flexibility on vehicle stability cannot be ignored. No matter how aerodynamically efficient an aircraft may be, it may not fly if it is unstable. Flight control may be used to stabilize aeroelastic instability that may be associated with wing flexibility, as demonstrated in some embodiments presented in some of the preceding sections. In addition, aeroelastic tailoring by properly distributing wing stiffness throughout the airframe may also improve stability margins of aeroelastic modes. One of the roles of flight control is then relegated to stability augmentation which may reduce the demand on a flight control system. In any case, increased wing flexibility may result in more susceptibility to potentially severe responses to air turbulence and wind gusts without proper flight control design as presented in some embodiments described herein.

2. Guidance Law:

To minimize drag in cruise, the aircraft may schedule changes in its attitudes and wing configurations accordingly. As discussed earlier, for the remaining fuel above the halfway point, there may be no need for static wing shaping control in some embodiments. However, wing shaping control flaps and slats may still be used for aeroelastic stability augmentation or stabilization in some embodiments. When the fuel falls below the halfway point, wing shaping control may be engaged continuously until the end of cruise in some embodiments. The angle of attack may also be scheduled to change as the fuel is consumed in some embodiments. Thus, a guidance law may be developed to schedule the angle of attack and the wing shaping control flaps and slats to engage as a function of the fuel weight.

It shall be noted that this mode of operation is for illustration only and represents one possible operation with wing shaping control. In some embodiments, the static wing shaping control will be continually active at all points in the flight envelope.

For the purpose of the guidance law development, the variable camber continuous trailing edge flap system is used in some embodiments. For the ease of explanation and illustration, it may be further assumed that the incremental $\Delta C_{L_f}$ and $\Delta C_{D_f}$ are linearly varying with the flap deflections. Let $W_f$ be the weight of the remaining fuel in the tank, which is assumed to be observable through a fuel gauge indicator. Then the weight of the aircraft at any point is the sum of the operational empty weight plus passengers and cargo and the fuel weight. This may be expressed as $$W = W_e + W_f \quad (6.14)$$

where $W_e = 150{,}000$ pounds.

The angle of attack may be readily computed as $$\alpha = \frac{1}{C_{L_\alpha}} \left( \frac{W_e + W_f}{q_\infty S} - C_{L_0} \right) \quad (6.15)$$

for $W_f \geq 0.5 W_{max} = 25{,}000$ pounds, where $W_{max} = 50{,}000$ pounds is the maximum fuel weight, $$C_{L_0} = 0.1067,\ C_{L_\alpha} = \frac{6.3451}{\text{rad}},$$

and $q_\infty S = 549{,}313$ pounds.

When $W_f < 0.5 W_{max}$, the wing shaping control flap is engaged. Then $$\Delta C_{L_f} = -0.4376 \left( \frac{W_f}{W_{max}} - \frac{1}{2} \right) \quad (6.17)$$

So, if the angle of attack is held at a scheduled value for no flap, then the aircraft may have to increase in altitude as a result of increased lift, or conversely the angle of attack may have to be reduced in order to maintain the same altitude. Consider the guidance law for constant altitude cruise. The angle of attack schedule is given by $$\alpha = \begin{cases} 1.5021 + \dfrac{W_f}{60{,}833} & 25{,}000 \leq W_f \leq 40{,}000 \\ -0.4736 + \dfrac{W_f}{10475} & 10{,}000 \leq W_f \leq 25{,}000 \end{cases} \quad (6.18)$$

The flap deflection varies linearly from 3.924 degrees at 20 percent fuel in the tank to 0 degrees at 50 percent fuel in the tank. So, the flap schedule is $$f = \begin{cases} 0 & 25{,}000 \leq W_f \leq 40{,}000 \\ -13.08 \left( \dfrac{W_f}{50{,}000} - \dfrac{1}{2} \right) & 10{,}000 \leq W_f \leq 25{,}000 \end{cases} \quad (6.19)$$

Figure 12A:
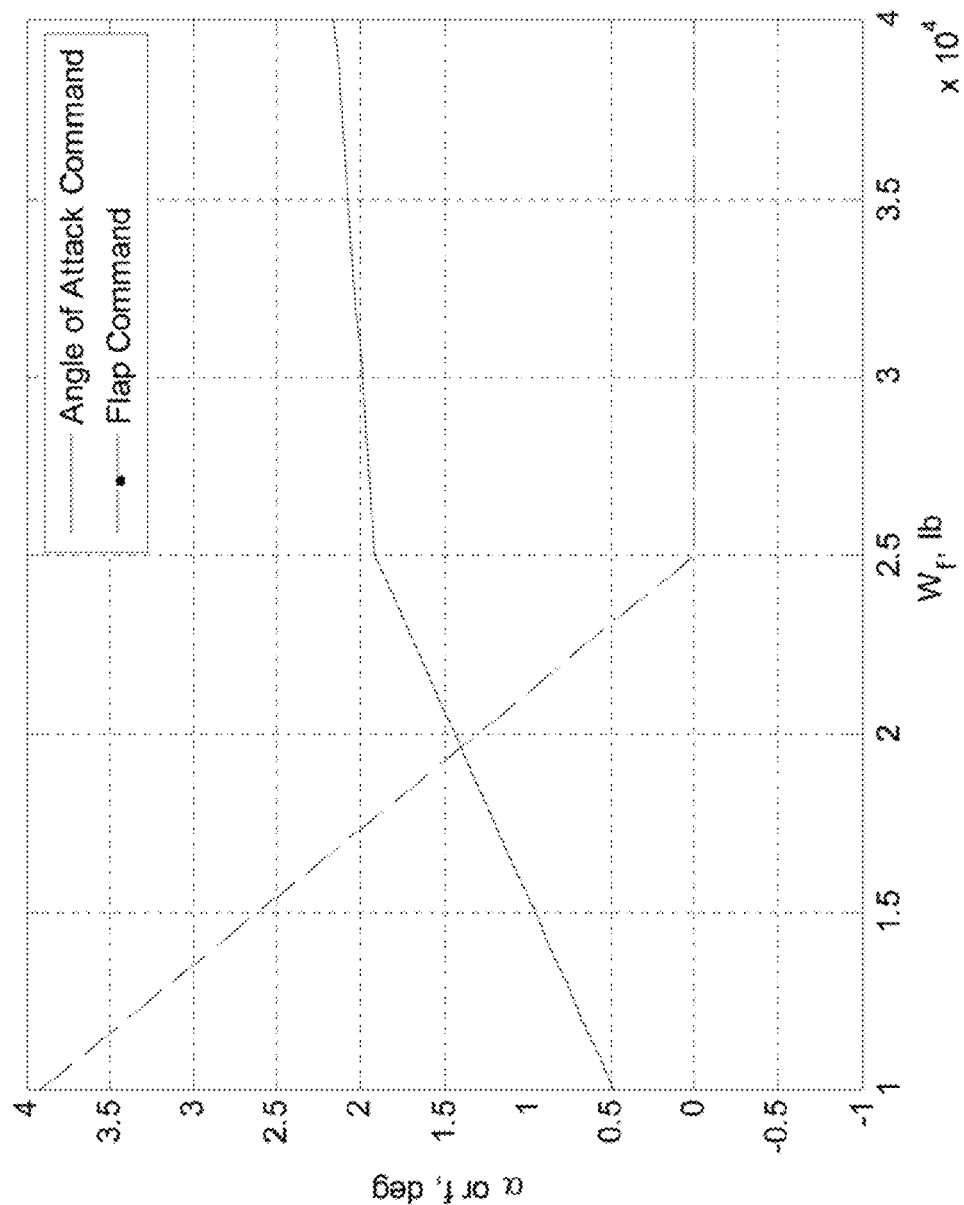
FIG. 12A shows a plot of the angle of attack ($\alpha$) and the flap deflection schedules.

FIG. 12A shows the angle of attack and flap deflection schedules.

3. Flight Control Simulation:

Using the guidance developed, a flight control simulation may be conducted to assess the abilities for the flight control system to track the angle of attack guidance law and, more importantly, to stabilize the unstable 1T mode. The simulation only uses the LQR optimal control, and drag minimization in the flight control is not considered for the ease of illustration and explanation in some exemplary embodiments. The standard flap and slat systems are used in the simulation instead of the variable camber continuous trailing edge flap system, also for the ease of illustration and explanation in these exemplary embodiments. The weighting matrices are chosen as $Q = \text{diag}(0.1, 0, 0.01, 0.01, 0.01, 0.01, 0.01)$ and $R = 0.1I$ where $I$ is the identity matrix of a proper dimension. The simulation time is chosen to be 4 hours of cruise time. The angle of attack command is computed from the guidance law and then is filtered through a first-order filter to smooth out the command signal. The filtered angle of attack is computed as $$\dot{\alpha}_c = -\lambda(\alpha_c - \alpha_g) \quad (6.20)$$

where $\alpha_g$ is the angle of attack obtained from the guidance law, and $\lambda = 2$.

Figure 12B:
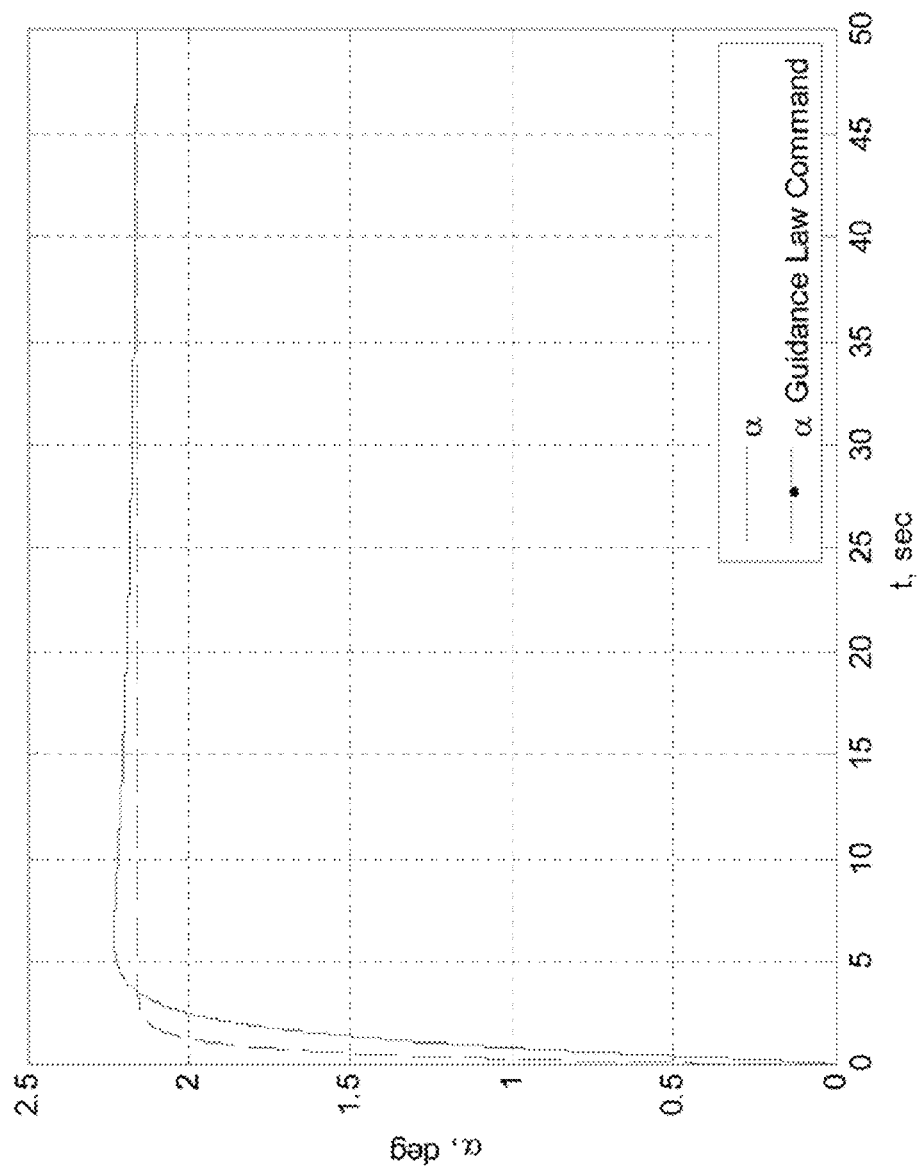
FIG. 12B shows the angle of attack ($\alpha$) response.
Figure 13:
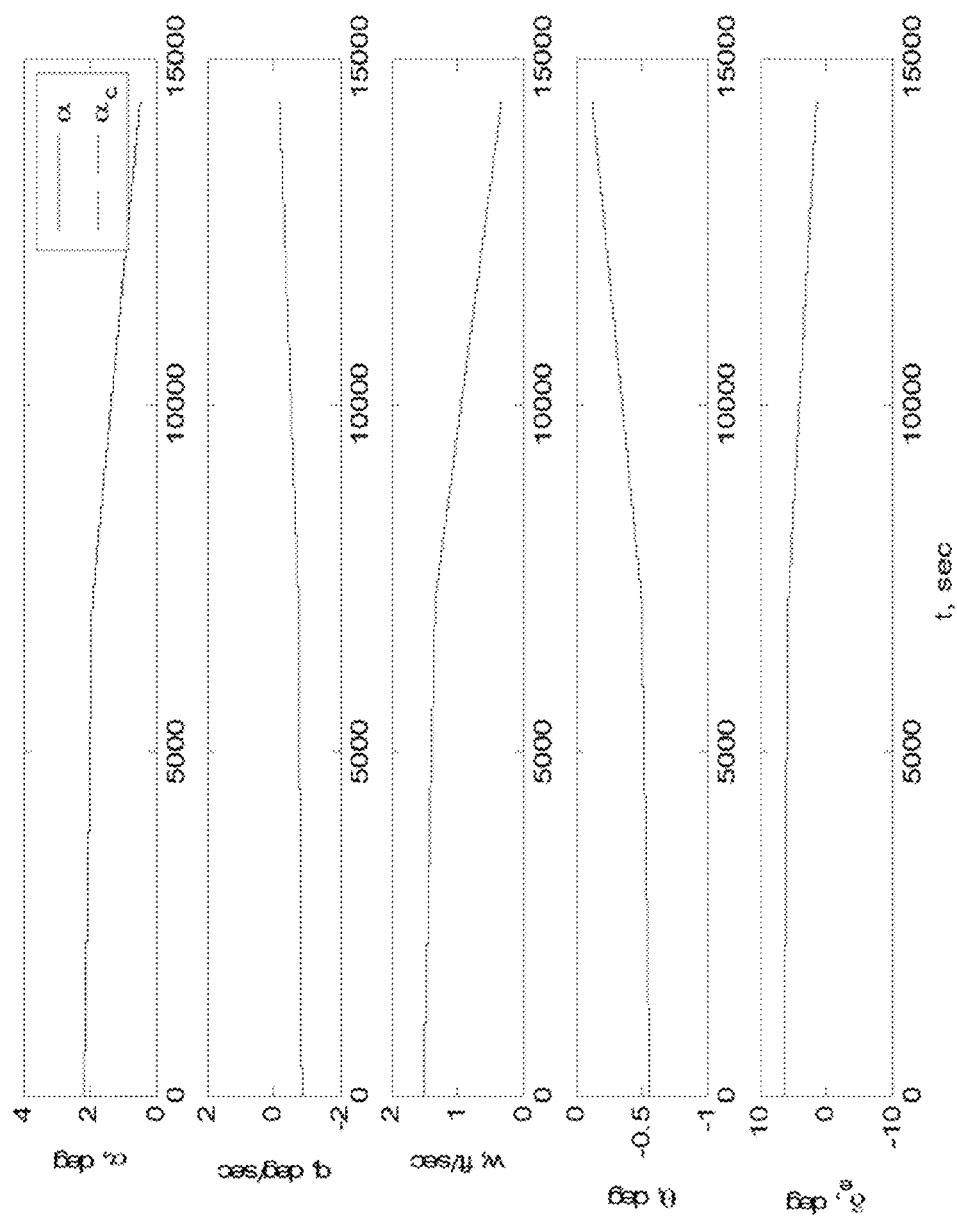
FIG. 13 shows the aircraft response.

FIG. 12B is a plot of the aircraft angle of attack response for the first 50 seconds. FIG. 13 is a plot of the aircraft responses. The flight control design is able to stabilize the unstable 1T mode even though the aircraft is open-loop unstable. The maximum aileron deflection is about 8 degrees.

Figure 14:
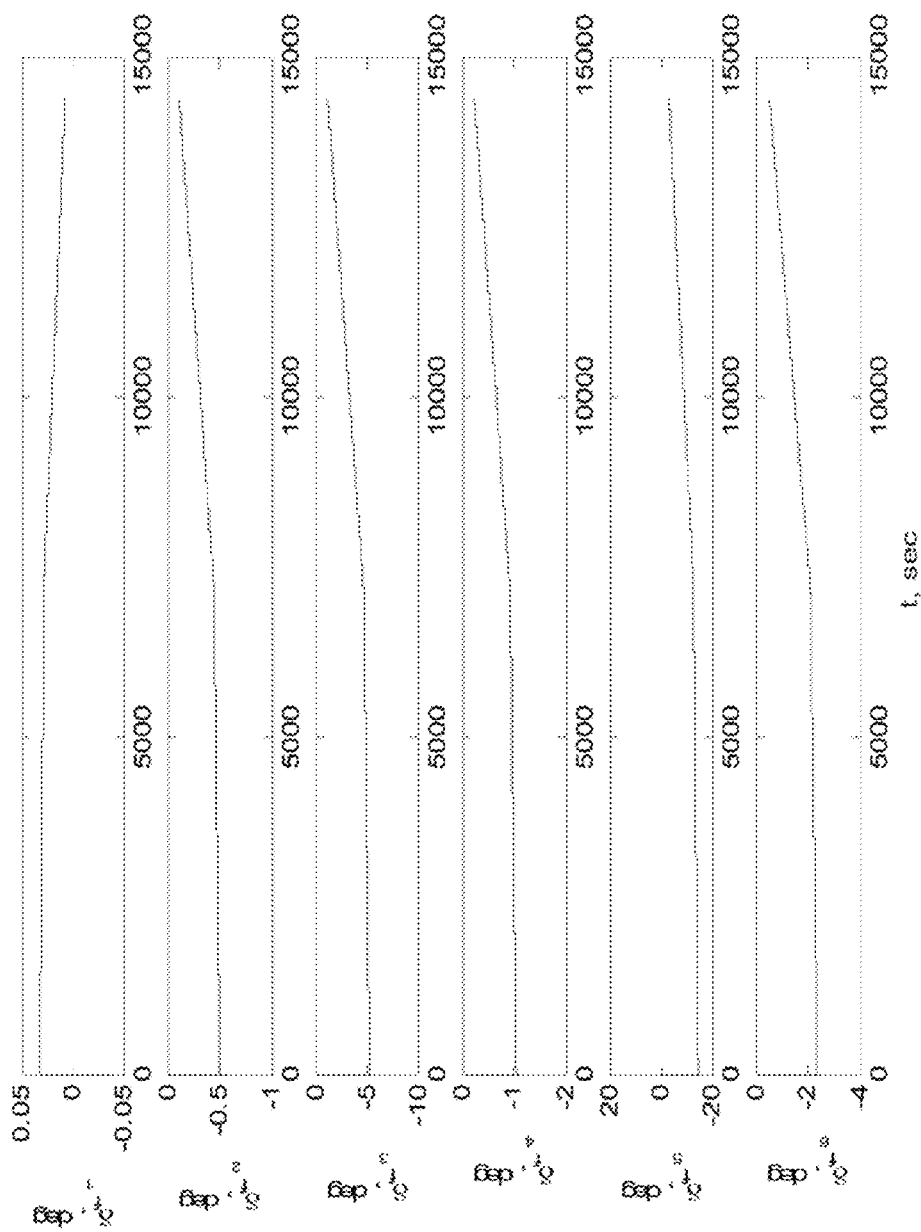
FIG. 14 shows wing shaping control flap inputs in some embodiments that have not been optimized for drag minimization.
Figure 15:
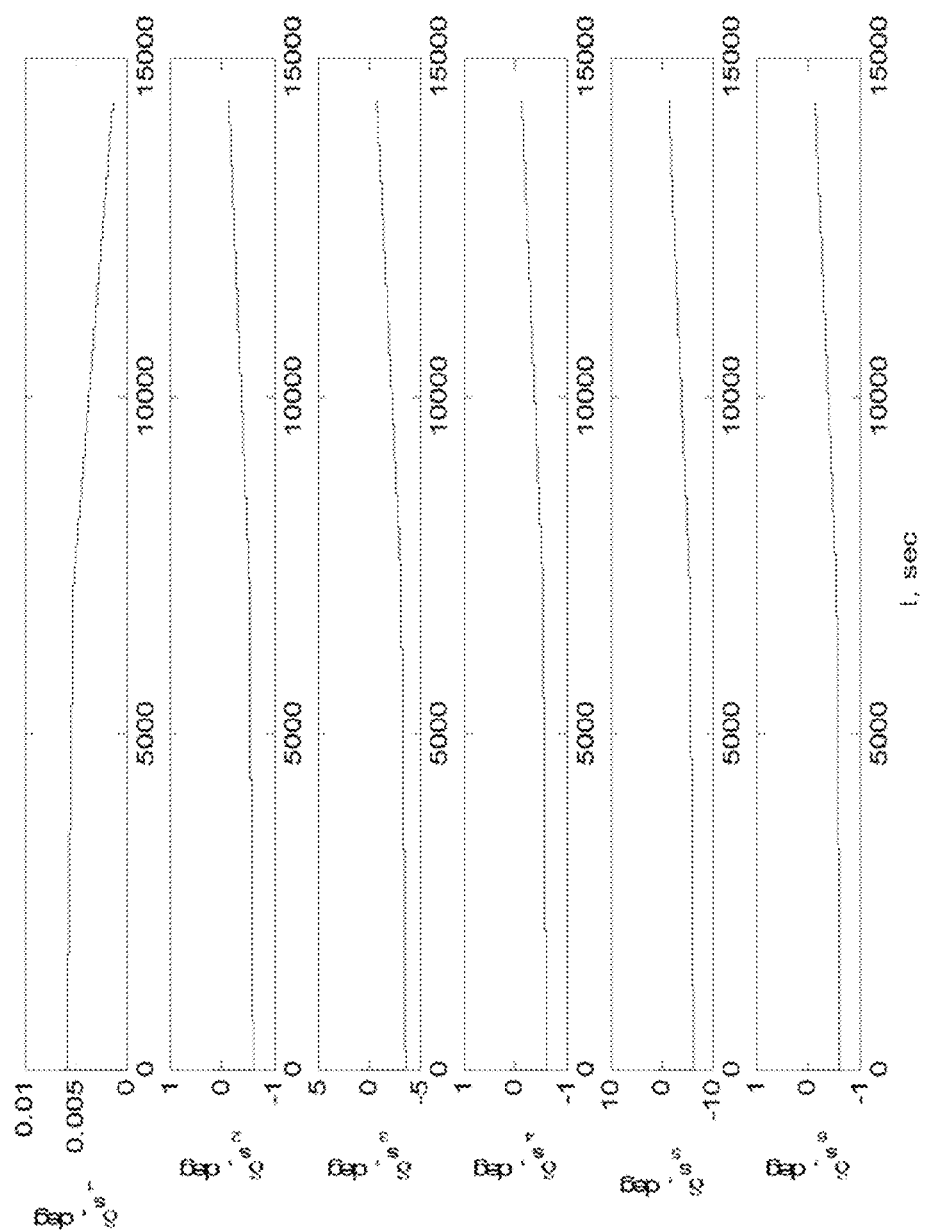
FIG. 15 shows wing shaping control slat inputs in some embodiments that have not been optimized for drag minimization.

FIGS. 14 and 15 are the plots of the wing shaping control flap and slat inputs. These flap and slat inputs are not optimized for drag minimization, so they are not necessarily the same as the required deflections developed in the section entitled "Flap and Slat Deflection Requirements" above. One of the objectives of the simulation is to demonstrate the capabilities of feedback control to stabilize aeroelastic instability and at the same time provide good command-following performance to achieve a desired guidance law.

Figure 24A:
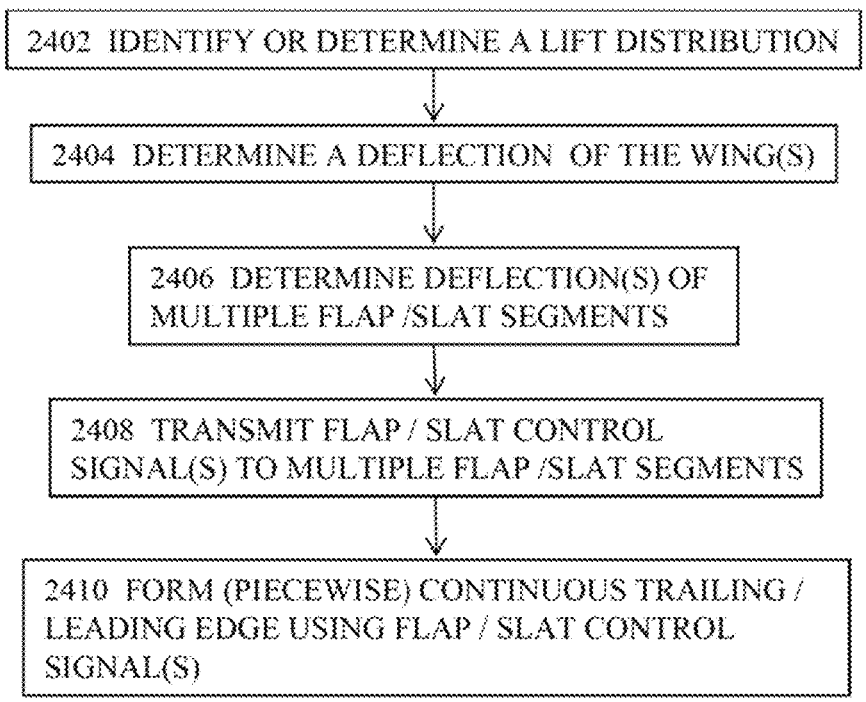
FIG. 24A shows a top level flow diagram of a process for implementing active control of a wing shape in some embodiments.

4. Active Wing Shaping Control:

FIG. 24A shows a top level flow diagram of a process for implementing active control of a wing shape in some embodiments. In some embodiments, the process for implementing active control of a wing shape comprises identifying or determining a lift distribution, 2402. For example, the process may identify or determine an optimal or desired lift distribution based at least in part on a flight envelope, which refers to the capabilities of an air vehicle in terms of airspeed, load factor (e.g., the ratio of the lift of the air vehicle to its weight), or altitude.

The process may further comprise a subprocess 2404 of determining the wing deflection in some embodiments. For example, the process may determine a desired or optimal wing deflection based at least in part upon the lift distribution. The process for implementing active control of a wing shape may further comprise the subprocess 2406 of determining one or more deflections for at least one of multiple flap or slat segments. The process may then transmit 2408 one or more flat or slat control signals to the flap system or slat system to actuate the flap system or the slat system to deflect the targeted flap(s) or slat(s), to form 2410 a continuous trailing edge flap system and/or leading edge flap system.

Figure 24B:
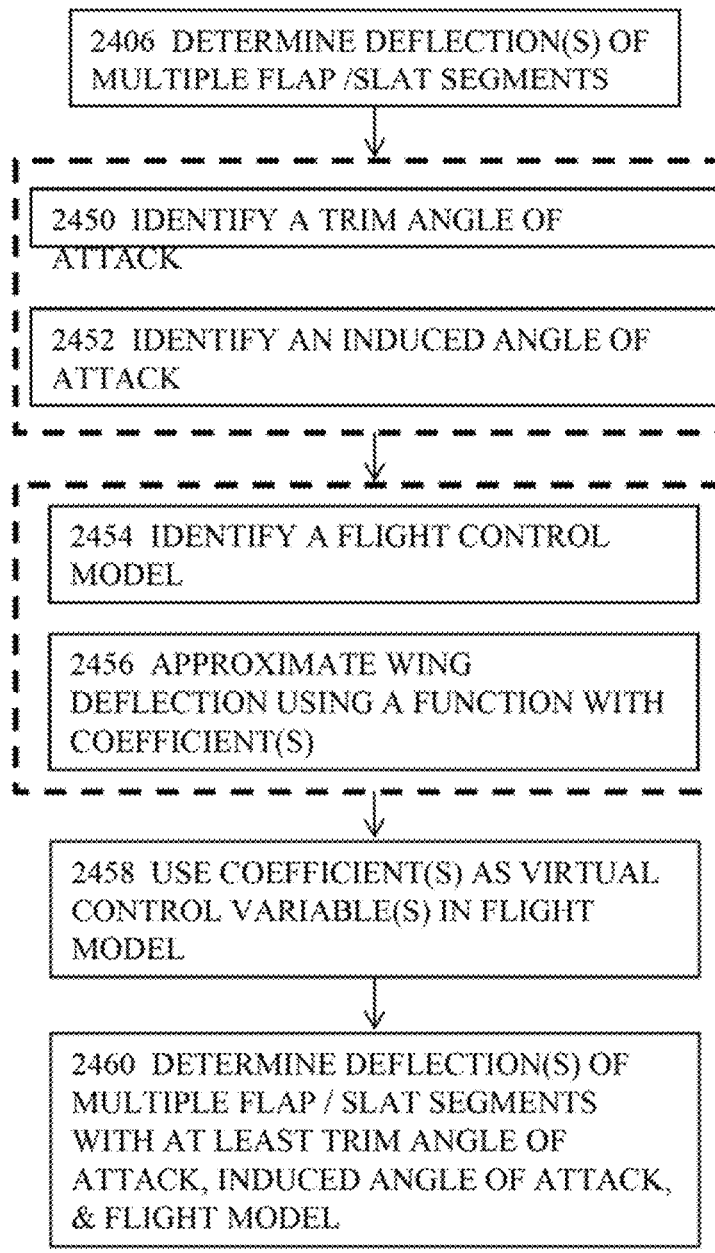
FIG. 24B shows more details of the process for implementing active control of a wing shape illustrated in FIG. 24A in some embodiments.

FIG. 24B shows more details of the process for implementing active control of a wing shape illustrated in FIG. 24A in some embodiments. More specifically, FIG. 24B illustrates a more detailed process for the subprocess 2406 of determining one or more deflections of the flap system or the slat system in some embodiments. In these embodiments, the subprocess 2406 may identify a trim angle of attack at 2450 and/or identify an induced angle of attack at 2452. The subprocess 2406 may further identify a flight control model at 2454 and approximate the wing deflection, which is determined at 2404, by using a function at 2456.

In some embodiments, the subprocess 2406 may use a series expansion (e.g., a Fourier series or other series) to represent or approximate the flap deflection. In some other embodiments, the subprocess 2406 may use a polynomial function (e.g., a fourth-order polynomial, and others) to represent or approximate the flap deflection.

Unlike a conventional flight control model which relies only upon a state vector of an air vehicle and a control vector to determine flap or slat deflections that are the control variables in the conventional flight control model, the subprocess 2406 may use the coefficient(s) or mathematical parameter(s) of the function approximating the flap deflection as the virtual control variable(s) in the flight control model at 2458. At 2460, the subprocess 2406 may then determine the deflection(s) of the flap system or the slat system from the virtual control variable(s) that, when the flap system or the slat system is actuated to the determined deflection(s), actively shapes the shape of the wing of the air vehicle.

An illustrative example of a process for implementing active control of a wing shape is provided below for explanation and illustration purposes.

Because the aeroelasticity may adversely affect the trim drag coefficient at cruise, in order to maintain the best cruise efficiency, the wing shape may need to be actively controlled. A concept of operation is now defined as follows:

The design point for wing shaping control actuator requirements is defined to be at the half way point of cruise at 30,000 feet corresponding to an aircraft weight of 175,000 pounds with 50 percent fuel in the tank.

At the start of cruise, the aircraft weight is 190,000 pounds with 80 percent fuel in the tank. This may correspond to a higher wing loading that causes the wing shape to move away from the optimal wing shape. At the end of cruise, the aircraft weight is 160,000 pounds with 20 percent fuel in the tank.

The VCCTE flap is deployed continuously during cruise to vary the wing shape in order to make the wing more aerodynamically efficient with the highest L/D ratio possible.

The VCCTE flap is designed to shape a wing structure by bending and twist to achieve improved aerodynamic efficiency. The control is accomplished by a slow actuation device since steady state aerodynamics must be established during cruise. Thus, the desired VCCTE flap deflection for wing shaping control may be computed by a trim analysis. The steady-state aeroelastic equations are given by $$\frac{\partial^2}{\partial x^2}(-EB_2\gamma'\Theta_x + EI_{yy}W_{xx}) = -mg + c_L q_\infty \cos^2\Lambda c + \\ \delta(x-x_e)[T\sin\Lambda\Gamma - m_e g + (T\sin\Lambda + m_e g\Gamma)W_x + T\cos\Lambda(\Theta + \gamma)] + \\ \delta(x-x_e)(T x_e\cos\Lambda + T y_e\sin\Lambda + m_e g y_e\Gamma)(\Theta_x + \gamma') + \\ \delta(x-x_e)(-T y_e\sin\Lambda\Gamma - T z_e\cos\Lambda + m_e g y_e)[W_{xx}(\Theta+\gamma) + \\ W_x(\Theta_x + \gamma')] \tag{106}$$

$$\frac{\partial}{\partial x}\{[GJ + EB_1(\gamma')^2]\Theta_x - EB_2\gamma'W_{xx}\} = \\ -mg e_{cg} + c_m q_\infty \cos^2\Lambda c^2 - \delta(x-x_e)[-Ty_e\sin\Lambda\Gamma - \\ Tz_e\cos\Lambda + m_e g y_e - (Tx_e\cos\Lambda + Ty_e\sin\Lambda + m_e g y_e\Gamma)W_x] \tag{107}$$

The steady state lift and pitching movement coefficients are computed as $$c_L(x) = c_{L_\alpha}(x)\alpha_{ac}(x) + c_{L_\delta}(x)\delta(x) \tag{108}$$

$$c_m(x) = c_{m_{ac}}(x) + \frac{e(x)}{c(x)}[c_{L_\alpha}(x)\alpha_{ac}(x) + c_{L_\delta}(x)\delta(x)] + c_{m_\delta}(x)\delta(x) \tag{109}$$

where the steady-state angle of attack at the aerodynamic center is given by $$\alpha_{ac}(x) = \frac{\alpha - \alpha_i}{\cos\Lambda}\left(1 - \frac{\alpha\gamma}{\cos\Lambda}\right) - \gamma - \\ W_x\tan\Lambda\left[1 - \frac{(\alpha-\alpha_i)\gamma}{\cos\Lambda}\right] - \Theta\left(1 - \frac{\alpha^2}{\cos^2\Lambda}\right) + \Theta W_x\frac{(\alpha-\alpha_i)\tan\Lambda}{\cos\Lambda} \tag{110}$$

The induced drag of a finite aspect-ratio wing is a consequence of the lift circulation over the wing. For a straight unswept wing in some embodiments, the ideal elliptical lift circulation distribution results in a minimum induced drag whereby the downwash behind the wing is uniform. Suppose a desired optimal lift distribution is known, then let $c_L^*$ be the optimal lift distribution, $\alpha^*$ be the optimal trim angle of attack, and $\alpha_i^*$ be the optimal induced angle of attack. Using an inverse design method, one may compute the VCCTE flap deflection as a nonlinear feedback control in terms of $\alpha^*$, $W_x$, $\theta$, and $\theta W_x$ according to $$\delta(\alpha^*, W_x, \Theta, \Theta W_x) = \frac{c_L^*(x) - c_{L_\alpha}(x)\alpha_{ac}^*(x)}{c_{L_\delta}(x)} \quad (111)$$

Because $c_L^*$ is specified, then $c_m^*$ may be computed as $$c_m^*(x) = c_{m_{ac}}(x) + \frac{e(x)}{c(x)}c_L^*(x) + c_{m_\delta}(x)\frac{c_L^*(x) - c_{L_\alpha}(x)\alpha_{ac}^*(x)}{c_{L_\delta}(x)} \quad (112)$$

Then, the steady-state aeroelastic equations may be solved for $W_x$ and $\theta$ explicitly as a function of x. Substituting $W_x$ and $\theta$ into the expression for the steady-state angle of attack at the aerodynamic center, the VCCTE flap deflection may be computed explicitly as a function of x.

In some embodiments, determining the optimal lift distribution at any point inside a flight envelope may be challenging. Therefore, this problem may be solved by a coupled aerodynamic-aeroelastic optimization whereby the VCCTE flap deflection is optimized to achieve a desired wing shape corresponding to a minimum induced drag.

Figure 11B:
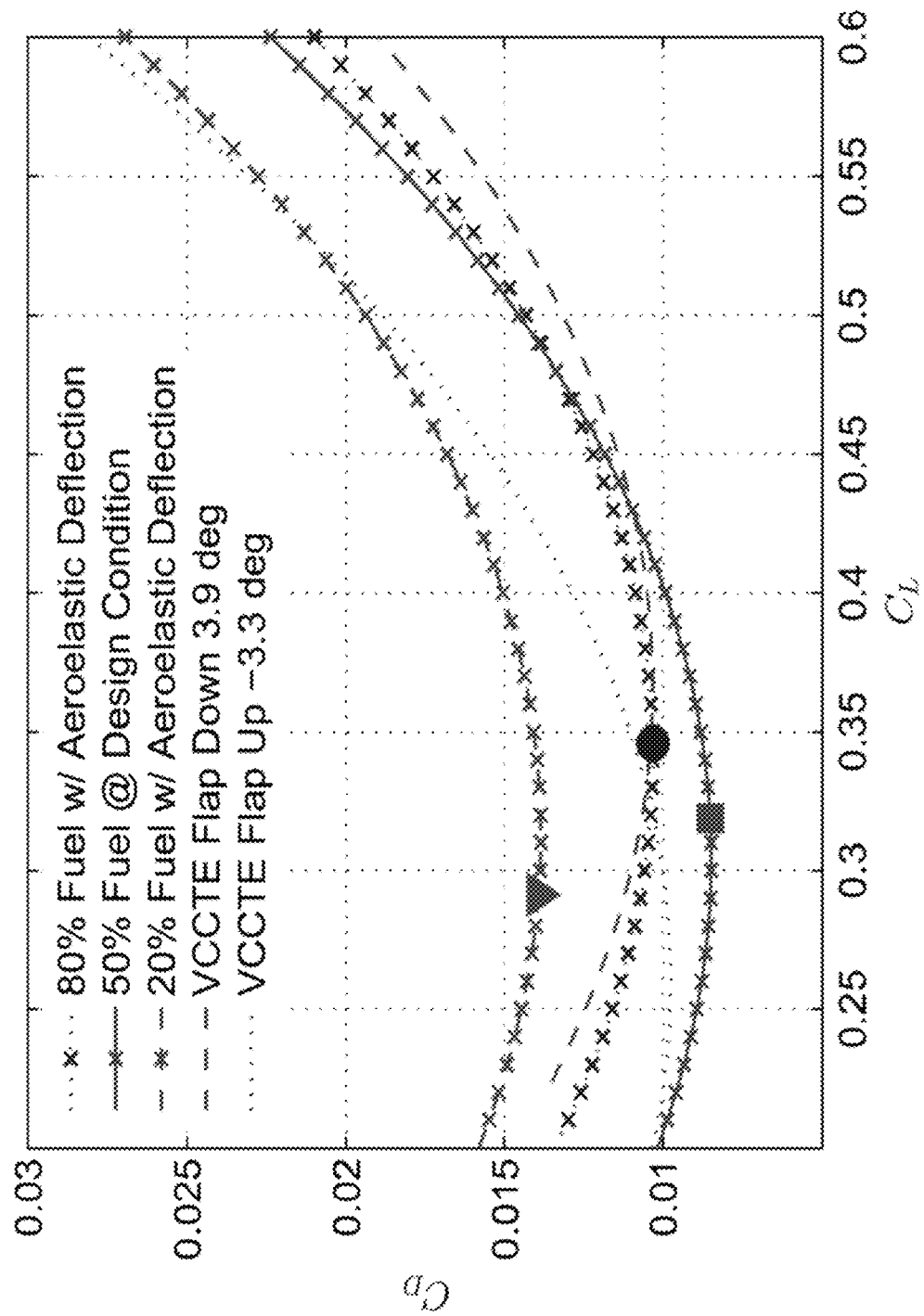
FIG. 11B shows drag polars with VCCTE Flap in some embodiments.

FIG. 11B illustrates drag polars of a flexible wing with the VCCTE flap deflection in some embodiments. The design wing shape corresponds to the one at 50 percent fuel remaining at the mid-point of cruise. At the beginning of cruise at 80 percent fuel remaining and end of cruise at 20 percent fuel remaining, the trim lift coefficients are no longer maintained at the optimal trim lift coefficients. The wing shapes therefore are deflected away from the optimal wing shape.

Without wing shaping control, the trim drag at cruise at off-design points may be significant. When the VCCTE flap is applied to bring the wing shape back to the optimal wing shape, for the cruise flight condition at 80 percent fuel remaining, the VCCTE flap may deflect upward. The trim drag at this flight condition is slightly greater than that without wing shaping control. Therefore, the control strategy will be to not actuate the VCCTE flap.

On the other hand, for the cruise flight condition at 20 percent fuel remaining, the VCCTE flap may deflect downward. The trim drag with the VCCTE flap deflection is significantly less than that without wing shaping control. Thus, the VCCTE flap is actuated to reduce the trim drag.

It shall be noted that if the wings are assumed to be perfectly rigid, there exists only one line plot—the "50% Fuel @ Design Condition"—rather than three line plots: "80% Fuel w/Aeroelastic Deflection," "50% Fuel @ Design Condition," and "20% Fuel w/ Aeroelastic Deflection". It shall also be noted that the solid, filled symbols (the solid inverted triangle on "20% Fuel w/ Aeroelastic Deflection," the solid, filled circle on "80% Fuel w/ Aeroelastic Deflection," and the solid, filled square on "50% Fuel @ Design Condition") represent the cruise points.

It shall be noted that this mode of operation is for illustration only and represents one possible operation with wing shaping control. In some embodiments, the wing shaping control is continually engaged with appropriate settings of the variable camber continuous trailing edge and or continuous leading edge slat systems throughout the flight envelope.

5. Flutter Analysis: The aeroelastic equations may be expressed in a strong form such as partial differential equations in some embodiments. Weak-form solutions of the equations may be expressed as integral forms which may be constructed using various numerical techniques such as finite-element method, Galerkin method, and others that are well known in the field. The Galerkin or assumed mode method forms a solution as a superposition of a finite number of eigenfunctions of a simple beam. The finite-element method discretizes the continuous domain in x into discrete elements. A shape or interpolation function is imposed on each element.

A computer model may be developed using the finite-element method. The computer model may compute values such as the frequency and damping as well as static deflections of a wing structure. The model also may compute the aircraft aeroelastic response coupled with rigid-body modes.

The structural rigidities EI and GJ are estimated for conventional stiff wing structures of a typical conventional older-generation transport aircraft, heretofore abbreviated as CTA. For the ESAC (Elastically Shaped Aircraft Concept), the wing structural rigidities EI and GJ are purposely reduced to model highly flexible wing structures that are representative of a typical current-and-future-generation transport aircraft. The increased flexibility enables the wing shaping control actuation by the VCCTE (Variable Camber Continuous Trailing Edge) flap system.

Figure 16:
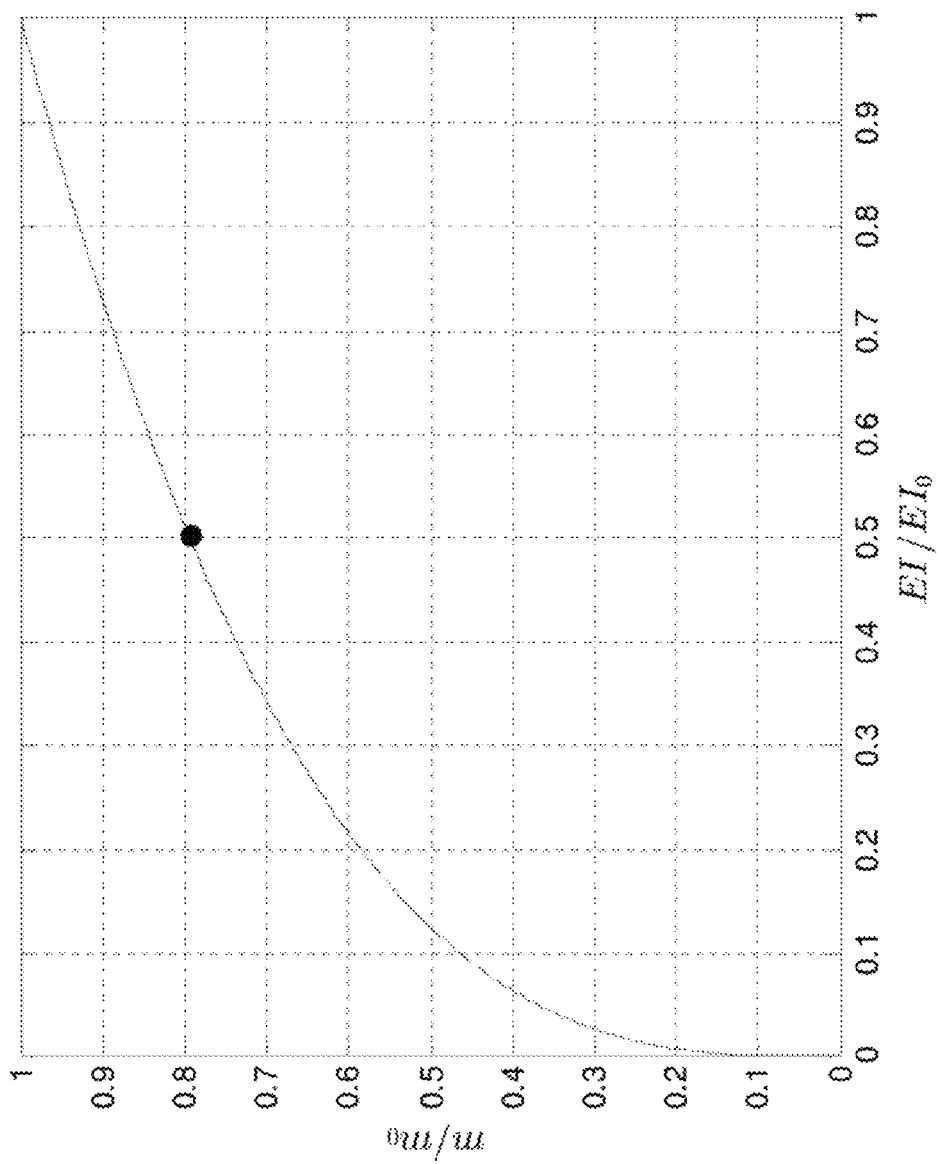
FIG. 16 shows mass vs. structural rigidity.

In addition to the wing dry mass, the fuel mass may also be accounted for in some embodiments. The fuel is stored in the center tank and wing main tanks in the illustrative embodiments. The center tank holds 20,000 pounds of fuel. Each of the main tanks holds about 15,000 pounds of fuel. The center tank is used first until it is empty. Then, the fuel is drawn equally from the wing main tanks The fuel mass is modeled as the combined wing mass density. As the structural rigidities are reduced, the wing dry mass also decreases. Assuming that the wing box structure is modeled as a thin-walled structure, then the mass change is related to the change in the wing structural rigidity EI according to FIG. 16.

Figure 17:
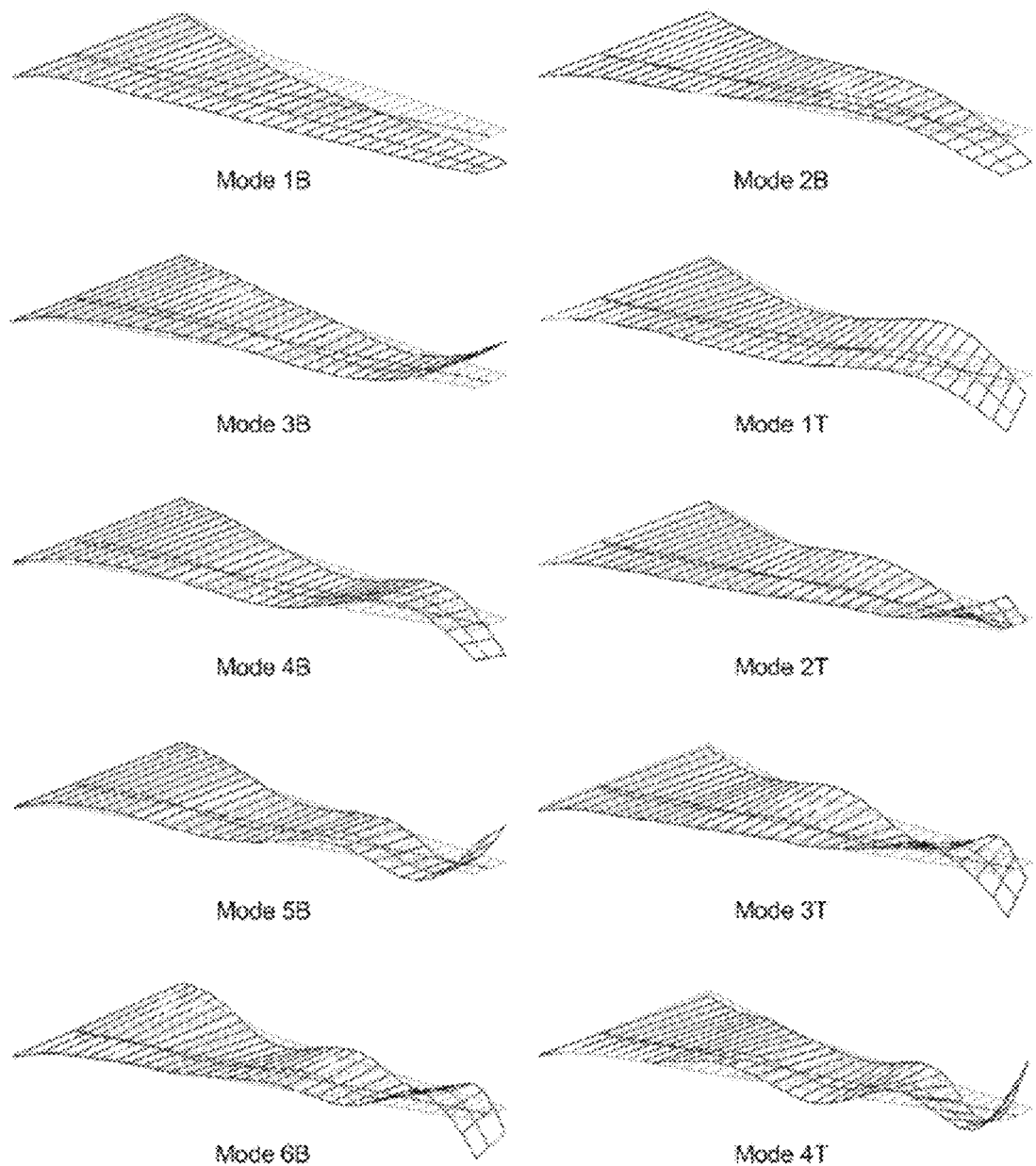
FIG. 17 shows some exemplary wing shapes in symmetric modes.
Figure 18:
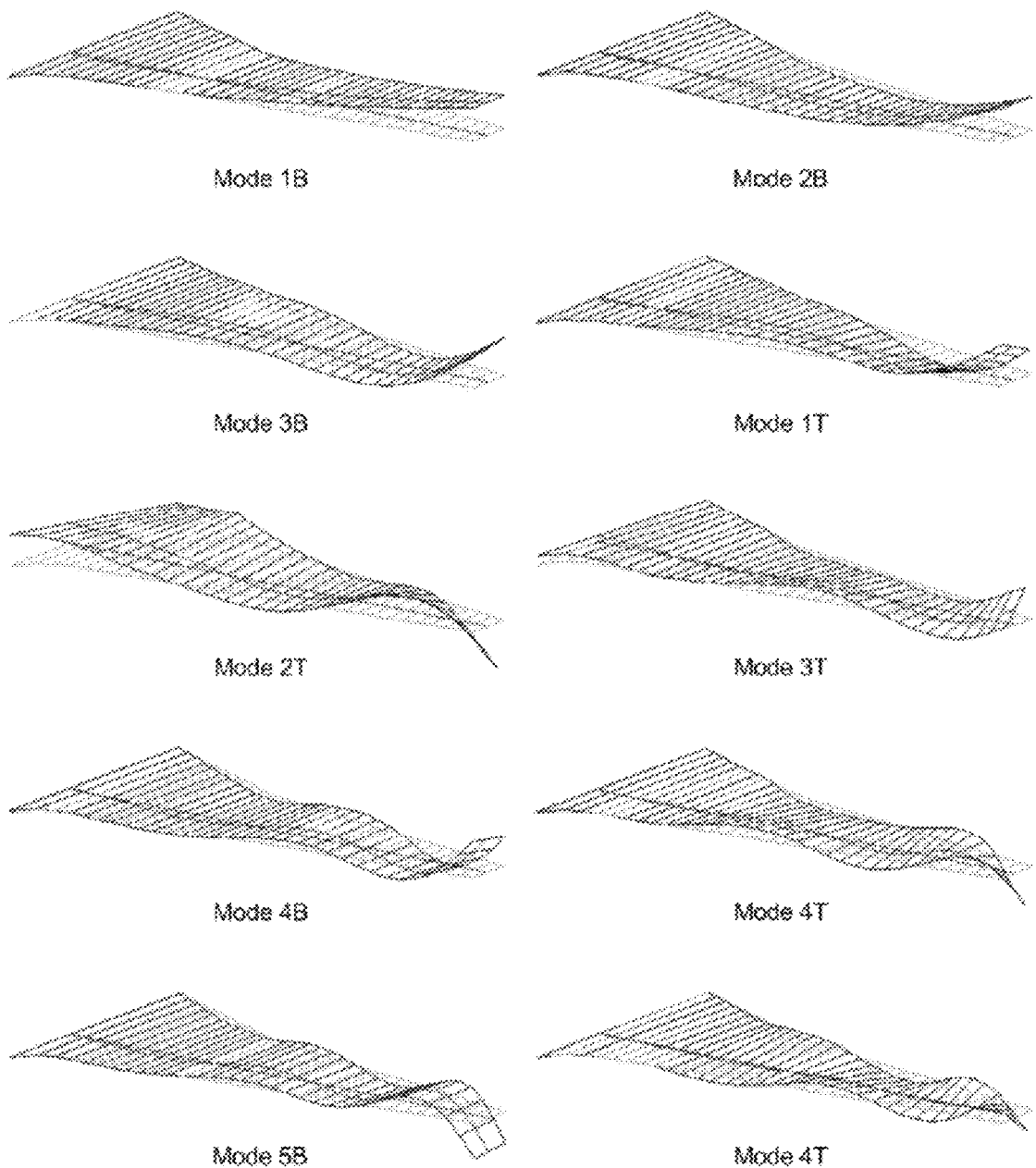
FIG. 18 shows some exemplary wing shapes in anti-symmetric modes.
Figure 19:
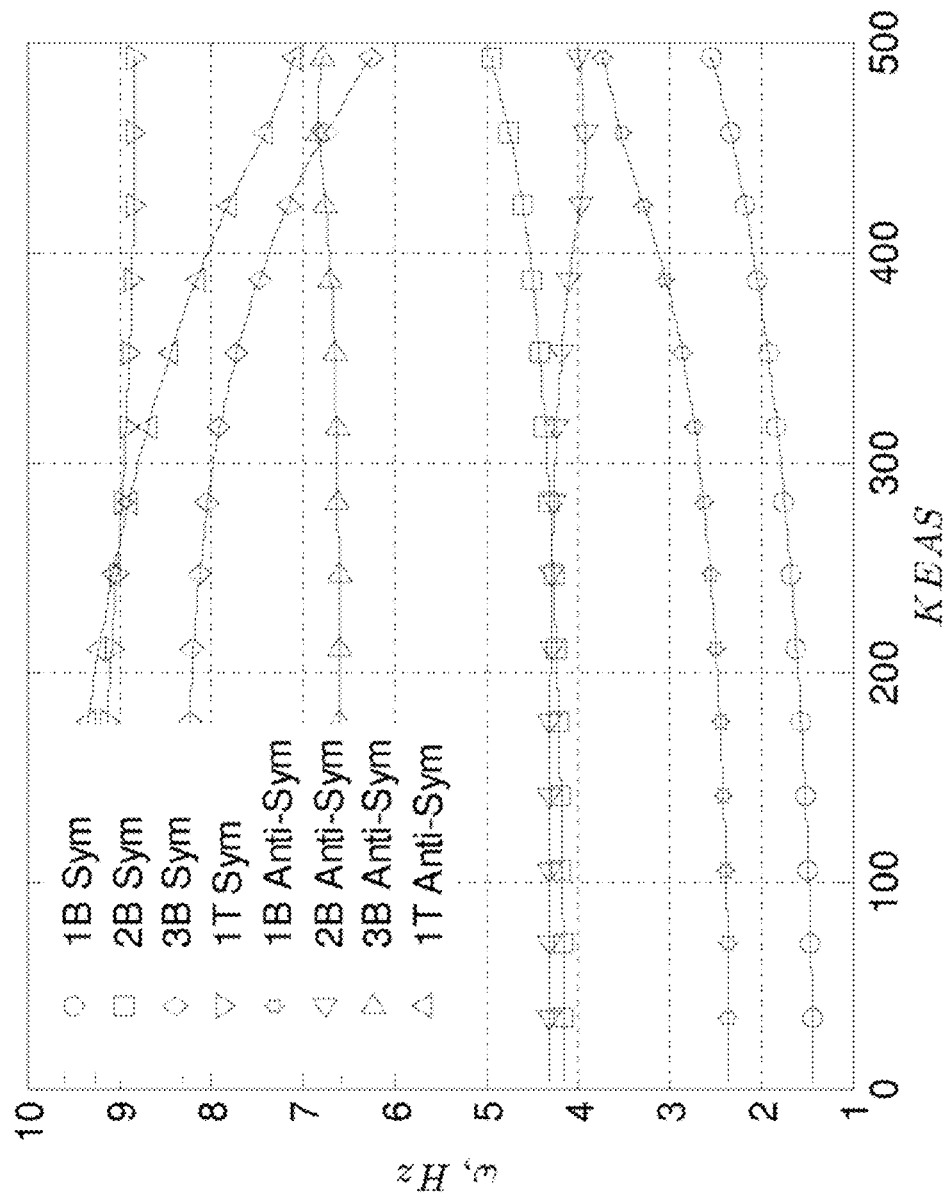
FIG. 19 shows frequencies of CTA (conventional transport aircraft) with stiff wings at an altitude of 35,000 feet in some embodiments.
Figure 20:
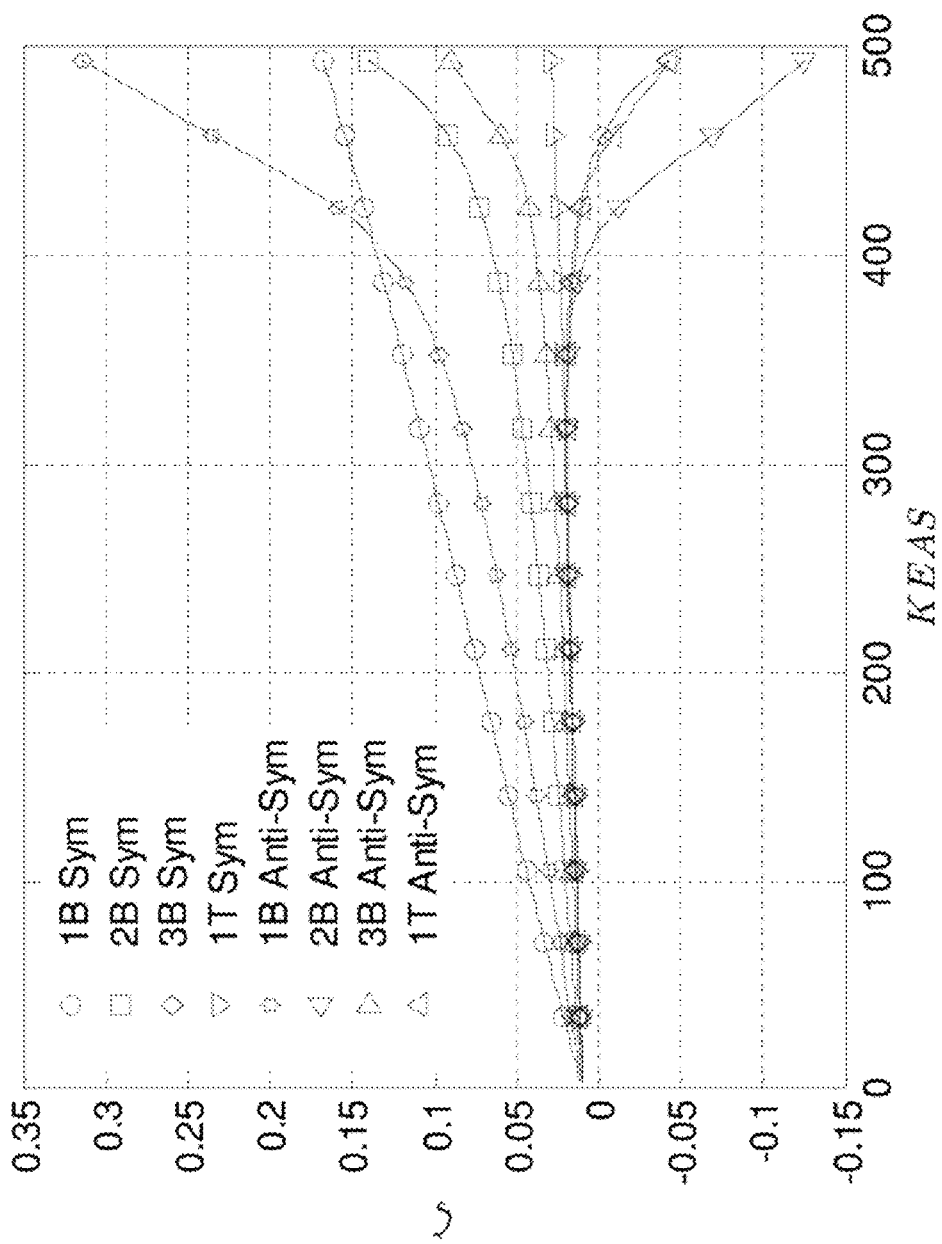
FIG. 20 shows damping ratios of CTA (conventional transport aircraft) with stiff wings at an altitude of 35,000 feet in some embodiments.
Figure 21:
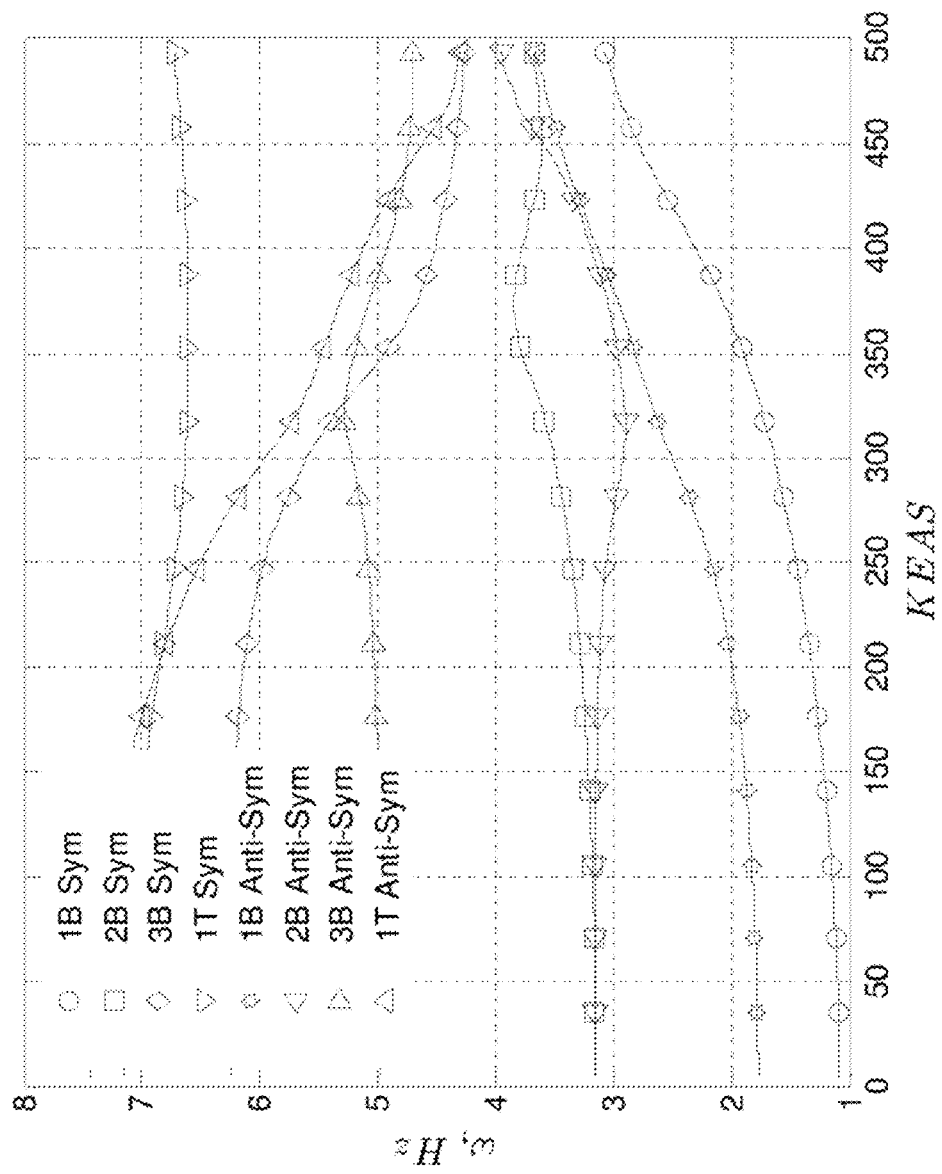
FIG. 21 shows frequencies of ESAC (elastically shaped aircraft concept) with highly flexible wings at an altitude of 35,000 feet in some embodiments.
Figure 22:
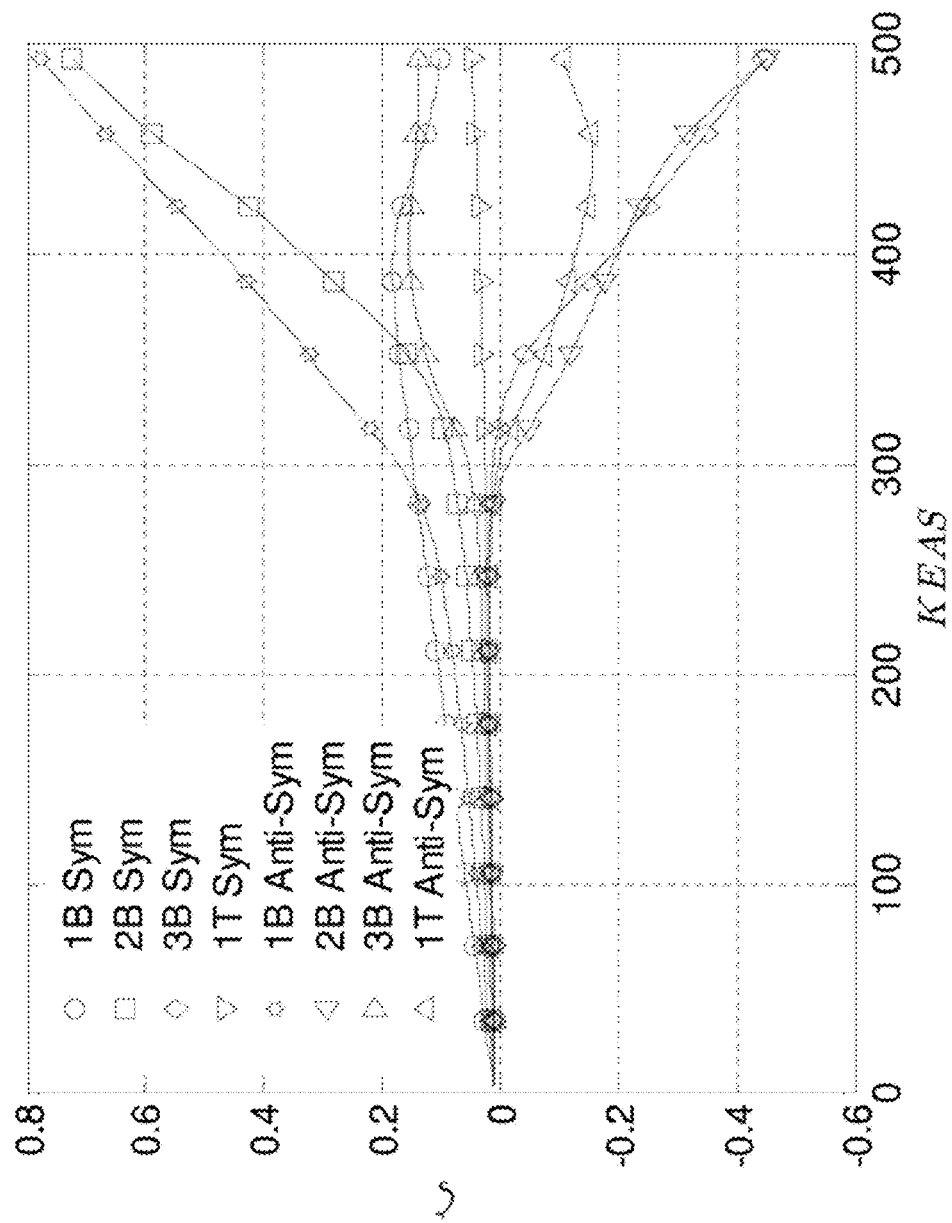
FIG. 22 shows damping ratios of ESAC (elastically shaped aircraft concept) with highly flexible wings at an altitude of 35,000 feet in some embodiments.

The structural dynamic modes of the CTA (Conventional Transport Aircraft) with stiff wings and the ESAC with flexible wings at 80 percent fuel remaining are presented in Tables 4 and 5 below. The symmetric and anti-symmetric mode shapes are plotted in FIGS. 17 and 18. The frequencies of the ESAC are reduced by 24 percent relative to those of the CTA due to the reduced structural rigidities.

The flutter speed prediction is computed using a linear aeroelastic model with an assumed 1 percent damping in some exemplary embodiments. The frequencies and damping ratios of the first four symmetric and anti-symmetric modes for the CTA with stiff wings and the ESAC with highly flexible wings are plotted in FIGS. 19 to 22 as a function of the equivalent airspeed in knots. The critical flutter mode is the second bending anti-symmetric mode. The predicted flutter speeds are shown in Tables 6 and 7 below.

Figure 23:
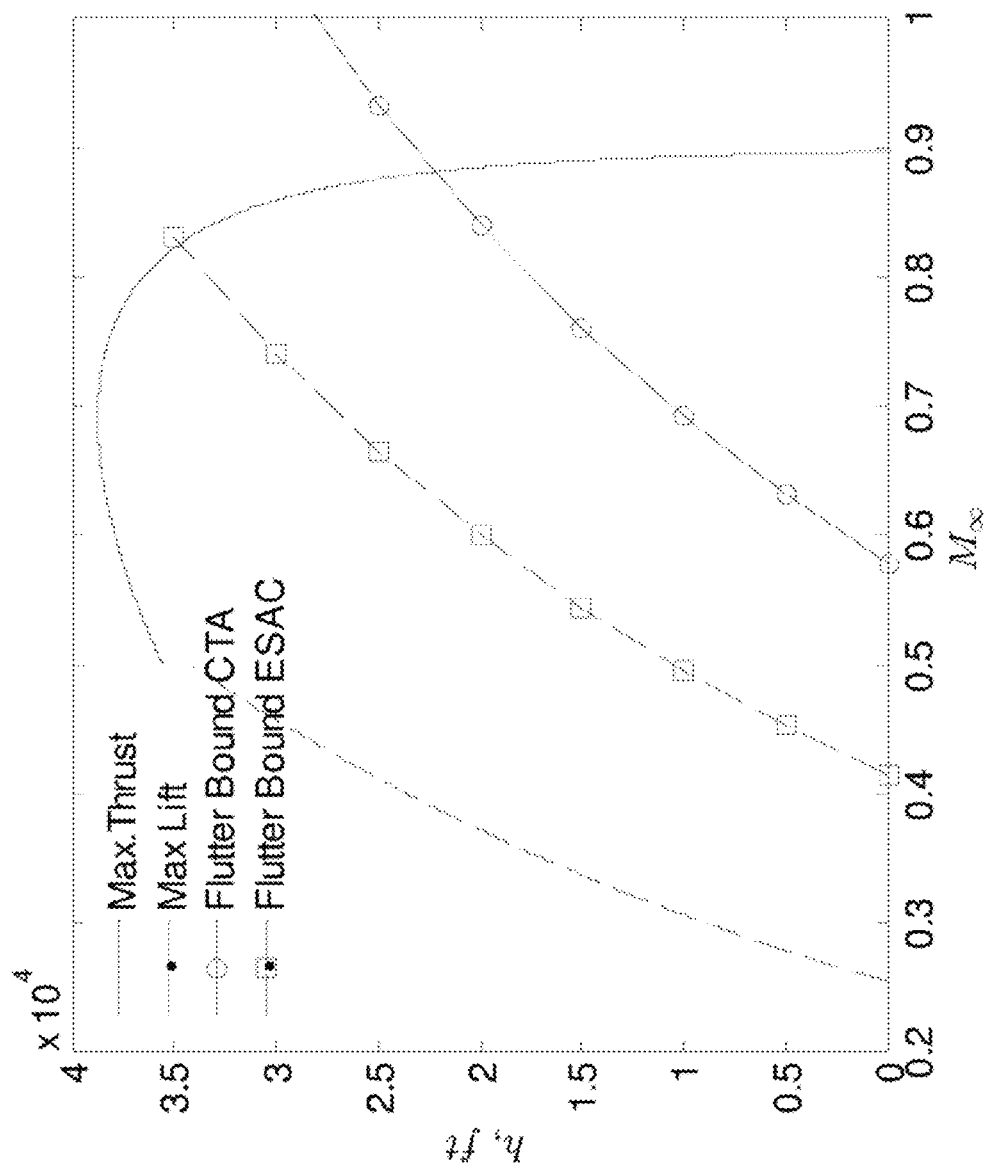
FIG. 23 shows flight envelope and flutter boundaries of CTA and ESAC in some embodiments.

FIG. 23 shows the flutter boundaries on the flight envelope for the CTA and ESAC. For the CTA, the flutter boundary is well above the maximum airspeed at high altitude, but the flutter boundary for the ESAC with highly flexible wings is within the flight envelope at high altitude. The reduction in the structural rigidities causes a significant 29 percent drop in the flutter speed. In some embodiments, active flutter suppression control may also be required.

TABLE 4

Frequencies of Normal Modes of CTA with Stiff Wings at 80% Fuel Remaining

| Cantilever Mode | Mode | Symmetric Mode | Mode | Anti-Symmetric Mode |
|---|---|---|---|---|
| Mode | | | | |
| 1B | 1.3596 | 1B | 1.4337 | 1B | 2.3467 |
| 2B | 3.7405 | 2B | 4.1458 | 2B | 4.3097 |
| 3B | 4.6170 | 3B | 8.2983 | 3B | 6.5671 |

TABLE 4-continued

Frequencies of Normal Modes of CTA with
Stiff Wings at 80% Fuel Remaining

| Mode | Cantilever Mode | Mode | Symmetric Mode | Mode | Anti-Symmetric Mode |
|---|---|---|---|---|---|
| 1T | 8.7240 | 1T | 9.2571 | 1T | 9.5964 |
| 2T | 9.7822 | 2T | 10.5342 | 2T | 13.1691 |
| 3T | 15.5413 | 3T | 15.3889 | 3T | 15.7262 |
| 4B | 16.9714 | 4B | 16.0972 | 4B | 21.9920 |
| 4T | 23.8500 | 4T | 23.8652 | 4T | 23.7430 |
| 5B | 26.2621 | 5B | 24.5403 | 5B | 25.9084 |
| 5T | 32.7294 | 5T | 32.3880 | 5T | 31.7611 |

TABLE 5

Frequencies of Normal Modes of ESAC
with Highly Flexible Wings at 80% Fuel Remaining

| Mode | Cantilever Mode | Mode | Symmetric Mode | Mode | Anti-Symmetric Mode |
|---|---|---|---|---|---|
| 1B | 1.0340 | 1B | 1.0877 | 1B | 1.7764 |
| 2B | 12.7466 | 2B | 3.1505 | 2B | 3.1650 |
| 3B | 3.4350 | 3B | 6.2524 | 3B | 4.9710 |
| 1T | 6.6018 | 1T | 7.1543 | 1T | 7.4238 |
| 2T | 7.5237 | 2T | 8.0580 | 2T | 9.9622 |
| 3T | 12.0462 | 3T | 11.7414 | 3T | 12.2519 |
| 4B | 12.8829 | 4B | 12.4047 | 4B | 16.8019 |
| 4T | 18.4476 | 4T | 18.4267 | 4T | 18.3986 |
| 5B | 20.0045 | 5B | 18.7751 | 5B | 20.1822 |
| 5T | 25.4651 | 5T | 25.0106 | 5T | 24.1093 |

TABLE 6

Flutter Speed Prediction for CTA
with Stiff Wings at 80% Fuel Remaining

| Altitude, $10^3$ ft. | Cantilever Mode | Symmetric Mode | Anti-Symmetric Mode |
|---|---|---|---|
| 0 | 0.6499 | 0.6336 | 0.5790 |
| 5 | 0.7103 | 0.6925 | 0.6319 |
| 10 | 0.7792 | 0.7596 | 0.6923 |
| 15 | 0.8583 | 0.8364 | 0.7615 |
| 20 | 0.9496 | 0.9251 | 0.8411 |
| 25 | 1.0555 | 1.0280 | 0.9334 |
| 30 | 1.1795 | 1.1483 | 1.0411 |
| 35 | 1.3253 | 1.2897 | 1.1674 |

TABLE 7

Flutter Speed Prediction for ESAC with Highly
Flexible Wings at 80% Fuel Remaining

| Altitude, $10^3$ ft. | Cantilever Mode | Symmetric Mode | Anti-Symmetric Mode |
|---|---|---|---|
| 0 | 0.4612 | 0.4554 | 0.4156 |
| 5 | 0.5037 | 0.4974 | 0.4530 |
| 10 | 0.5522 | 0.5451 | 0.4956 |
| 15 | 0.6078 | 0.6000 | 0.5445 |
| 20 | 0.6718 | 0.6629 | 0.6008 |
| 25 | 0.7461 | 0.7360 | 0.6658 |
| 30 | 0.8320 | 0.8214 | 0.7418 |
| 35 | 0.9350 | 0.9218 | 0.8308 |

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for implementing control of a wing shape comprising:
   identifying or determining a lift distribution for an air vehicle having at least one wing;
   determining a deflection of the at least one wing of the air vehicle based at least in part upon the lift distribution;
   determining one or more deflections of multiple chordwise flap segments based at least in part upon the deflection of the at least one wing;
   allowing for a bending shape change, a twisting shape change, and a camber shape change of the at least one wing using the multiple chordwise flap segments that form individual spanwise flap sections by transmitting one or more flap control signals from a controller to the multiple chordwise flap segments and spanwise flap sections to approximate the wing shape of the at least one wing to the deflection of the at least one wing;
   identifying or determining one or more aeroelastic modes for modal suppression; and
   determining a deflection of the at least one wing of the air vehicle based at least in part upon the aeroelastic modes.

2. The method of claim 1 comprising:
   using the one or more flap control signals to form a piecewise continuous trailing edge for the multiple chordwise flap segments and the spanwise flap sections with or without flexible transition materials in between the multiple chordwise flap segments and in between the spanwise flap sections.

3. The method of claim 1 wherein the act of determining the one or more deflections comprises:
   identifying a trim angle of attack;
   identifying an induced angle of attack;
   identifying an aeroelastic mode for modal suppression;
   identifying drag components; and
   determining the one or more deflections based further at least in part upon the trim angle of attack, the induced angle of attack, the aeroelastic mode for modal suppression, and the drag components.

4. The method of claim 3 wherein the act of determining the one or more deflections of multiple flap segments comprises:
   identifying a flight control model that includes a rigid-body flight dynamic model that correlates a state vector of the air vehicle with a control vector and an aeroservoelastic model that correlates an elastic state vector of the at least one wing with the control vector; and
   approximating the deflection of the at least one wing by using a function including multiple coefficients with and without specifications of boundary conditions on the values of the function and its first derivative at the two end points and any point in between.

5. The method of claim 3 wherein the act of determining the one or more deflections of the multiple chordwise flap segments and the spanwise flap sections comprises:
   determining the one or more deflections of the control surfaces of the air vehicle using at least some of the multiple coefficients as one or more virtual control variables that approximate shape functions in the flight control model based at least in part upon at least one drag-cognizant cost function including a drag component and an aeroelastic mode to be suppressed.

6. The method of claim 5 wherein the drag component is associated with at least one deflection of the one or more deflections of the multiple flap segments.

7. The method of claim 1 comprising:
determining multiple deflections of the at least one wing of the air vehicle off-line by using one or more models for multiples points in a flight envelope of the air vehicle.

8. The method of claim 7 comprising:
determining a first deflection of the at least one wing in flight by using one or more signals from at least a sensor, wherein the one or more signals from the sensor indicate an elastic state of the at least one wing in flight or a state associated with at least one drag component; and
determining the deflection of the at least one wing by using at least the first deflection and at least some of the multiple deflections.

9. The method of claim 1 wherein the wing comprises an aeroelastic wing and the at least one controller that determines one or more deflections for determining the one or more deflections of the multiple chordwise flap segments and spanwise flap sections to reduce structural loading on the aeroelastic wing during flight maneuvers and gust encounters based at least in part on a cost function that includes a load model, a drag component, and an aeroelastic mode to be suppressed.

10. The method of claim 1 wherein the multiple chordwise flap segments form the individual spanwise flap sections with flexible transition materials in between the individual spanwise flap sections.

11. The method of claim 1 wherein the multiple chordwise flap segments form the individual spanwise flap sections without flexible transition materials in between the individual spanwise flap sections.

12. An apparatus for implementing active control of a wing shape comprising:
at least one controller that is to:
identify or determine a lift distribution for an air vehicle having at least one wing;
determine a deflection of the at least one wing of the air vehicle based at least in part upon the lift distribution;
determine one or more deflections of multiple chordwise flap segments and spanwise flap sections based at least in part upon the deflection of the at least one wing;
allow for a bending shape change, a twisting shape change, and a camber shape change of the at least one wing using the multiple flap segments by transmission of one or more flap control signals from the controller to the multiple chordwise flap segments and the spanwise flap sections to approximate the wing shape of the at least one wing to the deflection of the at least one wing;
identify or determine one or more aeroelastic modes for modal suppression; and
determine a deflection of the at least one wing of the air vehicle based at least in part on the aeroelastic modes.

13. The apparatus of claim 12 comprising:
at least one flap actuator that is to:
receive the one or more flap control signals from the controller to actuate at least one flap segment of the multiple chordwise flap segments and the spanwise flap sections to approximate the wing shape of the at least one wing to the deflection of the at least one wing.

14. The apparatus of claim 13 wherein the at least one flap actuator is further to:
use the one or more flap control signals to form a piecewise continuous trailing edge for the multiple chordwise flap segments and the spanwise flap sections.

15. The apparatus of claim 12 wherein the at least one controller that is to determine the one or more deflections is further to:
identify a trim angle of attack;
identify an induced angle of attack;
identifying an aeroelastic mode for modal suppression;
identifying drag components; and
determine the one or more deflections based further at least in part upon the trim angle of attack, the induced angle of attack, the aeroelastic mode, and the drag components.

16. The apparatus of claim 15 wherein the at least one controller that is to determine the one or more deflections is further to:
identify a flight control model that includes a rigid-body flight dynamic model that correlates a state vector of the air vehicle with a control vector and an aeroservoelastic model that correlates an elastic state vector of the at least one wing with a control vector; and
approximate the deflection of the at least one wing by using a function including multiple coefficients whereby these coefficients act as virtual control variables to approximate shape functions.

17. The apparatus of claim 16 wherein the at least one controller that is to determine the one or more deflections is further to:
determine the one or more deflections of the control surfaces of the air vehicle using at least some of the multiple coefficients as one or more virtual control variables in the flight control model based at least in part upon a cost function including a drag component, and an aeroelastic mode to be suppressed.

18. The apparatus of claim 12 wherein the wing comprises an aeroelastic wing and the at least one controller that determines one or more deflections for determining the one or more deflections of the multiple chordwise flap segments and spanwise flap sections to reduce structural loading on the aeroelastic wing during flight maneuvers and gust encounters based at least in part on a cost function that includes a load model, a drag component, and an aeroelastic mode to be suppressed.

* * * * *